United States Patent
Seo et al.

(10) Patent No.: US 12,461,815 B2
(45) Date of Patent: Nov. 4, 2025

(54) OPERATION METHOD OF STORAGE CONTROLLER FOR NONVOLATILE MEMORY DEVICE

(71) Applicant: SAMSUNG ELECTRONICS CO., LTD., Suwon-si (KR)

(72) Inventors: Youngjoo Seo, Suwon-si (KR); Youngdeok Seo, Suwon-si (KR); Sangkwon Moon, Suwon-si (KR); Hyunkyo Oh, Suwon-si (KR); Hee-Tai Oh, Suwon-si (KR); Heewon Lee, Suwon-si (KR); Jisoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 32 days.

(21) Appl. No.: 18/512,613

(22) Filed: Nov. 17, 2023

(65) Prior Publication Data

US 2024/0176700 A1    May 30, 2024

(30) Foreign Application Priority Data

| Nov. 18, 2022 | (KR) | 10-2022-0155039 |
| Aug. 31, 2023 | (KR) | 10-2023-0115347 |
| Oct. 12, 2023 | (KR) | 10-2023-0136251 |

(51) Int. Cl.
*G06F 11/10* (2006.01)
*G06F 11/07* (2006.01)

(52) U.S. Cl.
CPC ........ *G06F 11/1068* (2013.01); *G06F 11/076* (2013.01)

(58) Field of Classification Search
None
See application file for complete search history.

(56) References Cited

U.S. PATENT DOCUMENTS

| 9,361,997 B2 | 6/2016 | Lee |
| 9,431,122 B2 | 8/2016 | Lee |
| | (Continued) | |

FOREIGN PATENT DOCUMENTS

| KR | 10-2069274 | 1/2020 |
| KR | 10-2089532 | 3/2020 |
| | (Continued) | |

OTHER PUBLICATIONS

D. Lee et al., "Improving Write Performance Through Reliable Asynchronous Operation in Physically-Addressable SSD," in IEEE Access, vol. 8, pp. 195528-195540, 2020, (Year: 2020).*

*Primary Examiner* — Daniel F. McMahon
(74) *Attorney, Agent, or Firm* — Morgan, Lewis & Bockius LLP

(57) ABSTRACT

An operation method for controlling a nonvolatile memory device includes initiating a first instance of a respective reliability operation for a respective memory block included in the nonvolatile memory device. The respective reliability operation includes detecting a degradation level of the respective memory block and setting a respective skip reference value based on the detected degradation level. The operation method also includes determining whether a respective number of consecutively skipped instances of the respective reliability operation is less than the respective skip reference value. The operation method further includes selectively skipping or performing a next instance of the respective reliability operation based on the determination result.

14 Claims, 27 Drawing Sheets

(56) References Cited

U.S. PATENT DOCUMENTS

| | | |
|---|---|---|
| 9,514,819 B2 | 12/2016 | Lin et al. |
| 9,613,687 B2 | 4/2017 | Kim et al. |
| 9,613,711 B2 | 4/2017 | Kim et al. |
| 9,690,654 B2 | 6/2017 | No et al. |
| 9,720,624 B2 | 8/2017 | Moon et al. |
| 9,761,321 B2 | 9/2017 | Lee |
| 10,002,042 B2 * | 6/2018 | Alrod .................... G06F 3/0688 |
| 10,319,447 B2 | 6/2019 | Shim et al. |
| 10,802,728 B2 | 10/2020 | Lee et al. |
| 10,867,683 B2 | 12/2020 | Shim et al. |
| 10,877,883 B2 | 12/2020 | Hwang |
| 11,113,189 B2 * | 9/2021 | Byun .................... G06F 3/0659 |
| 11,409,441 B2 | 8/2022 | Kim et al. |
| 2013/0080694 A1 * | 3/2013 | Iyer .................. G11C 11/40618 |
| | | 711/E12.078 |
| 2015/0355845 A1 * | 12/2015 | Lee ...................... G06F 3/0659 |
| | | 711/103 |
| 2016/0104539 A1 * | 4/2016 | Kim ....................... G11C 16/28 |
| | | 365/185.11 |
| 2017/0091006 A1 * | 3/2017 | Camp .................... G06F 3/0619 |
| 2018/0261296 A1 * | 9/2018 | Choi ...................... G11C 16/08 |
| 2019/0236005 A1 * | 8/2019 | Lee ....................... G06F 3/0688 |
| 2021/0109660 A1 * | 4/2021 | Kim .................... G06F 11/1068 |
| 2021/0118491 A1 * | 4/2021 | Li ......................... G11C 29/20 |
| 2021/0263852 A1 * | 8/2021 | Seok .................... G06F 12/0891 |
| 2021/0280241 A1 * | 9/2021 | Choi .................... G11C 16/349 |
| 2022/0043606 A1 * | 2/2022 | Lee ....................... G06F 3/0616 |
| 2022/0114054 A1 | 4/2022 | Kim |
| 2022/0208294 A1 | 6/2022 | Lee et al. |
| 2022/0413701 A1 * | 12/2022 | Kim .................... G06F 3/0608 |
| 2023/0142506 A1 | 5/2023 | Lee et al. |

FOREIGN PATENT DOCUMENTS

| | | |
|---|---|---|
| KR | 10-2233074 | 3/2021 |
| KR | 10-2021-0043778 | 4/2021 |

* cited by examiner

FIG. 6

LUT1

| Skip Status | SS1 | SS2 | SS3 | SS4 | SS5 |
|---|---|---|---|---|---|
| Error Bits | EBR1 | EBR2 | EBR3 | EBR4 | EBR5 |
| Skip Reference | S_REF1 | S_REF2 | S_REF3 | S_REF4 | S_REF5 |

FIG. 9

| INT. Status | IS1 | IS2 | IS3 | IS4 | IS5 |
|---|---|---|---|---|---|
| Error Bits | EBR1 | EBR2 | EBR3 | EBR4 | EBR5 |
| Interval | INT1 | INT2 | INT3 | INT4 | INT5 |

LUT2

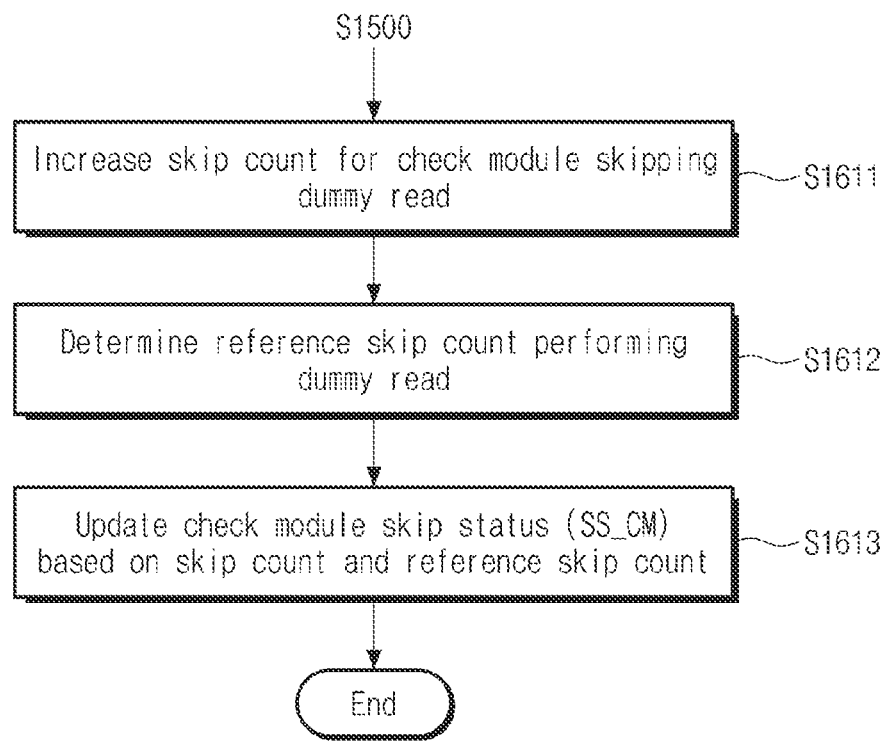

OPERATION METHOD OF STORAGE CONTROLLER FOR NONVOLATILE MEMORY DEVICE

CROSS-REFERENCE TO RELATED APPLICATIONS

This application claims priority under 35 U.S.C. § 119 to Korean Patent Application No. 10-2022-0155039, filed on Nov. 18, 2022, Korean Patent Application No. 10-2023-0115347, filed on Aug. 31, 2023, and Korean Patent Application No. 10-2023-0136251, filed on Oct. 12, 2023 in the Korean Intellectual Property Office, the disclosures of which are incorporated by reference herein in their entireties.

FIELD

The present disclosure relates to semiconductor memory devices, and more particularly relates to an operation method of a storage controller configured to control a nonvolatile memory device.

DISCUSSION

A semiconductor memory may be classified as a volatile memory, in which stored data disappear when a power is turned off, such as in a static random-access memory (SRAM) or in a dynamic random-access memory (DRAM); or as a nonvolatile memory, in which stored data are retained even when a power is turned off, such as in a flash memory device, a phase-change RAM (PRAM), a magnetic RAM (MRAM), a resistive RAM (RRAM), or a ferroelectric RAM (FRAM).

The flash memory device is being widely used as a high-capacity storage medium. Due to a physical characteristic of the flash memory device and/or various ambient factors, an error may occur in data that are stored in the flash memory device. The data error may be corrected through a separate error correction means. However, when an error occurs that exceeds an error correction limitation of the separate error correction means, such data may be lost. In this case, the reliability of the data stored in the flash memory device may be affected.

SUMMARY

Embodiments of the present disclosure may provide an operation method with high reliability and/or performance for a storage controller configured to control a nonvolatile memory device.

According to an embodiment, an operation method of a storage controller, which is configured to control a nonvolatile memory device, includes initiating a first instance of a respective reliability operation for a respective memory block included in the nonvolatile memory device, the respective reliability operation including detecting a degradation level of the respective memory block and setting a respective skip reference value based on the detected degradation level; determining whether a respective number of consecutively skipped instances of the respective reliability operation is less than the respective skip reference value; and selectively skipping or performing a next instance of the respective reliability operation based on the determination result.

According to an embodiment, an operation method of a storage controller, which is configured to control a nonvolatile memory device, includes performing a reliability operation on a respective memory block included in the nonvolatile memory device to obtain respective error information of the respective memory block; setting a respective skip reference value of the respective memory block based on the respective error information; skipping a respective reliability operation of the respective memory block a number of times, wherein the number is a natural number corresponding to the respective skip reference value; and after the reliability operation of the first memory block is skipped the number of times, performing the respective reliability operation of the respective memory block to obtain updated respective error information.

According to an embodiment, an operation method of a storage controller, which is configured to control a nonvolatile memory device, includes performing a first reliability operation on a first memory block included in the nonvolatile memory device to obtain first error information of the first memory block, setting a first interval of the first memory block based on the first error information, performing a second reliability operation on the first memory block based on the first interval to obtain second error information of the first memory block, setting a second interval of the first memory block based on the second error information, and performing a third reliability operation on the first memory block based on the second interval to obtain third error information of the first memory block.

According to an embodiment, an operation method of a storage controller configured to control a nonvolatile memory device includes triggering a first reliability operation of a first memory block included in the nonvolatile memory device, performing the first reliability operation by using the remaining check modules other than a first check module among a plurality of check modules, triggering a second reliability operation of the first memory block, and performing the second reliability operation by using the remaining check modules other than a second check module among the plurality of check modules. Each of the plurality of check modules performs one of a dummy read operation for an adjacent word-line of the first memory block, a dummy read operation for an arbitrary string selection line of the first memory block, a dummy read operation for a first weak word-line group of the first memory block, or a dummy read operation for a second weak word-line group of the first memory block.

According to an embodiment, an operation method of a storage controller configured to control a nonvolatile memory device includes triggering a first reliability operation of a first memory block included in the nonvolatile memory device and performing the first reliability operation by using the remaining check modules other than a first check module among a plurality of check modules, based on a first check module skip status. Each of the plurality of check modules performs one of a dummy read operation for an adjacent word-line of the first memory block, a dummy read operation for an arbitrary string selection line of the first memory block, a dummy read operation for a first weak word-line group of the first memory block, or a dummy read operation for a second weak word-line group of the first memory block. The first check module skip status includes information indicating that the first check module is a check module to be skipped.

According to an embodiment, an operation method of a storage controller configured to control a nonvolatile memory device includes performing a first reliability operation of a first memory block included in the nonvolatile memory device, and performing a second reliability operation of the first memory block included in the nonvolatile memory device. The first reliability operation includes performing a first dummy read operation associated with a first weak word-line group of the first memory block and skipping a second dummy read operation associated with a second weak word-line group of the first memory block. The second reliability operation includes performing a second dummy read operation associated with the second weak word-line group of the first memory block and skipping a first dummy read operation associated with the first weak word-line group of the first memory block.

BRIEF DESCRIPTION OF THE DRAWINGS

The above and other embodiments of the present disclosure will become apparent by describing in detail illustrative embodiments thereof with reference to the accompanying drawings.

FIG. 6 is a tabular diagram illustrating a first lookup table used by a storage controller of FIG. 1.

FIG. 9 is a tabular diagram illustrating a second lookup table used by a storage controller of FIG. 1.

FIG. 15 is a flowchart illustrating operation S1600 (i.e., an operation of updating a skip status for check module) of FIG. 14.

FIG. 16 is a diagram illustrating a skip status of a check module that is managed based on the flowchart of FIG. 15.

DETAILED DESCRIPTION

In the detailed description that follows, illustrative embodiments of the present disclosure will be described in by way of example with sufficient detail, clarity, and to such an extent as to enable those of ordinary skill in the pertinent art to implement or practice the invention.

Figure 1:
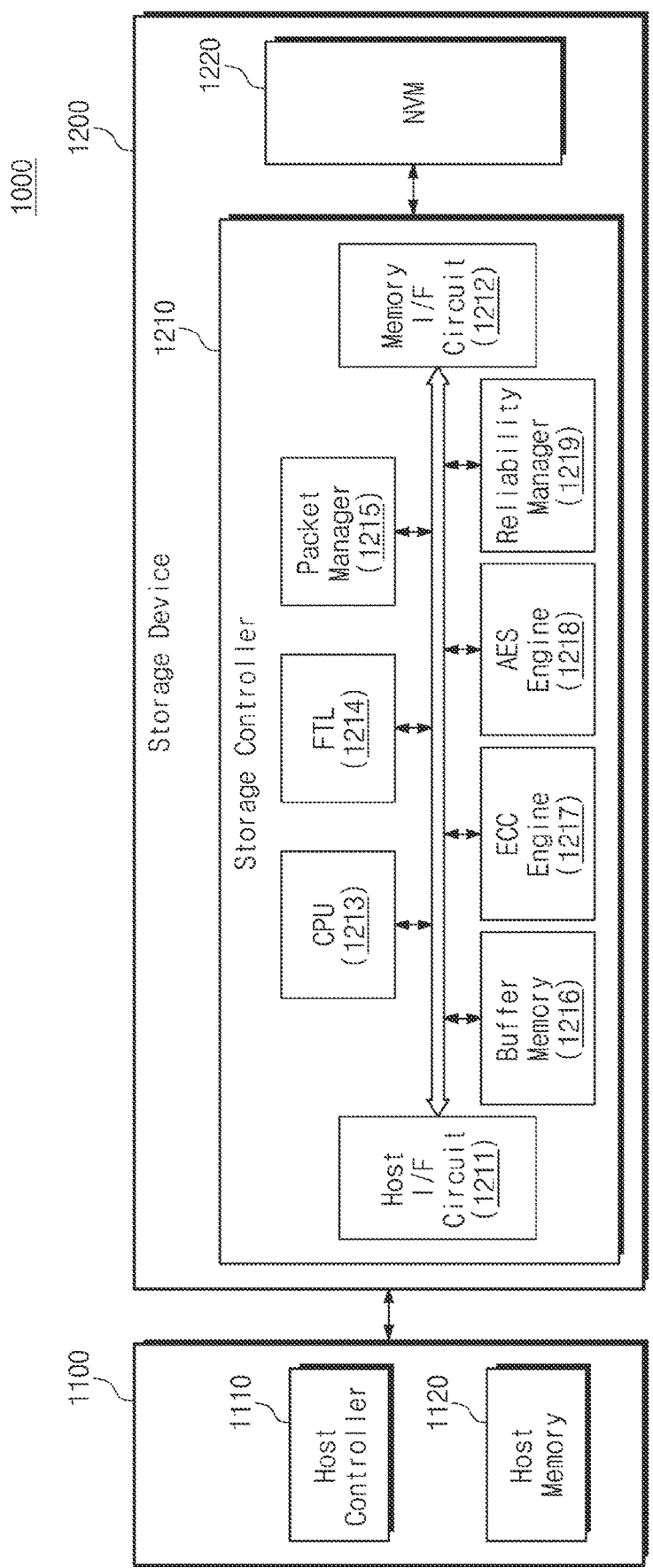
FIG. 1 is a block diagram illustrating a host-storage system according to an embodiment of the present disclosure.

FIG. 1 illustrates a host-storage system according to an embodiment of the present disclosure.

Referring to FIG. 1, a host-storage system 1000 may include a host 1100 and a storage device 1200. Also, the storage device 1200 may include a storage controller 1210 and a nonvolatile memory device (NVM) 1220. According to an embodiment of the present disclosure, the host 1100 may include a host controller 1110 and a host memory 1120. The host memory 1120 may function as a buffer memory for temporarily storing data to be transmitted to the storage device 1200 and/or data transmitted from the storage device 1200.

The storage device 1200 may include storage mediums for storing data depending on a request from the host 1100. As an example, the storage device 1200 may include at least one of a solid state drive (SSD), an embedded memory, and/or a removable external memory. In a case where the storage device 1200 includes an SSD, the storage device 1200 may be a device complying with the non-volatile memory express (NVMe) standard. In a case where the storage device 1200 includes an embedded memory or an external memory, the storage device 1200 may be a device complying with the universal flash storage (UFS) or embedded multi-media card (eMMC) standard. Each of the host 1100 and the storage device 1200 may generate a packet in compliance with a standard protocol applied thereto, and may transmit the generated packet.

When the nonvolatile memory device 1220 of the storage device 1200 includes a flash memory, the flash memory may include a two-dimensional (2D) NAND flash memory array or a three-dimensional (3D) (or vertical) NAND (VNAND) memory array, without limitation thereto. As another example, the storage device 1200 may be implemented with various kinds of nonvolatile memory devices. For example, the storage device 1200 may include a magnetic RAM (MRAM), a spin-transfer torque MRAM (STT-MRAM), a conductive bridging RAM (CBRAM), a ferroelectric RAM (FeRAM), a phase change RAM (PRAM), a resistive RAM (RRAM), and/or at least one of various kinds of other memories.

According to an embodiment, the host controller 1110 and the host memory 1120 may be implemented with separate semiconductor chips. Alternatively, the host controller 1110 and the host memory 1120 may be implemented in substantially the same semiconductor chip. As an example, the host controller 1110 may be one of a plurality of modules included in an application processor. In this case, the application processor may be implemented with a system on chip (SoC). Also, the host memory 1120 may be an embedded memory included in the application processor or may be a nonvolatile memory device or a memory module disposed outside of the application processor.

The host controller 1110 may manage an operation of storing data (e.g., write data) from a buffer area of the host memory 1120 into the nonvolatile memory device 1220 or storing data (e.g., read data) from the nonvolatile memory device 1220 into the buffer area.

The storage controller 1210 may include a host interface circuit 1211, a memory interface circuit 1212, and a central processing unit (CPU) 1213. Also, the storage controller 1210 may further include a flash translation layer (FTL) 1214, a packet manager 1215, a buffer memory 1216, an error correction code (ECC) engine 1217, an advanced encryption standard (AES) engine 1218, and a reliability manager 1219. The storage controller 1210 may further include a working memory to which the flash translation layer 1214 is loaded, and data write and read operations of the nonvolatile memory device 1220 may be controlled as the CPU 1213 executes the flash translation layer.

The host interface circuit 1211 may exchange packets with the host 1100. For example, a packet that is transmitted from the host 1100 to the host interface circuit 1211 may include a command, data to be written into the nonvolatile memory device 1220, or the like. A packet that is transmitted from the host interface circuit 1211 to the host 1100 may include a response to a command, data read from the nonvolatile memory device 1220, or the like. The memory interface circuit 1212 may provide the nonvolatile memory device 1220 with data to be written in the nonvolatile memory device 1220 or may receive data read from the nonvolatile memory device 1220. The memory interface circuit 1212 may be implemented in compliance with a standard such as Toggle or ONFI (Open NAND Flash Interface), without limitation thereto.

The flash translation layer 1214 may perform various functions or operations such as address mapping, wear-leveling, and garbage collection. The address mapping operation may refer to an operation of translating a logical address received from the host 1100 into a physical address to be used to actually store data within the nonvolatile memory device 1220. The wear-leveling may include technology for allowing blocks in the nonvolatile memory device 1220 to be used more uniformly such that excessive degradation of a specific block is prevented, and may be implemented, for example, through a firmware technology for balancing erase counts of physical blocks. The garbage collection may include technology for securing an available capacity of the nonvolatile memory device 1220 such as to erase an existing block after copying valid data of the existing block to a new block.

The packet manager 1215 may generate a packet in compliance with a protocol of an interface compatible or negotiated with the host 1100, or may parse various kinds of information from the packet received from the host 1100. Also, the buffer memory 1216 may temporarily store data to be written into the nonvolatile memory device 1220, or data read from the nonvolatile memory device 1220. The buffer memory 1216 may be a component provided within the storage controller 1210. Alternately, the buffer memory 1216 may be disposed outside of the storage controller 1210.

The ECC engine 1217 may perform an error detection and correction function on data read out from the nonvolatile memory device 1220. In detail, the ECC engine 1217 may generate parity bits for write data to be written into the nonvolatile memory device 1220, and the parity bits thus generated may be stored in the nonvolatile memory device 1220 together with the write data. When data are read from the nonvolatile memory device 1220, the ECC engine 1217 may correct an error of the read data by using the parity bits read from the nonvolatile memory device 1220 together with the read data and may output the error-corrected read data.

The AES engine 1218 may perform at least one of an encryption operation and/or a decryption operation on data input to the storage controller 1210 by using a symmetric-key algorithm, without limitation thereto.

In an embodiment, the storage controller 1210 may further include a reliability manager 1219. The reliability manager 1219 may perform or manage a reliability management operation (hereinafter referred to as a "reliability operation") for maintaining or guaranteeing the reliability of data stored in the nonvolatile memory device 1220. In an embodiment, the reliability operation may include various operations such as a random interval neighborhood check (RINC) algorithm and/or a patrol read operation.

For example, the data stored in the nonvolatile memory device 1220 may include an error due to various factors. The error in the data stored in the nonvolatile memory device 1220 may be detected or corrected through separate error correction circuitry or means (e.g., the ECC engine 1217 and/or various error correction operations). In this case, when the error in the data exceeds an error correction level correctable by the separate error correction circuitry or means, the reliability of data stored in the nonvolatile memory device 1220 might not be guaranteed. For example, the data stored in the nonvolatile memory device 1220 might be lost.

The reliability manager 1219 may monitor the data stored in the nonvolatile memory device 1220 at an interval selected from a given interval or an arbitrary interval or a random interval, without limitation. For example, at the selected interval, the reliability manager 1219 may determine the number of error bits included in a target memory block of the nonvolatile memory device 1220 or an error level of the target memory block, by reading the data stored in the target memory block and performing error detection and correction on the read data (e.g., by using the ECC engine 1217). When a level of the error of the data stored in the nonvolatile memory device 1220 is equal to or greater than a given level, the reliability manager 1219 may enhance or guarantee the reliability of the data by correcting the error of the data and storing the error-corrected data in another area of the nonvolatile memory device 1220 or in another nonvolatile memory device.

A non-optimal reliability operation may be performed based on the given interval. For example, a non-optimal storage device performs the reliability operation every given period. Because the physical characteristics of the plurality of memory blocks included in the nonvolatile memory device 1220 are different, the given interval may be determined to guarantee data reliability for the worst memory block. In this case, because the reliability operation is unnecessarily performed on normal memory blocks, the overall performance of the storage device 1200 may be reduced or non-optimal.

Based on a current state (e.g., an error level) of a memory block, a reliability manager 1219 according to the present embodiment may skip the reliability operation of a memory block or may actively change the interval of the reliability operation. In this case, because the number of times of performing the reliability operation for a memory block having a relatively low error level decreases, the non-optimal reduction of performance of the storage device 1200 may be prevented. The operation of the storage controller 1210 and/or the reliability manager 1219 according to embodiments of the present disclosure may be described in greater detail, infra.

Figure 2:
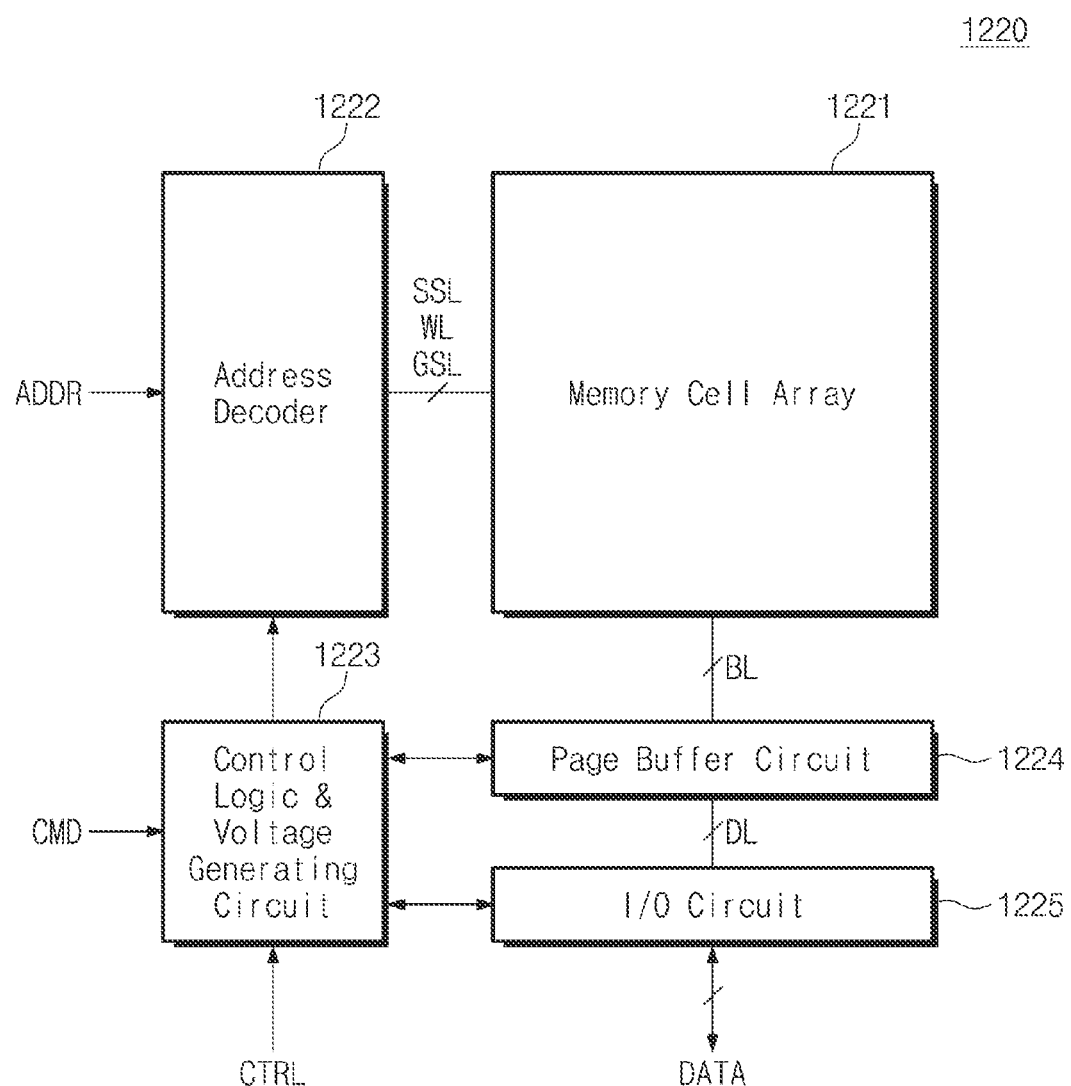
FIG. 2 is a block diagram illustrating a nonvolatile memory device of FIG. 1.

FIG. 2 illustrates a nonvolatile memory device of FIG. 1. Referring to FIGS. 1 and 2, the nonvolatile memory device 1220 may include a memory cell array 1221, an address decoder 1222, a control logic and voltage generating circuit 1223, a page buffer circuit 1224, and an input/output (I/O) circuit 1225.

The memory cell array 1221 may include a plurality of memory blocks. Each of the plurality of memory blocks may include a plurality of cell strings, each of which includes a plurality of cell transistors. The plurality of cell transistors may be connected in series between bit-lines BL and a common source line CSL and may be connected with string selection lines SSL, word-lines WL, and ground selection lines GSL. A structure of each of the plurality of memory blocks may be described in greater detail with reference to FIG. 3, infra.

The address decoder 1222 may be connected with the memory cell array 1221 through the string selection lines SSL, the word-lines WL, and the ground selection lines GSL. The address decoder 1222 may receive and decode an address ADDR from the storage controller 1210. The address decoder 1222 may control voltages of the string selection lines SSL, the word-lines WL, and the ground selection lines GSL based on the decoding result.

The control logic and voltage generating circuit (hereinafter referred to as a "control logic circuit") 1223 may control various components of the nonvolatile memory device 1220 in response to signals (e.g., a command CMD and a control signal CTRL) received from the storage controller 1210.

The control logic circuit 1223 may generate various operating voltages for the nonvolatile memory device 1220 to operate. For example, the control logic circuit 1223 may generate various operating voltages such as a plurality of program voltages, a plurality of pass voltages, a plurality of verify voltages, a plurality of read voltages, a plurality of non-selection read voltages, a plurality of erase voltages, and a plurality of erase verify voltages.

The page buffer circuit 1224 may be connected with the memory cell array 1221 through the bit-lines BL. The page buffer circuit 1224 may read data stored in the memory cell array 1221 by sensing voltage changes of the bit-lines BL. The page buffer circuit 1224 may store data in the memory cell array 1221 by controlling voltages of the bit-lines BL.

The input/output circuit 1225 may receive data "DATA" from the storage controller 1210 and may transmit the received data "DATA" to the page buffer circuit 1224. The input/output circuit 1225 may receive the data "DATA" from the page buffer circuit 1224 and may provide the received data "DATA" to the storage controller 1210.

Figure 3:
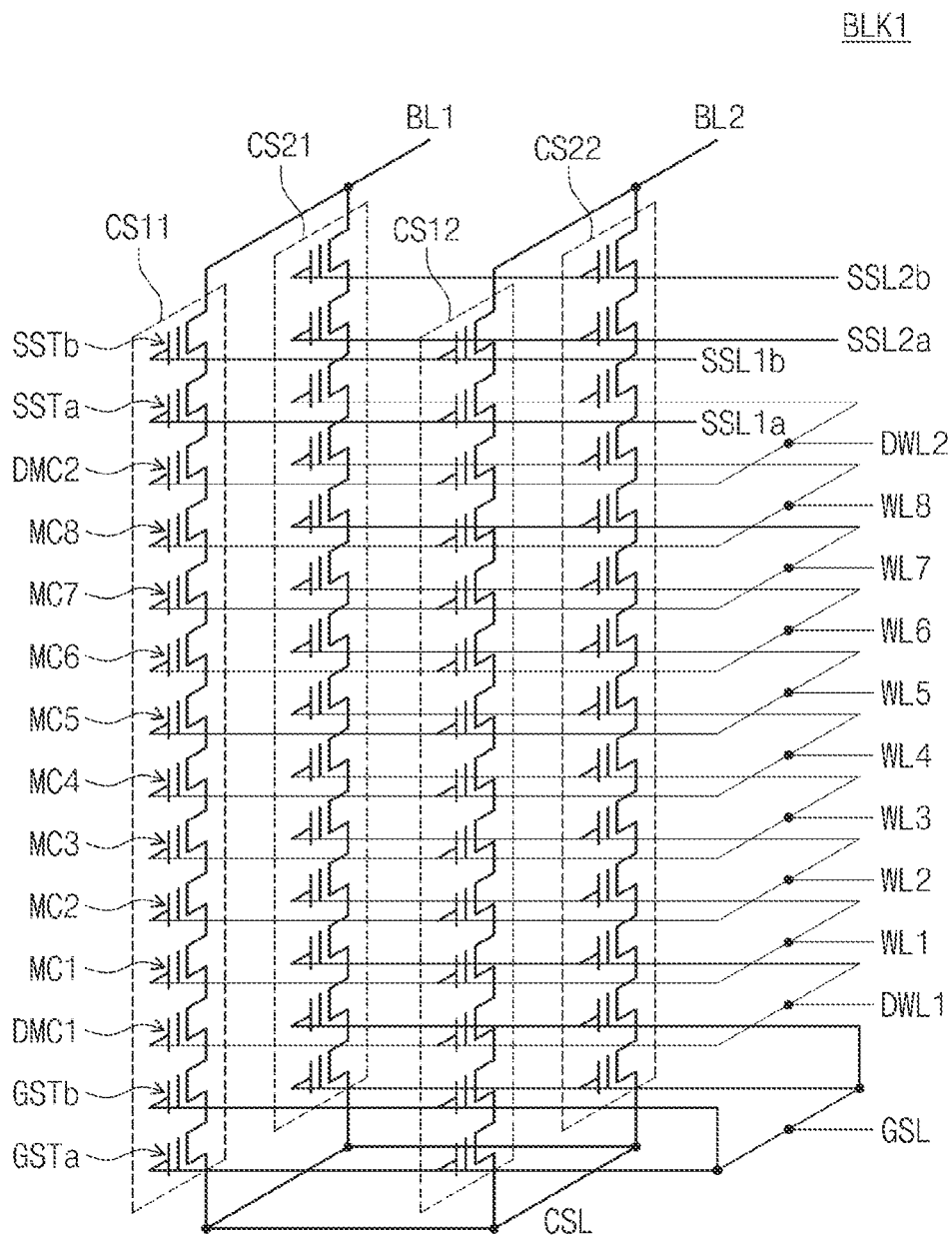
FIG. 3 is a circuit diagram illustrating a first memory block included in a memory cell array of FIG. 1.

FIG. 3 illustrates a first memory block included in a memory cell array of FIG. 1. A memory block of a three-dimensional structure will be described with reference to FIG. 3, but the present disclosure is not limited thereto. A memory block according to the present disclosure may have a two-dimensional memory block structure. A first memory block BLK1 will be described with reference to FIG. 3, but the present disclosure is not limited thereto. The remaining memory blocks may be similar in structure to the first memory block BLK1 to be described with reference to FIG. 3.

In an embodiment, the first memory block BLK1 to be described with reference to FIG. 3 may correspond to a physical erase unit of the memory device 1220. However, the present disclosure is not limited thereto. For example, the nonvolatile memory device 1220 may perform the erase operation in units of page, word-line, sub-block, or plane.

In an embodiment, the first memory block BLK1 to be described with reference to FIG. 3 may be a unit subject to the reliability operation that is performed by the storage controller 1210 or the reliability manager 1219 of FIG. 1. In other words, the storage controller 1210 or the reliability manager 1219 may perform the reliability operation on the first memory block BLK1, based on the selected interval. However, the present disclosure is not limited thereto. For example, the storage controller 1210 or the reliability manager 1219 may perform or manage the reliability operation in units of page, word-line, sub-block, single block, super block, plane, or the like.

Referring to FIGS. 2 and 3, the first memory block BLK1 may include a plurality of cell strings CS11, CS12, CS21, and CS22, each extending in a height direction. The plurality of cell strings CS11, CS12, CS21, and CS22 may be arranged in a row direction and a column direction to form rows and columns.

Each of the plurality of cell strings CS11, CS12, CS21, and CS22 includes a plurality of transistors stacked in the height direction. For example, each of the cell strings CS11, CS12, CS21, and CS22 may include string selection transistors SSTa and SSTb, a plurality of memory cells MC1 to MC8, ground selection transistors GSTa and GSTb, and dummy memory cells DMC1 and DMC2. In an embodiment, each of the plurality of memory cells included in the cell strings CS11, CS12, CS21, and CS22 may be a charge trap flash (CTF) memory cell.

In each cell string, the plurality of memory cells MC1 to MC8 are serially connected and are stacked in a height direction that may be a direction substantially perpendicular to either a plane defined by the row direction and the column direction or to a plane defined by a substrate, without limitation. In each cell string, the string selection transistors SSTa and SSTb are serially connected and are interposed between a bit-line BL1 or BL2 and the plurality of memory cells MC1 to MC8. In each cell string, the ground selection transistors GSTa and GSTb are connected in series between the plurality of memory cells MC1 to MC8 and the common source line CSL.

In an embodiment, in each cell string, the first dummy memory cell DMC1 may be disposed between the plurality of memory cells MC1 to MC8 and the ground selection transistors GSTa and GSTb. In an embodiment, the second dummy memory cell DMC2 may be disposed between the string selection transistors SSTa and SSTb and the plurality of memory cells MC1 to MC8.

The ground selection transistors GSTa and GSTb may be connected with the same ground selection line GSL. However, the present disclosure is not limited thereto. Ground selection transistors, which belong to the same row, from among the ground selection transistors GSTa or GSTb placed at substantially the same height, may be connected with the same ground selection line; and ground selection transistors, which belong to another row, from among the ground selection transistors GSTa or GSTb placed at substantially the same height, may be connected with another ground selection line. Alternatively, ground selection transistors at substantially same heights may be connected with the same ground selection line, and ground selection transistors at different heights may be connected with different ground selection line. Alternatively, ground selection transistors belonging to at least two rows from among ground selection transistors at substantially the same height may be connected with the same ground selection line, and ground selection transistors belonging to at least two other rows from among ground selection transistors at substantially the same height may be connected with another ground selection line. Alternatively, ground selection transistors at different heights may be connected with the same ground selection line. A connection relationship between the ground selection transistors GSTa and GSTb and the ground selection line GSL may be variously changed and/or modified.

Memory cells of substantially the same height from the substrate or the ground selection transistors GSTa and GSTb may be connected in common with the same word-line, and memory cells of different heights therefrom may be connected to different word-lines. For example, the memory cells MC1 to MC8 of the cell strings CS11, CS12, CS21, and CS22 may be connected with first to eighth word-lines WL1 to WL8, respectively.

String selection transistors from among the first string selection transistors SSTa of substantially the same height which belong to the same row are connected with the same string selection line. String selection transistors from among the first string selection transistors SSTa which belong to another row are connected with another string selection line, respectively. For example, the first string selection transistors SSTa of the cell strings CS11 and CS12 in the first row may be connected in common with a string selection line SSL1a, and the first string selection transistors SSTa of the cell strings CS21 and CS22 in the second row may be connected in common to a string selection line SSL2a.

Moreover, string selection transistors from among the second string selection transistors SSTb at substantially the same height which belong to the same row are connected with the same string selection line. String selection transistors from among the second string selection transistors SSTb which belong to another row are connected with another string selection line, respectively. For example, the second string selection transistors SSTb of the cell strings CS11 and CS12 in the first row are connected in common with a string selection line SSL1b, and the second string selection transistors SSTb of the cell strings CS21 and CS22 in the second row may be connected in common with a string selection line SSL2b.

In an embodiment, dummy memory cells of substantially the same height are connected with the same dummy word-line, and dummy memory cells of different heights are connected with different dummy word-lines, respectively. For example, the first dummy memory cells DMC1 are connected with a first dummy word-line DWL1, and the second dummy memory cells DMC2 are connected with a second dummy word-line DWL2.

In an embodiment, in each cell string, a first erase control transistor may be provided between the common source line CSL and at least one of the ground selection transistors GSTa and/or GSTb. In each cell string, a second erase control transistor may be provided between the respective bit-line BL1 or BL2 and at least one of the string selection transistors SSTa and/or SSTb. The first and second erase control transistors may be used to charge channels of the cell strings CS11, CS12, CS21, and CS22 with an erase voltage or to erase the first memory block BLK1, based on a gate induced drain leakage (GIDL) phenomenon, without limitation thereto. The first erase control transistors of the cell strings CS11, CS12, CS21, and CS22 may be connected in common with a first erase control line. The second erase control transistors of the cell strings CS11, CS12, CS21, and CS22 may be connected in common with a second erase control line. However, the present disclosure is not limited thereto. For example, the first and second erase control transistors of the cell strings CS11, CS12, CS21, and CS22 may be connected with different erase control lines through various manners such as described above.

In an embodiment, the first memory block BLK1 illustrated in FIG. 3 is provided as an example. The number of cell strings may increase or decrease, and the number of rows of cell strings and the number of columns of cell strings may each increase or decrease depending on the number of cell strings, for example. Also, the number of cell transistors (e.g., GST, MC, DMC, and SST) of the first memory block BLK1 may increase or decrease, and the height of the first memory block BLK1 may increase or decrease depending on the number of cell transistors. In addition, the number of lines (e.g., GSL, WL, DWL, and SSL) connected with the cell transistors may increase or decrease depending on the number of cell transistors.

Figure 4:
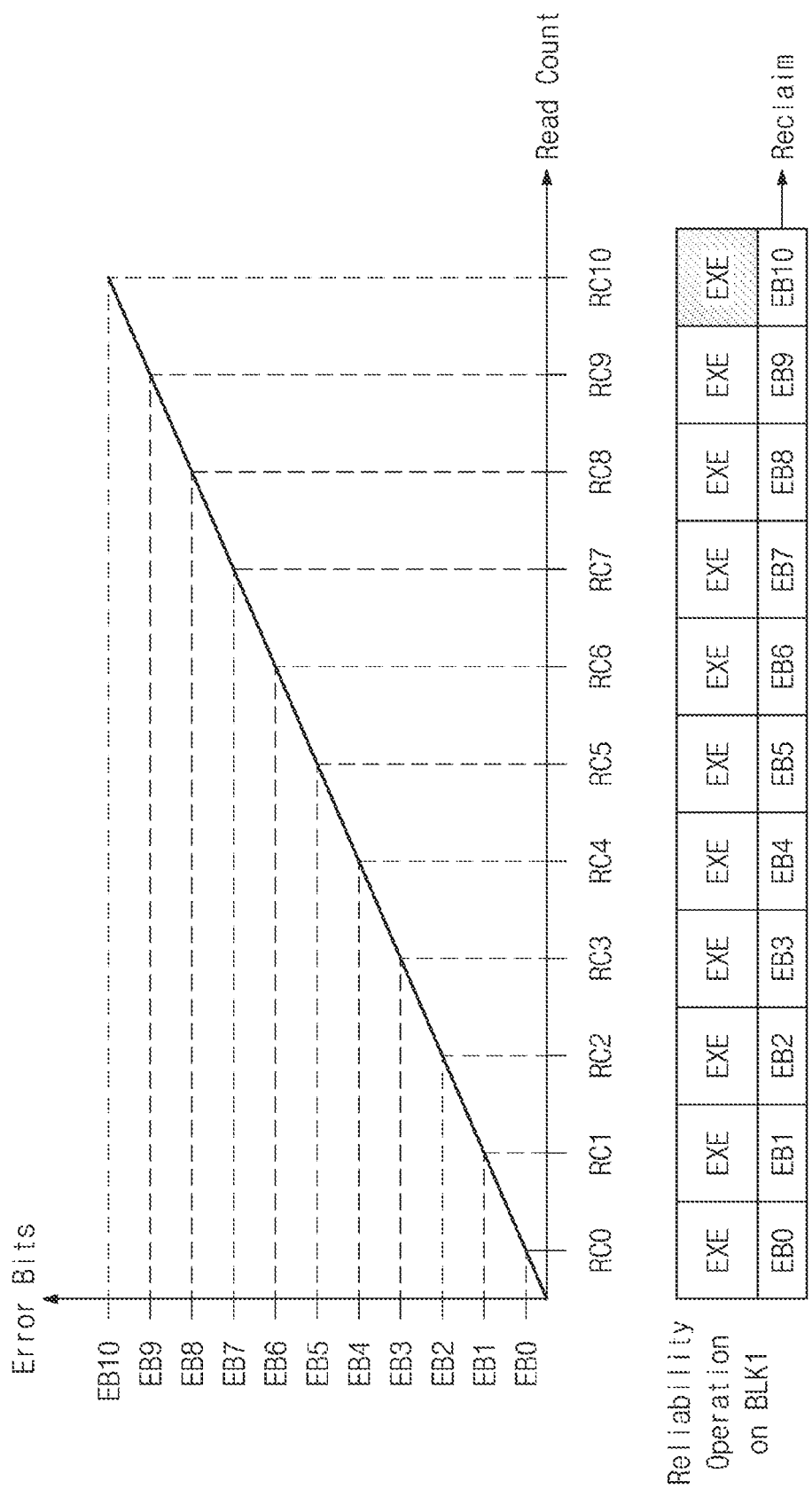
FIG. 4 is a hybrid diagram for describing an operation an operating characteristic and a reliability operation of a first memory block of FIG. 3.

FIG. 4 is used for describing an operation, an operating characteristic and a reliability operation of a first memory block of FIG. 3. In the graph portion of FIG. 4, a horizontal axis represents a read count of the first memory block BLK1, and a vertical axis represents the number of error bits occurring in the first memory block BLK1. In an embodiment, the read count may indicate the number of times that a read operation is performed on the first memory block BLK1.

In the below-described embodiment, for convenience of description, it may be assumed that a ratio of the read count of the first memory block BLK1 and error bits are linear. However, the present disclosure is not limited thereto. For example, a ratio of an actual read count and actual error bits may be non-linear depending on the physical characteristics and/or a degradation state of the first memory block BLK1, without limitation thereto.

In addition, the number of error bits detected through the reliability operation of the first memory block BLK1 may be referred to as "error information". For example, the storage controller 1210 may perform the reliability operation on the first memory block BLK1 to obtain the error information indicating the number of error bits included in the first memory block BLK1, without limitation thereto.

Moreover, it may be assumed that the reliability manager 1219 of the storage controller 1210 performs the reliability operation on the first memory block BLK1 depending on the given interval (e.g., uniform interval). However, the present disclosure is not limited thereto. For example, the reliability operation may be performed on the first memory block BLK1 non-periodically, depending on the operating state of the storage device 1200. As an example, the reliability operation may be performed on the first memory block BLK1 at arbitrary intervals or random intervals. In this case, an average of the arbitrary intervals may correspond to the given interval, without limitation thereto.

Referring to FIGS. 1 to 4, the storage controller 1210 may repeatedly perform the read operation on the first memory block BLK1, and thus, the read count of the first memory block BLK1 may increase. In this case, error bits of the first memory block BLK1 may increase, such as due to read disturbances associated with the repeatedly performed read operation.

To guarantee the reliability of data stored in the first memory block BLK1, the storage controller 1210 or the reliability manager 1219 may perform the reliability operation at the given interval. For example, when the number of times that the read operation of the first memory block BLK1 has been repeated matches a 0-th read count RC0, the storage controller 1210 or the reliability manager 1219 may perform the reliability operation on the first memory block BLK1. In this case, 0-th error information EB0 of the first memory block BLK1 may be obtained.

Moreover, the storage controller 1210 or the reliability manager 1219 may perform the reliability operation when the number of times that the read operation of the first memory block BLK1 has been repeated reaches first to tenth read counts RC1 to RC10 of the first memory block BLK1. As the reliability operation is performed at each of the first to tenth read counts RC1 to RC10, first to tenth error information EB1 to EB10 of the first memory block BLK1 may be obtained, respectively.

In an embodiment, through the reliability operation performed at the tenth read count RC10 of the first memory block BLK1, it may be determined that the first memory block BLK1 includes error bits corresponding to the tenth error information EB10. In this case, the number of error bits corresponding to the tenth error information EB10 may correspond to a level exceeding a reclaim reference of the first memory block BLK1, above which level the block may be reclaimed. As such, the reliability manager 1219 may correct an error of the data stored in the first memory block BLK1 and may program the corrected data in another memory block. A series of operations as described above may be called a "reclaim operation".

As described above, the reliability manager 1219 may determine the error level of the first memory block BLK1 by performing the reliability operation on the first memory block BLK1 every given interval; when the error level exceeds a preset threshold value, the reliability manager 1219 may perform the reclaim operation on the first memory block BLK1. In this case, because the unnecessary reliability operation is repeatedly performed until the reclaim operation of the first memory block BLK1 is determined, the overall performance of the storage device 1200 may be reduced.

Figure 5:
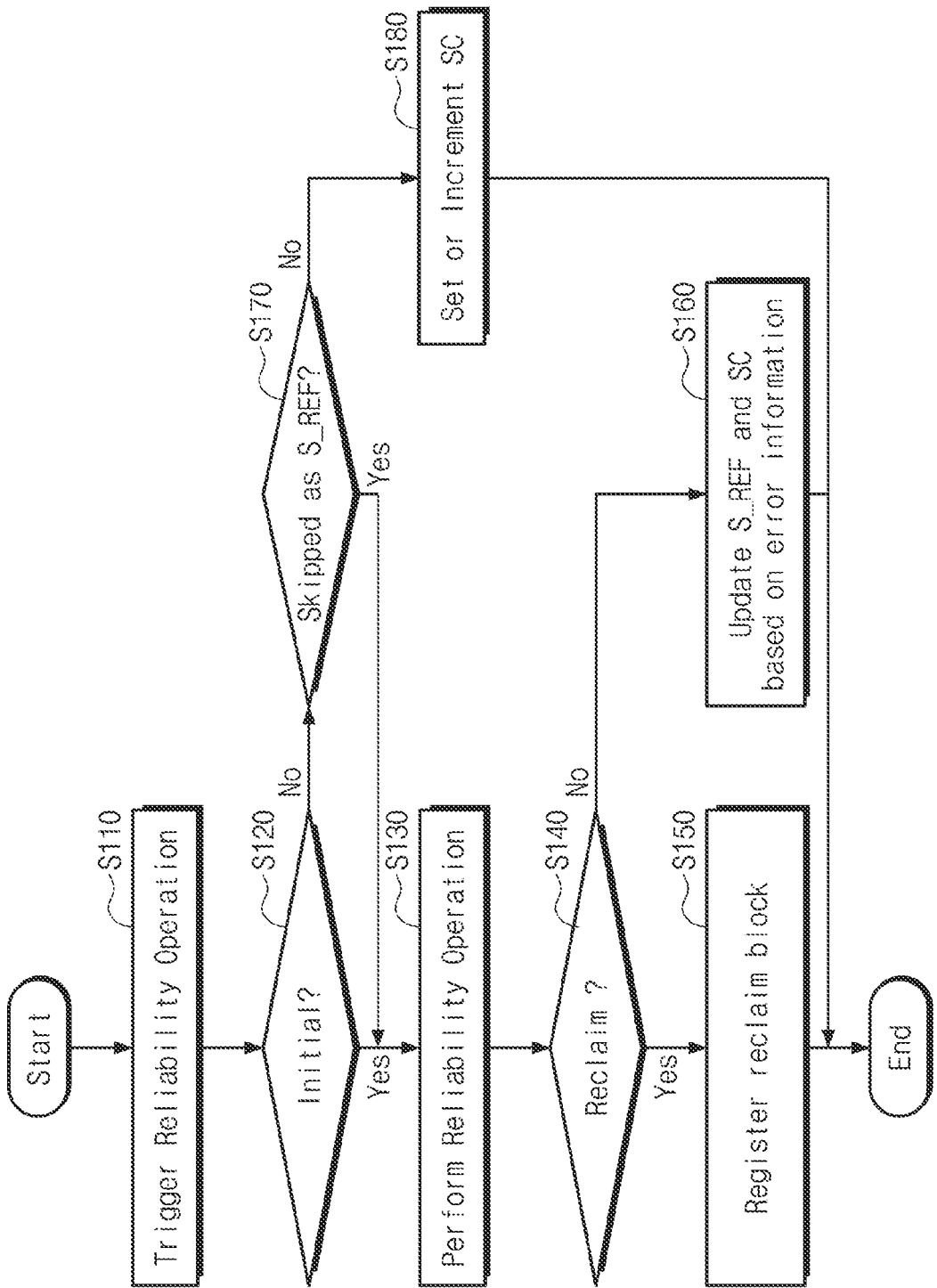
FIG. 5 is a flowchart diagram illustrating an operation of a storage controller of FIG. 1.

FIG. 5 illustrates an operation of a storage controller of FIG. 1. FIG. 6 illustrates a first lookup table used by a storage controller of FIG. 1.

In the below-described embodiment, for convenience of description, the description will be given as the storage controller 1210 performs and manages the reliability operation of the first memory block BLK1 such as in the flowchart of FIG. 5. However, the present disclosure is not limited thereto. For example, the operation according to the flowchart of FIG. 5 may be performed by the storage controller 1210 or the reliability manager 1219 included in the storage controller 1210. Moreover, the operation that will be described with reference to FIG. 5 may be similarly applied to the remaining memory blocks.

Referring to FIGS. 1, 5, and 6, in step S110, the storage controller 1210 may trigger the reliability operation. For example, when the read count of the first memory block BLK1 reaches a given interval, the storage controller 1210 may initiate the reliability operation of the first memory block BLK1. Alternatively, when the read count of the first memory block BLK1 reaches an arbitrary read count, the storage controller 1210 may initiate the reliability operation of the first memory block BLK1.

In step S120, the storage controller 1210 may determine whether the reliability operation of the first memory block BLK1 is an initial or first reliability operation. For example, the storage controller 1210 may determine whether the initiated reliability operation is being performed for the first time after the data are programmed in the first memory block BLK1.

When the initiated reliability operation of the first memory block BLK1 is the first reliability operation, in step S130, the storage controller 1210 may perform the reliability operation on the first memory block BLK1. For example, the storage controller 1210 may read at least a portion of the data stored in the first memory block BLK1 and may detect an error of the read data. Alternatively, the storage controller 1210 may check a state of at least one of the plurality of lines (e.g., SSL, WL, and GSL) included in the first memory block BLK1.

In step S140, the storage controller 1210 may determine whether the reclaim operation of the first memory block BLK1 should be performed. For example, when the number of error bits or an error level detected in step S130 is a given threshold value or more, the storage controller 1210 may determine that the first memory block BLK1 is degraded. In this case, the reclaim operation of the first memory block BLK1 may be performed.

When the reclaim operation of the first memory block BLK1 is performed, in step S150, the storage controller 1210 may register the first memory block BLK1 as a reclaim block. In an embodiment, during a specific time (e.g., an idle time), the storage controller 1210 may perform the reclaim operation on the first memory block BLK1.

When the reclaim operation of the first memory block BLK1 is not performed, in step S160, the storage controller 1210 may update a skip reference value S_REF and/or a skip count SC based on error information of the first memory block BLK1.

For example, the storage controller 1210 may set a skip state of the first memory block BLK1, based on the degradation or error level of the first memory block BLK1, such as in a first lookup table LUT1 of FIG. 6. In detail, as illustrated in the first lookup table LUT1 of FIG. 6, when the error information of the first memory block BLK1 or the number of error bits of the first memory block BLK1 is included in a first error range EBR1, the first memory block BLK1 is set to a first skip state SS1. When the error information of the first memory block BLK1 or the number of error bits of the first memory block BLK1 is included in a second error range EBR2, the first memory block BLK1 is set to a second skip state SS2; when the error information of the first memory block BLK1 or the number of error bits of the first memory block BLK1 is included in a third error range EBR3, the first memory block BLK1 is set to a third skip state SS3; when the error information of the first memory block BLK1 or the number of error bits of the first memory block BLK1 is included in a fourth error range EBR4, the first memory block BLK1 is set to a fourth skip state SS4; and, when the error information of the first memory block BLK1 or the number of error bits of the first memory block BLK1 is included in a fifth error range EBR5, the first memory block BLK1 is set to a fifth skip state SS5. Skip reference values S_REF1, S_REF2, S_REF3, S_REF4, and S_REF5 may be set, respectively corresponding to the skip states SS1, SS2, SS3, SS4, and SS5. In an embodiment, each of the skip reference values S_REF1, S_REF2, S_REF3, S_REF4, and S_REF5 may be used to determine the maximum number of times capable of being skipped in a next reliability operation.

In an embodiment, when the error level of the first memory block BLK1 is relatively low (e.g., when the number of error bits is relatively small), the skip reference value may be relatively great; when the error level of the first memory block BLK1 is relatively high (e.g., when the number of error bits is relatively great), the skip reference value may be relatively small.

In an embodiment, a case where the skip reference value is relatively great may have substantially the same effect as a case where the interval of the reliability operation is relatively long. This may be described in greater detail, infra, with reference to the drawings.

Returning to FIG. 5, when the determination in step S120 indicates that the reliability operation is not the first or initial reliability operation, in step S170, the storage controller 1210 may determine whether the reliability operation of the first memory block BLK1 has been skipped as much as the skip reference value S_REF. When the reliability operation of the first memory block BLK1 has been skipped as much as the skip reference value S_REF, the storage controller 1210 may perform step S130 (e.g., may perform the reliability operation).

When the reliability operation of the first memory block BLK1 has not been skipped as much as the skip reference value S_REF, in step S180, the storage controller 1210 may set or increment the skip count SC of the first memory block BLK1.

In an embodiment, at step S170 and step S180, determining whether the reliability operation has been skipped as much as the skip reference value S_REF and, if not, setting or incrementing of the skip count SC, may be implemented in various ways.

For example, in step S160, the skip reference value S_REF of the first memory block BLK1 may be set, and the skip count SC may be set or reset to "0", without limitation thereto. Afterwards, the reliability operation of the first memory block BLK1 may be initiated. When the skip count SC has not reached the skip reference value S_REF, the storage controller 1210 may skip the reliability operation of the first memory block BLK1 and may increase or increment the skip count SC such as by as much as "1", without limitation. For example, the storage controller 1210 may increase the skip count SC by "1" whenever the reliability operation of the first memory block BLK1 is skipped. Afterwards, when the skip count SC reaches the skip reference value S_REF, the storage controller 1210 may perform the reliability operation on the first memory block BLK1 and set or reset the skip count SC to "0".

Alternatively, in step S160, the skip reference value S_REF of the first memory block BLK1 may be determined, and the skip count SC may be set to the determined skip reference value S_REF. Afterwards, the reliability operation of the first memory block BLK1 may be initiated. When the skip count SC of the first memory block BLK1 is not "0", the storage controller 1210 may skip the reliability operation of the first memory block BLK1 and may decrease the skip count SC by as much as "1". For example, the storage controller 1210 may decrease the skip count SC by as much as "1" whenever the reliability operation of the first memory block BLK1 is skipped. Afterwards, when the skip count SC reaches "0", the storage controller 1210 may perform the reliability operation on the first memory block BLK1 and set or reset the skip count SC to the determined skip reference value S_REF.

In the below-described embodiment, for convenience of description, it may be assumed that the storage controller 1210 increases the skip count SC by as much as "1" whenever the reliability operation of the first memory block BLK1 is skipped. However, the present disclosure is not limited thereto. For example, the storage controller 1210 may manage the number of times to skip the reliability operation of the first memory block BLK1 by using various schemes and may manage the reliability operation of the first memory block BLK1 by using various schemes such that the reliability operation of the first memory block BLK1 is skipped as much as indicated by the skip reference value S_REF.

As described above, the storage controller 1210 may set or manage the skip reference value of the first memory block BLK1 based on the degradation state or the error level of the first memory block BLK1. In this case, the storage controller 1210 may skip the reliability operation of the first memory block BLK1 as much as the number of times corresponding to a skip reference value set with respect to the first memory block BLK1. Accordingly, as the number of times of performing the reliability operation of the first memory block BLK1 decreases, the overall performance of the storage device 1200 may be improved.

Figure 7:
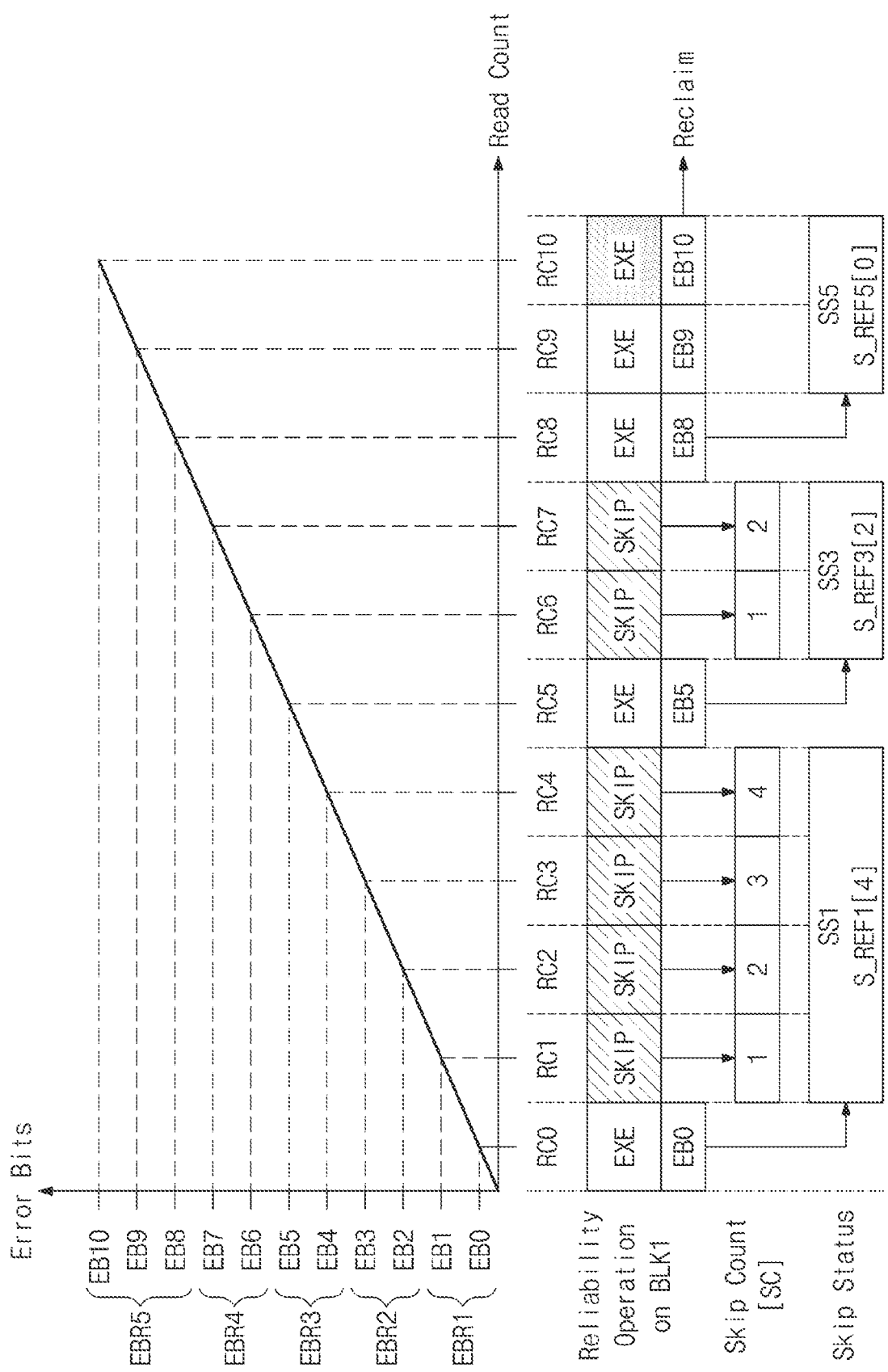
FIG. 7 is a hybrid diagram for describing an operation of a storage controller according to the flowchart of FIG. 5.

FIG. 7 is used for describing an operation of a storage controller according to the method of FIG. 5. In the graph of FIG. 7, a horizontal axis represents a read count of the first memory block BLK1, and a vertical axis represents a number of error bits of the first memory block BLK1.

In the below-described embodiment, for convenience of description, the description will be given with reference to a configuration for performing and managing the reliability operation of the first memory block BLK1. However, the present disclosure is not limited thereto. For example, the storage controller 1210 may manage or perform the reliability operation on the remaining memory blocks, or super blocks in a similar scheme.

In an embodiment, it may be assumed that a threshold value for the reclaim operation is substantially equal to the tenth error information EB10. For example, when the number of error bits of the first memory block BLK1 is greater than or equal to the tenth error information EB10, the first memory block BLK1 may be registered as a reclaim block, or the reclaim operation may be performed on the first memory block BLK1.

Referring to FIGS. 1 and 5 to 7, the storage controller 1210 may trigger the reliability operation of the first memory block BLK1 at each of the 0-th to tenth read counts RC0 to RC10 of the first memory block BLK1. In this case, the storage controller 1210 may skip some reliability operations based on the method described with reference to FIG. 5.

For example, because the reliability operation associated with the 0-th read count RC0 is the initial reliability operation, the storage controller 1210 may perform the initial reliability operation on the first memory block BLK1. As a result of the initial reliability operation, the storage controller 1210 may detect the initial error information EB0. The initial error information EB0 may be included in the first error range EBR1. In this case, based on the first lookup table LUT1, the storage controller 1210 may set the skip state of the first memory block BLK1 to the first skip state SS1 and may set the first skip reference value S_REF1 corresponding to the first skip state SS1. In an embodiment, the first skip reference value S_REF1 may be "4", without limitation thereto. In an embodiment, when the skip state or the skip reference value is updated, the skip count SC may be reset to "0".

Afterwards, at the first read count RC1, the storage controller 1210 may compare the first skip reference value S_REF1 with the skip count SC. At the first read count RC1, because the skip count SC is smaller than the first skip reference value S_REF1, the storage controller 1210 may skip the reliability operation of the first memory block BLK1. In this case, the storage controller 1210 may increase the skip count SC by "1" for example, and as a result, the skip count SC may be "1".

Afterwards, at each of the second to fourth read counts RC2 to RC4, the storage controller 1210 may compare the first skip reference value S_REF1 with the skip count SC. At each of the second to fourth read counts RC2 to RC4, because the skip count SC is smaller than the first skip reference value S_REF1, the storage controller 1210 may skip the reliability operation of the first memory block BLK1. In this case, at each of the second to fourth read counts RC2 to RC4, the storage controller 1210 may increase the skip count SC by "1", and thus, the skip count SC may be sequentially set to "2", "3", and "4".

Afterwards, at the fifth read count RC5, the storage controller 1210 may compare the first skip reference value S_REF1 with the skip count SC. At the fifth read count RC5, the skip count SC may be substantially equal to the first skip reference value S_REF1. In this case, the storage controller 1210 may perform the reliability operation on the first memory block BLK1 and detect the fifth error information EB5. The fifth error information EB5 may be included in the third error range EBR3. In this case, based on the first lookup table LUT1, the storage controller 1210 may set the skip state of the first memory block BLK1 to the third skip state SS3 and may set the third skip reference value S_REF3 corresponding to the third skip state SS3. In an embodiment, the third skip reference value S_REF3 may be "2". In an embodiment, when the reliability operation is performed on the first memory block BLK1, the skip count SC associated with the first memory block BLK1 may be reset to "0".

Afterwards, at each of the sixth and seventh read counts RC6 and RC7, the storage controller 1210 may compare the third skip reference value S_REF3 with the skip count SC. At each of the sixth and seventh read counts RC6 and RC7, because the skip count SC is smaller than the third skip reference value S_REF3, the storage controller 1210 may skip the reliability operation of the first memory block BLK1. In this case, the storage controller 1210 may increase the skip count SC by "1", and thus, the skip count SC may be sequentially set to "1" and "2".

At the eighth read count RC8, the storage controller 1210 may compare the third skip reference value S_REF3 with the skip count SC. Here, the skip count SC may be substantially equal to the third skip reference value S_REF3. In this case, the storage controller 1210 may perform the reliability operation on the first memory block BLK1. As a result of the reliability operation, the storage controller 1210 may detect the eighth error information EB8. The eighth error information EB8 may be included in the fifth error range EBR5. In this case, based on the first lookup table LUT1, the storage controller 1210 may set the skip state of the first memory block BLK1 to the fifth skip state SS5 and may set the fifth skip reference value S_REF5 corresponding to the fifth skip state SS5. In an embodiment, it may be assumed that the fifth skip reference value S_REF5 is "0". In an embodiment, when the reliability operation is performed on the first memory block BLK1, the skip count SC associated with the first memory block BLK1 may be reset.

In an embodiment, when the skip reference value thus set is "O", the storage controller 1210 need not skip the following reliability operations of the first memory block BLK1. For example, at the ninth read count RC9, the storage controller 1210 may perform the reliability operation on the first memory block BLK1 and may detect the ninth error information EB9 as a result of the reliability operation; at the tenth read count RC10, the storage controller 1210 may perform the reliability operation on the first memory block BLK1 and may detect the tenth error information EB10 as a result of the reliability operation.

In an embodiment, because the tenth error information EB10 is a value of a reclaim threshold value or more, the storage controller 1210 may register the first memory block BLK1 as a reclaim block or may perform the reclaim operation on the first memory block BLK1.

According to the embodiment of FIG. 4, the storage controller 1210 performs the reliability operation for each of the 0-th to tenth read counts RC0 to RC10 of the first memory block BLK1, and thus, the storage controller 1210 may perform the reliability operation eleven times. In contrast, according to the embodiment of FIG. 7, the storage controller 1210 performs the reliability operation four times with regard to the 0-th to tenth read counts RC0 to RC10 of the first memory block BLK1. In this case, in a period (e.g., a period from RC8 to RC10) in which whether to perform the reclaim operation is capable of being actually determined, because the reliability operation is not skipped, the reclaim operation may be determined stably or reliably by the reliability operation. For example, when error information obtained by the reliability operation exceeds a given reference value (e.g., exceeds the eighth error information EB8, the given reference value being smaller than the reclaim threshold value), the skip reference value S_REF may be set to "0", and thus, the following reliability operation(s) may be performed without skipping. As some reliability operations are skipped based on the degradation state or the error level of the first memory block BLK1, the total number of times of execution of the reliability operation may decrease. Accordingly, overhead due to the reliability operation may decrease, and thus, a reduction of overall performance of the storage device 1200 may be prevented.

In the above embodiment, with respect to the first reliability operation of the first memory block BLK1, a skip reference value is set without comparing a skip count and a skip reference value, but the present disclosure is not limited thereto. For example, the initial or first skip reference value of the first memory block BLK1 may be set in advance. In this case, the initial skip reference value may be set differently depending on the degree of wear-leveling (e.g., the number of program/erase cycles, temperature, physical location, environmental parameters, or the like) of the first memory block BLK1. For example, as the number of program/erase cycles of the first memory block BLK1 increases, the initial skip reference value may become smaller.

Figure 8:
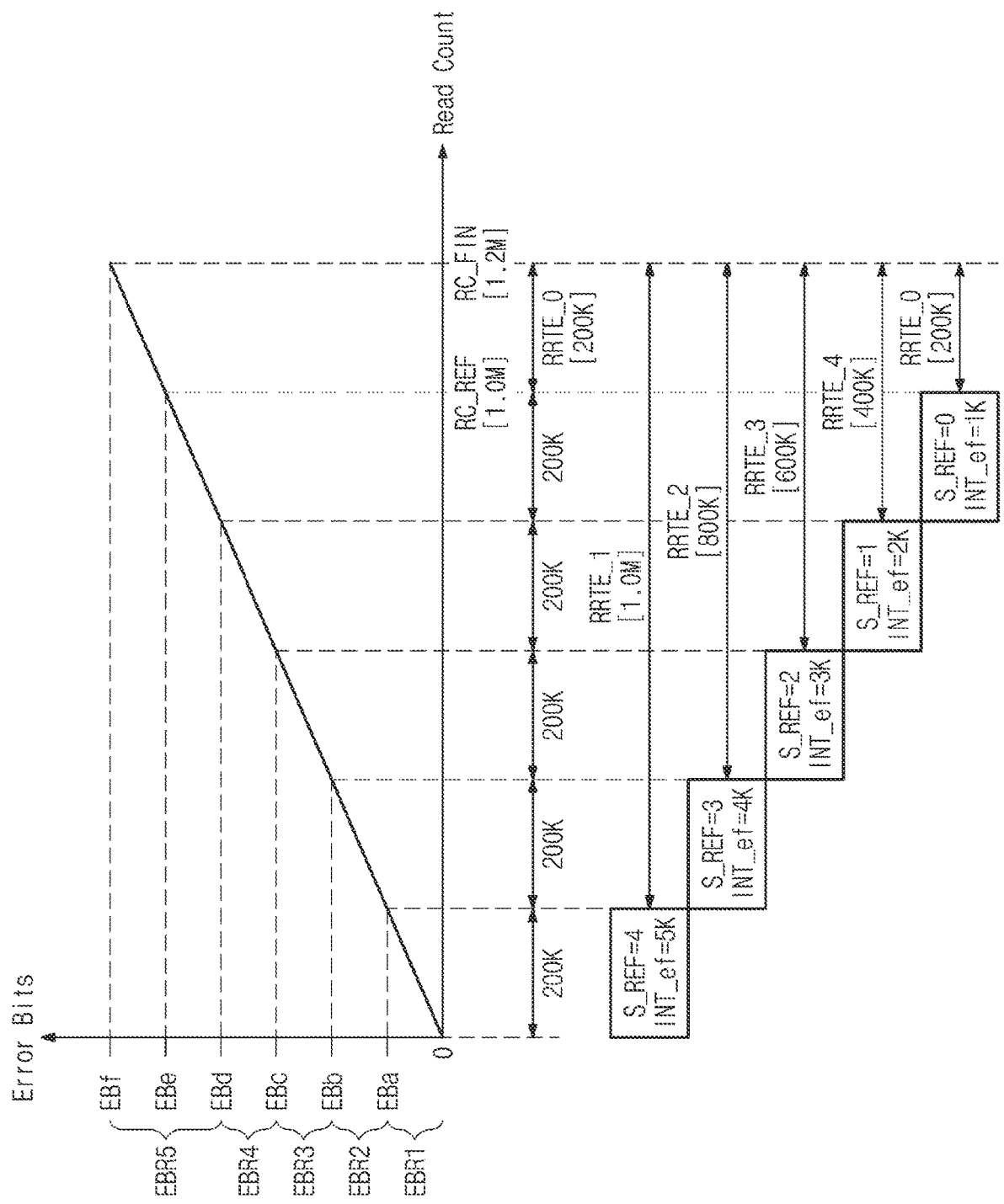
FIG. 8 is a hybrid diagram for describing a reference of setting a first lookup table of FIG. 6.

FIG. 8 is used by way of example for describing a reference of setting a first lookup table of FIG. 6. In an embodiment, the operation to be described with reference to FIG. 8 may be associated with a method of determining the number of reliability operations capable of being skipped in a state where the reliability of the first memory block BLK1 is guaranteed. Numerical values to be described with reference to FIG. 8 may be provided as examples, and the present disclosure is not limited thereto.

Referring to FIG. 8, a reference read value RC_REF of the first memory block BLK1 may be 1.0M. For example, according to a linear model illustrated in FIG. 8, when the read operation is performed on the first memory block BLK1 as many times as the reference read value RC_REF, the first memory block BLK1 may include error bits as much as an e-th error information EBe. When the first memory block BLK1 includes error bits as much as the e-th error information EBe, the reclaim operation of the first memory block BLK1 may be performed.

In an ideal case, when the reliability operation of the first memory block BLK1 is performed at the reference read value RC_REF, the reclaim operation may be normally performed on the first memory block BLK1. However, in the actual implementation of the storage device 1200, the reliability operation of the first memory block BLK1 need not be performed at the reference read value RC_REF and may be delayed by as much as an arbitrary read count.

In this case, a maximum delay period, where the reliability operation of the first memory block BLK1 is delayed, may be expressed by Equation 1 as set forth below.

$$RRTE = INT \times RN \times MAX \quad \text{[Equation 1]}$$

Referring to Equation 1, a read reclaim trigger error RRTE may indicate a read count period (hereinafter referred to as a "delay period") in which reclaim determination for the first memory block BLK1 is delayed, and INT may indicate an interval at which the reliability operation of the first memory block BLK1 is performed, RN may indicate a random interval neighborhood check (RINC) constant, and MAX may indicate the number of memory blocks targeted for the reliability operation from among a plurality of memory blocks included in the storage device 1200.

In an embodiment, it may be assumed that the interval INT of the reliability operation is 1K; in this case, it may be assumed that a 0-th delay period RRTE_0 is 200K. In this case, the reliability operation of the first memory block BLK1 may be performed at least before a final read count RC_FIN (1.2M) at which the 0-th delay period RRTE_0 passes from the reference read value RC_REF, and the reclaim operation of the first memory block BLK1 may be performed. For example, when the interval INT of the reliability operation is 1K, to guarantee the reliability of data stored in the first memory block BLK1, the execution of the reliability operation should be guaranteed between the reference read value RC_REF (1.0M) and the final read count RC_FIN (1.2M).

According to embodiments of the present disclosure, a plurality of skip states SS1 to SS5 may be defined by inversely calculating read counts from the reference read count RC_REF based on the 0-th delay period RRTE_0. For example, according to the example illustrated in FIG. 8, five skip states may be defined. In this case, a read count period from 0 to 200K may correspond to the first error range EBR1, a read count period from 200K to 400K may correspond to the second error range EBR2, a read count period from 400K to 600K may correspond to the third error range EBR3, a read count period from 600K to 800K may correspond to the fourth error range EBR4, and a read count period from 800K to 1.0M may correspond to the fifth error range EBR5.

When the degradation level of the first memory block BLK1 or the number of error bits of the first memory block BLK1 is included in the first error range EBR1, the storage controller 1210 may set the skip reference value S_REF to "4". For example, when the degradation level of the first memory block BLK1 or the number of error bits of the first memory block BLK1 is included in the first error range EBR1, the storage controller 1210 may skip the reliability operation four times after setting the skip reference value S_REF to "4.". In this case, when the reference interval of the reliability operation is 1K, the reliability operation may be skipped four times, and thus, an effective interval such as INT_ef for the reliability operation may be 5K.

When the degradation level of the first memory block BLK1 or the number of error bits of the first memory block BLK1 is included in the second error range EBR2, the storage controller 1210 may set the skip reference value S_REF to "3", and the storage controller 1210 may skip the reliability operation three times after the skip reference value S_REF to "3." In this case, when the reference interval of the reliability operation is 1K, the reliability operation may be skipped three times, and thus, the effective interval INT_ef for the reliability operation may be 4K.

When the degradation level of the first memory block BLK1 or the number of error bits of the first memory block BLK1 is included in the third error range EBR3, the storage controller 1210 may set the skip reference value S_REF to "2", and the storage controller 1210 may skip the reliability operation twice after the skip reference value S_REF to "2." In this case, when the reference interval of the reliability operation is 1K, the reliability operation may be skipped two times, and thus, the effective interval INT_ef for the reliability operation may be 3K.

When the degradation level of the first memory block BLK1 or the number of error bits of the first memory block BLK1 is included in the fourth error range EBR4, the storage controller 1210 may set the skip reference value S_REF to "1", and the storage controller 1210 may skip the reliability operation once after the skip reference value S_REF to "1." In this case, when the reference interval of the reliability operation is 1K, the reliability operation may be skipped once, and thus, the effective interval INT_ef for the reliability operation may be 2K.

When the degradation level of the first memory block BLK1 or the number of error bits of the first memory block BLK1 is included in the fifth error range EBR5, the storage controller 1210 may set the skip reference value S_REF to "0", and the storage controller 1210 need not skip the reliability operation after performing the reliability operation on the first memory block BLK1. In this case, when the reference interval of the reliability operation is 1K, because the reliability operation is not skipped, the effective interval INT_ef for the reliability operation may be 1K.

In an embodiment, as expressed by Equation 1 above, the delay period RRTE is proportional to the interval INT of the reliability operation. For example, as the interval INT of the reliability operation increases, the delay period RRTE may increase. In this case, as described above, when the reliability operation is skipped, the effective interval for the reliability operation may increase depending on the number of times that the reliability operation is skipped. For example, as the number of times that the reliability operation is skipped increases, the relevant delay period RRTE may increase.

For example, when the degradation level of the first memory block BLK1 or the number of error bits of the first memory block BLK1 is included in the first error range EBR1, an effective interval INT_ef may be increased as much as five times for example, and thus, the first delay period RRTE_1 may be 1.0M. When the degradation level of the first memory block BLK1 or the number of error bits of the first memory block BLK1 is included in the second error range EBR2, the effective interval INT_ef may be increased four times for example, and thus, the second delay period RRTE_2 may be 800K. When the degradation level of the first memory block BLK1 or the number of error bits of the first memory block BLK1 is included in the third error range EBR3, the effective interval INT_ef may be increased three times for example, and thus, the third delay period RRTE_3 may be 600K. When the degradation level of the first memory block BLK1 or the number of error bits of the first memory block BLK1 is included in the fourth error range EBR4, the effective interval INT_ef may be increased two times for example, and thus, the fourth delay period RRTE_4 may be 400K. When the degradation level of the first memory block BLK1 or the number of error bits of the first memory block BLK1 is included in the fifth error range EBR5, the effective interval INT_ef may be identical to the reference interval (e.g., 1K), and thus, the 0-th delay period RRTE_0 may be 200K.

According to the above description, in each period, when a relevant delay period is applied, even though the reliability operation is skipped as many times as a relevant skip reference value S_REF, the reliability operation may be performed on the first memory block BLK1 at least once before the final read count RC_FIN (1.2M), and the reclaim operation may be performed on the first memory block BLK1. For example, even though the reliability operation is skipped sometimes, the reclaim operation of the first memory block BLK1 may be adequately performed, and thus, the reliability of the storage device 1200 may be maintained.

In an embodiment, the skip states described with reference to FIG. 8 may be defined through the test operation for a plurality of memory devices or based on the experimental data, and the skip reference values described with reference to FIG. 8 may be set through the test operation for a plurality of memory devices or based on the experimental data. In an embodiment, the skip states described with reference to FIG. 8 may be defined through the machine learning, and the skip reference values described with reference to FIG. 8 may be set through the machine learning. In an embodiment, the skip states and the skip reference values described with reference to FIG. 8 may be actively trained and updated based on the degradation state of the nonvolatile memory device 1220 during the operation of the storage device 1200.

Figure 10:
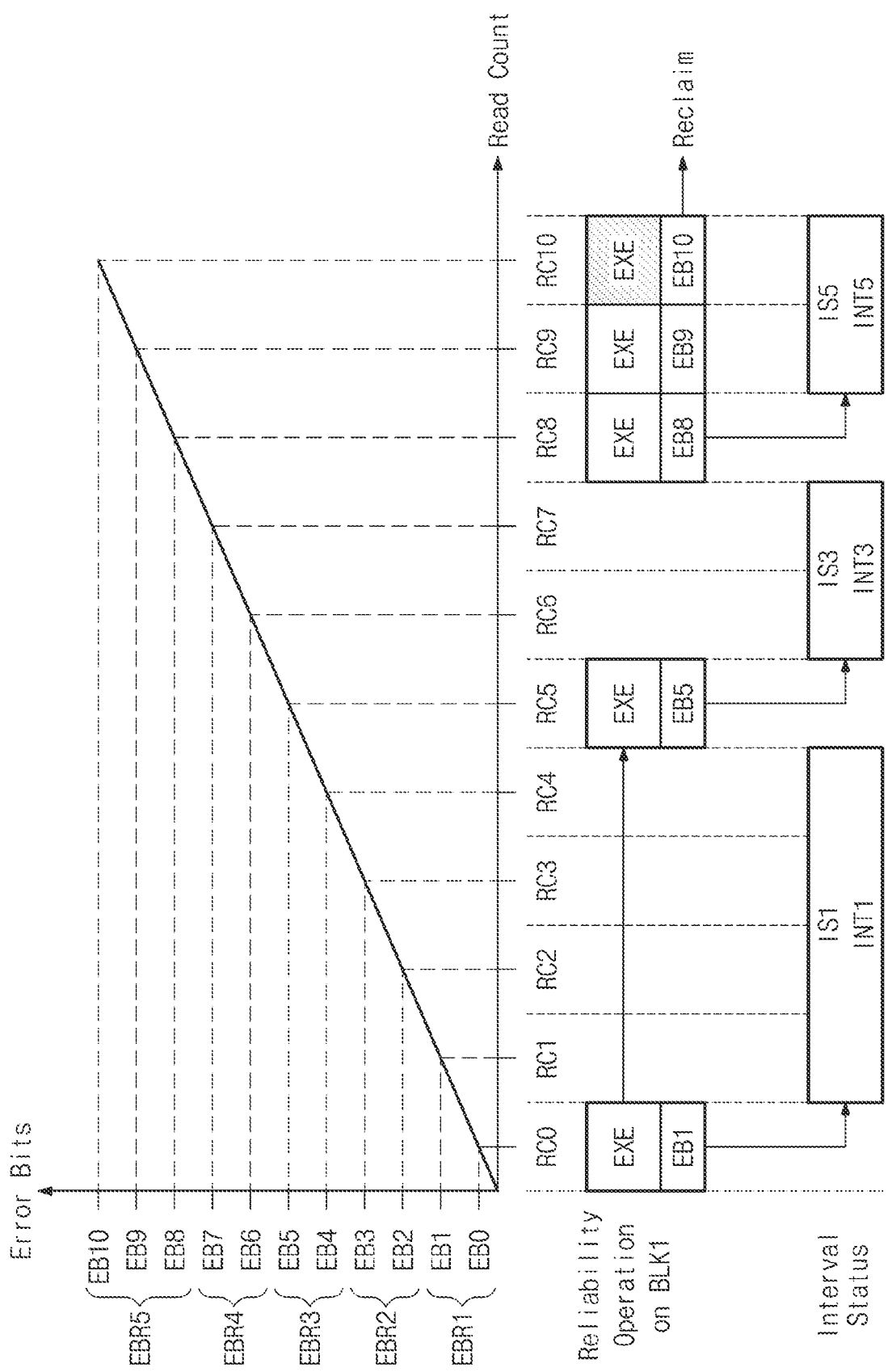
FIG. 10 is a hybrid diagram for describing a storage controller using a second lookup table of FIG. 9.

FIG. 9 illustrates a second lookup table used by a storage controller of FIG. 1. FIG. 10 is used for describing a storage controller using a second lookup table of FIG. 9. Referring to FIGS. 1, 9, and 10, a second lookup table LUT2 may include information about a plurality of error ranges EBR1 to EBR5 respectively corresponding to a plurality of interval states IS1 to IS5 and information about a plurality of intervals INT1 to INT5.

For example, the plurality of interval states IS1 to IS5 may be defined to be similar to the method described with reference to FIG. 8. For example, when the number of error bits detected through the reliability operation of the first memory block BLK1 is included in the first error range EBR1, the storage controller 1210 may set the first memory block BLK1 to the first interval state IS1. Moreover, when the number of error bits detected through the reliability operation of the first memory block BLK1 is included in any one of the plurality of error ranges EBR2 to EBR5, the storage controller 1210 may set the first memory block BLK1 to the corresponding interval state among the plurality of interval states IS2 to IS5.

As described with reference to FIGS. 1 to 8, the storage controller 1210 initiates the reliability operation of the first memory block BLK1 based on the given interval and selectively skips the reliability operation based on the skip state and the skip count of the first memory block BLK1. However, instead of selectively skipping the reliability operation based on the skip state and the skip count of the first memory block BLK1, the storage controller 1210 according to an embodiment of the present disclosure may control the interval of the reliability operation of the first memory block BLK1 based on the degradation level or the error level of the first memory block BLK1.

For example, as illustrated in FIG. 9, the second lookup table LUT2 may include information about the intervals INT1 to INT5 respectively corresponding to the plurality of interval states IS1 to IS5. For example, the storage controller 1210 may individually control the interval of the reliability operation, based on the interval state of each memory block.

In detail, when the interval is not controlled separately, the storage controller 1210 may perform the reliability operation on the first memory block BLK1 based on the given interval (e.g., a reference interval). For example, as described with reference to FIG. 4, the storage controller 1210 may perform the reliability operation on the first memory block BLK1 at each of the 0-th to tenth read counts RC0 to RC10. In this case, the reference interval may correspond to a difference between two adjacent read counts RC.

In contrast, as illustrated in FIG. 10, the interval of the reliability operation may be controlled based on the state of the first memory block BLK1. At the 0-th read count RC0 of the first memory block BLK1, the storage controller 1210 may perform the reliability operation on the first memory block BLK1. As a result of the reliability operation, the first error information EB1 may be detected.

The storage controller 1210 may set the first memory block BLK1 to the first interval state IS1 in response to that the first error information EB1 is included in the first error range EBR1. Herein, the first interval state IS1 may correspond to the first interval INT1.

Afterwards, the storage controller 1210 may perform the reliability operation on the first memory block BLK1 based on the first interval INT1. For example, the first interval INT1 may correspond to an interval from the 0-th read count RC0 to the fifth read count RC5. For example, at the fifth read count RC5, the storage controller 1210 may perform the reliability operation on the first memory block BLK1.

As a result of the reliability operation performed at the fifth read count RC5, the storage controller 1210 may obtain the fifth error information EB5. The fifth error information EB5 may be included in the third error range EBR3, and thus, the storage controller 1210 may set the first memory block BLK1 to the third interval state IS3. Herein, the third interval state IS3 may correspond to the third interval INT3. In an embodiment, the third interval INT3 may be shorter than the first interval INT1. Alternatively, the first interval INT1 may be n times the reference interval (n being a natural number), and the third interval INT3 may be m times the reference interval (m being a natural number smaller than n).

Afterwards, the storage controller 1210 may perform the reliability operation on the first memory block BLK1 based on the third interval INT3. For example, the third interval INT3 may correspond to an interval from the fifth read count RC5 to the eighth read count RC8. At the eighth read count RC8, the storage controller 1210 may perform the reliability operation on the first memory block BLK1.

When the reliability operation is performed at the eighth read count RC8, the storage controller 1210 may obtain the eighth error information EB8. The eighth error information EB8 may be included in the fifth error range EBR5, and thus, the storage controller 1210 may set the first memory block BLK1 to the fifth interval state IS5. Herein, the fifth interval state IS5 may correspond to the fifth interval INT5. In an embodiment, the fifth interval INT5 may be shorter than the first interval INT1 and may be shorter than the third interval INT3. In an embodiment, the fifth interval INT5 may be identical to the reference interval.

Afterwards, the storage controller 1210 may perform the reliability operation at each of the ninth and tenth read counts RC9 and RC10. The tenth error information EB10 may be detected in the reliability operation performed at the tenth read count RC10. In this case, as in the above description, the storage controller 1210 may register the first memory block BLK1 as a reclaim block.

As described above, the interval may be variably controlled based on the degradation state of the first memory block BLK1; in this case, because the reliability operation is not unnecessarily performed on the first memory block BLK1, the overall performance of the storage device 1200 may be improved. Also, because the interval of the reliability operation is controlled based on the degradation state or the error level of the memory block, as described with reference to FIG. 8, the reliability operation may be performed on the memory block before the final read count, and thus, the reliability of data of the memory block may be guaranteed.

Figure 11:
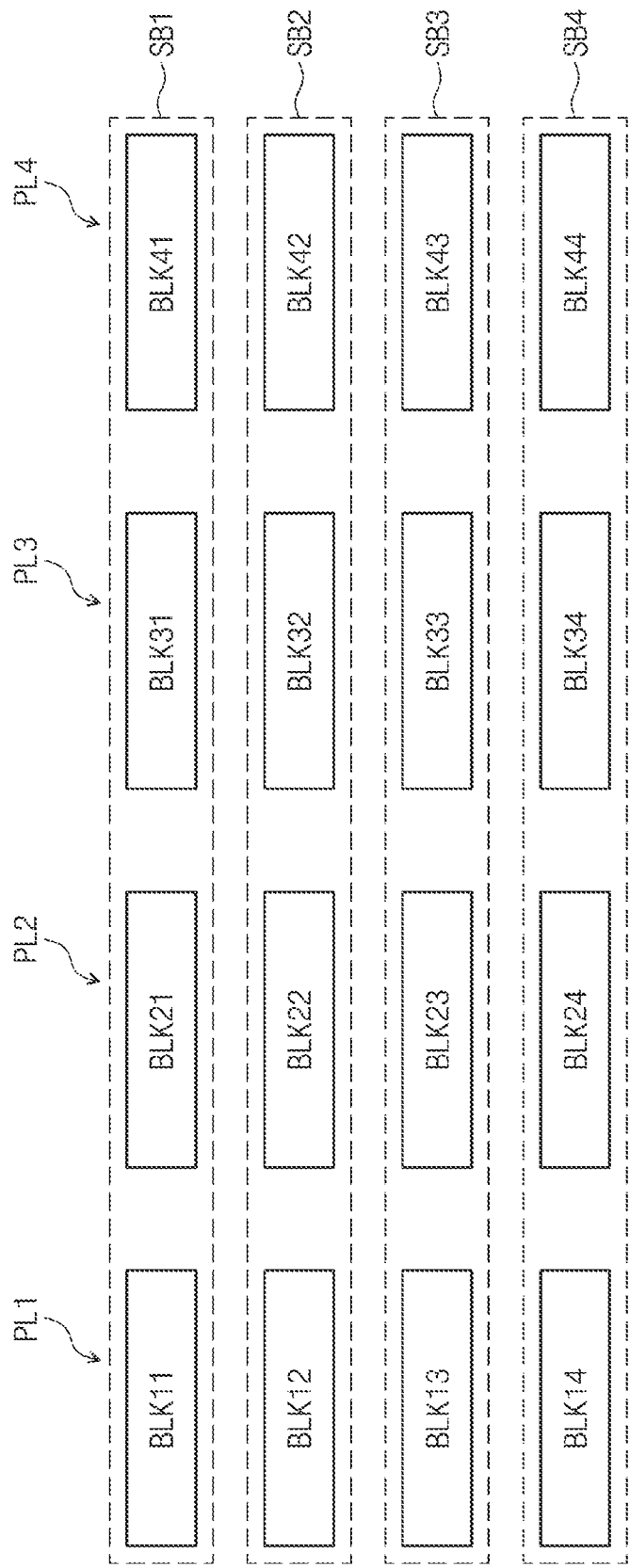
FIG. 11 is a block diagram for describing a structure of a memory cell array of FIG. 2.

FIG. 11 is used for describing a structure of a memory cell array of FIG. 2. Referring to FIGS. 2 and 11, the memory cell array 1221 may include a plurality of planes PL1 to PL4. A plurality of memory blocks BLK11 to BLK44 may constitute the plurality of planes PL1 to PL4. For example, the first plane PL1 may include the plurality of memory blocks BLK11 to BLK14; the second plane PL2 may include the plurality of memory blocks BLK21 to BLK24; the third plane PL3 may include the plurality of memory blocks BLK31 to BLK34; and, the fourth plane PL4 may include the plurality of memory blocks BLK41 to BLK44.

In an embodiment, a plurality of memory blocks included in substantially the same plane may be configured to share the same bit-lines. For example, memory blocks included in different planes may operate in substantially parallel. In this case, memory blocks included in different planes may be managed as a super block. For example, the 11th memory block BLK11 of the first plane PL1, the 21st memory block BLK21 of the second plane PL2, the 31 st memory block BLK31 of the third plane PL3, and the 41 st memory block BLK41 of the fourth plane PL4 may form a first super block SB1. The 12th memory block BLK12 of the first plane PL1, the 22nd memory block BLK22 of the second plane PL2, the 32nd memory block BLK32 of the third plane PL3, and the 42nd memory block BLK42 of the fourth plane PL4 may form a second super block SB2. The 13th memory block BLK13 of the first plane PL1, the 23rd memory block BLK23 of the second plane PL2, the 33th memory block BLK33 of the third plane PL3, and the 43th memory block BLK43 of the fourth plane PL4 may form a third super block SB3. The 14th memory block BLK14 of the first plane PL1, the 24th memory block BLK24 of the second plane PL2, the 34th memory block BLK34 of the third plane PL3, and the 44th memory block BLK44 of the fourth plane PL4 may form a fourth super block SB4.

In an embodiment, in FIG. 11, the super block includes memory blocks of the same nonvolatile memory device, but the present disclosure is not limited thereto. For example, the super block may be managed by using a set of memory blocks included in different nonvolatile memory devices.

The storage controller 1210 may be configured to manage the skip state, the skip reference value, and the skip count in units of super block described above. For example, as the storage controller 1210 manages the skip state, the skip reference value, and the skip count in units of super block, a resource (e.g., memory circuits or memory elements) necessary to manage the above information may decrease.

Figure 12:
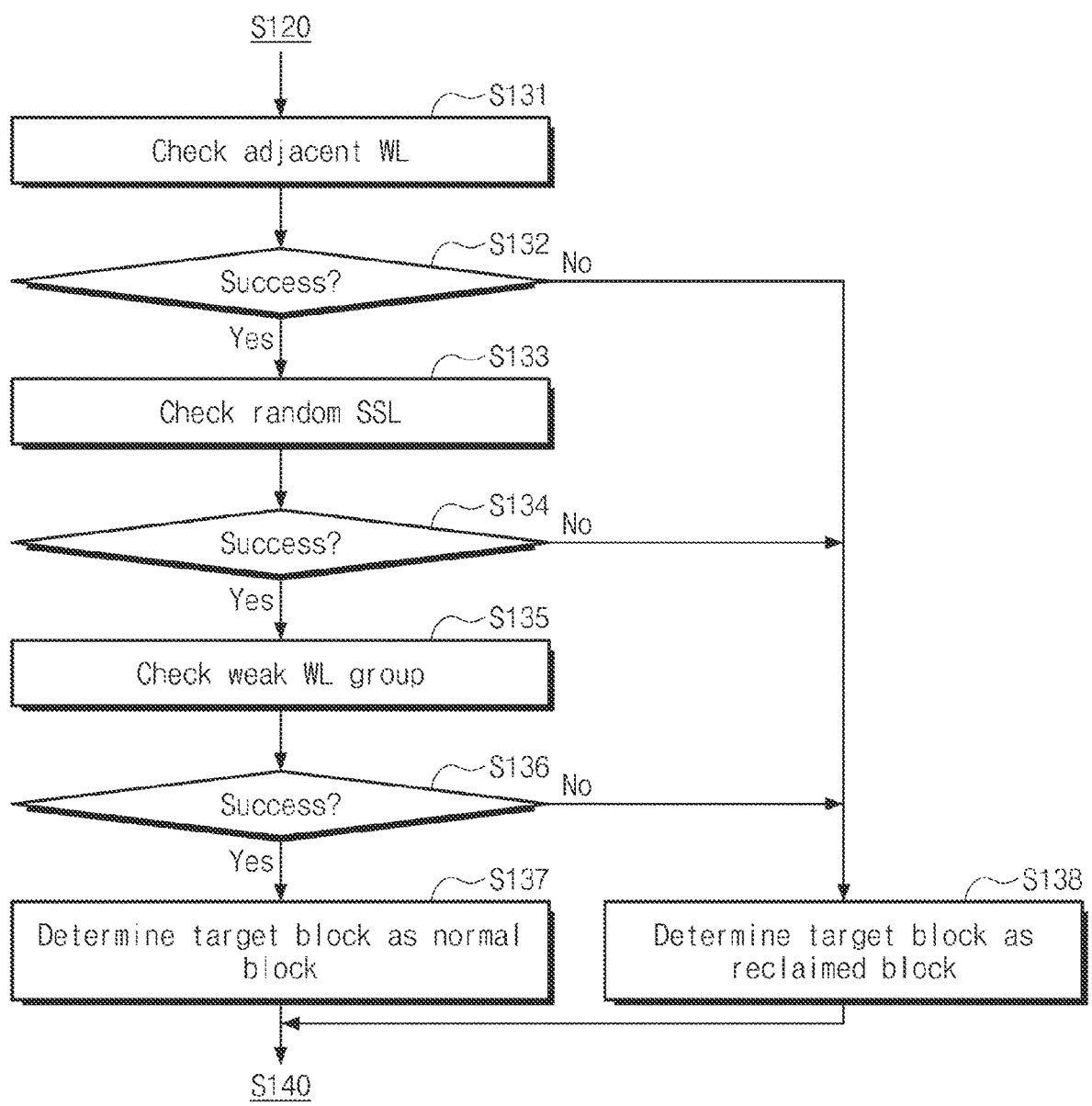
FIG. 12 is a flowchart diagram illustrating step S130 of FIG. 5, that is, a reliability operation.

FIG. 12 illustrates step S130 of FIG. 5, that is, a reliability operation. Examples of the reliability operation of the first memory block BLK1 will be described with reference to FIG. 12, but the present disclosure is not limited thereto. The reliability operation may include various operations implemented to detect a degradation state or an error level of a specific memory block or a target memory block.

Referring to FIGS. 1, 3, 5, and 12, the storage controller 1210 may perform the reliability operation on the first memory block BLK1 through step S131 to step S138.

For example, in step S131, the storage controller 1210 may check an adjacent word-line(s). For example, the storage controller 1210 may perform the read operation on the fifth word-line WL5 of the first memory block BLK1, and thus, the reliability operation of the first memory block BLK1 may be performed. In this case, the fourth and sixth word-lines WL4 and WL6 may be adjacent word-lines of the fifth word-line WL5, and the storage controller 1210 may perform the read operation on the fourth and sixth word-lines WL4 and WL6 and may perform error correction on the read data.

In step S132, the storage controller 1210 may determine whether the error of the data read in step S131 is corrected.

When the error is corrected, in step S133, the storage controller 1210 may check a random string selection line SSL among string selection lines of the first memory block BLK1. For example, the read operation may be performed on selection transistors of the random string selection line (e.g., at least one of SSL1a, SSL1b, SSL2a, and SSL2b) of the first memory block BLK1 by using a reference level.

In step S134, the storage controller 1210 may determine whether the selection transistors of the random string selection lines targeted for the read operation in step S133 form a normal threshold voltage distribution.

When the selection transistors of the random string selection lines form the normal threshold voltage distribution, in step S135, the storage controller 1210 may check a weak word-line group. For example, the storage controller 1210 may perform the read operation on a group including relatively weak word-lines among the plurality of word-lines WL1 to WL8 and may perform error correction on the read data. In an embodiment, the relatively weak word-line group may refer to a word-line group that experiences a relatively great threshold voltage change as the read operation is performed. In an embodiment, the weak word-line group may include word-lines relatively close to the substrate. Alternatively, the weak word-line group may include word-lines whose channel diameter is relatively small.

In step S136, the storage controller 1210 may determine whether the error of the data read in step S135 is corrected. When the error is corrected, in step S137, the storage controller 1210 determines the target memory block (e.g., the first memory block BLK1) as a normal block. This means that the data of the first memory block BLK1 is reliable.

In an embodiment, when the determination result in step S132, the determination result in step S134, or the determination result in step S136 indicates a fail, in step S138, the storage controller 1210 determines the target memory block (e.g., the first memory block BLK1) as a reclaim block. This means that the first memory block BLK1 is degraded and the data of the first memory block BLK1 is not reliable.

The reliability operations associated with the first memory block BLK1 are above provided as an example, and the present disclosure is not limited thereto.

Figure 13:
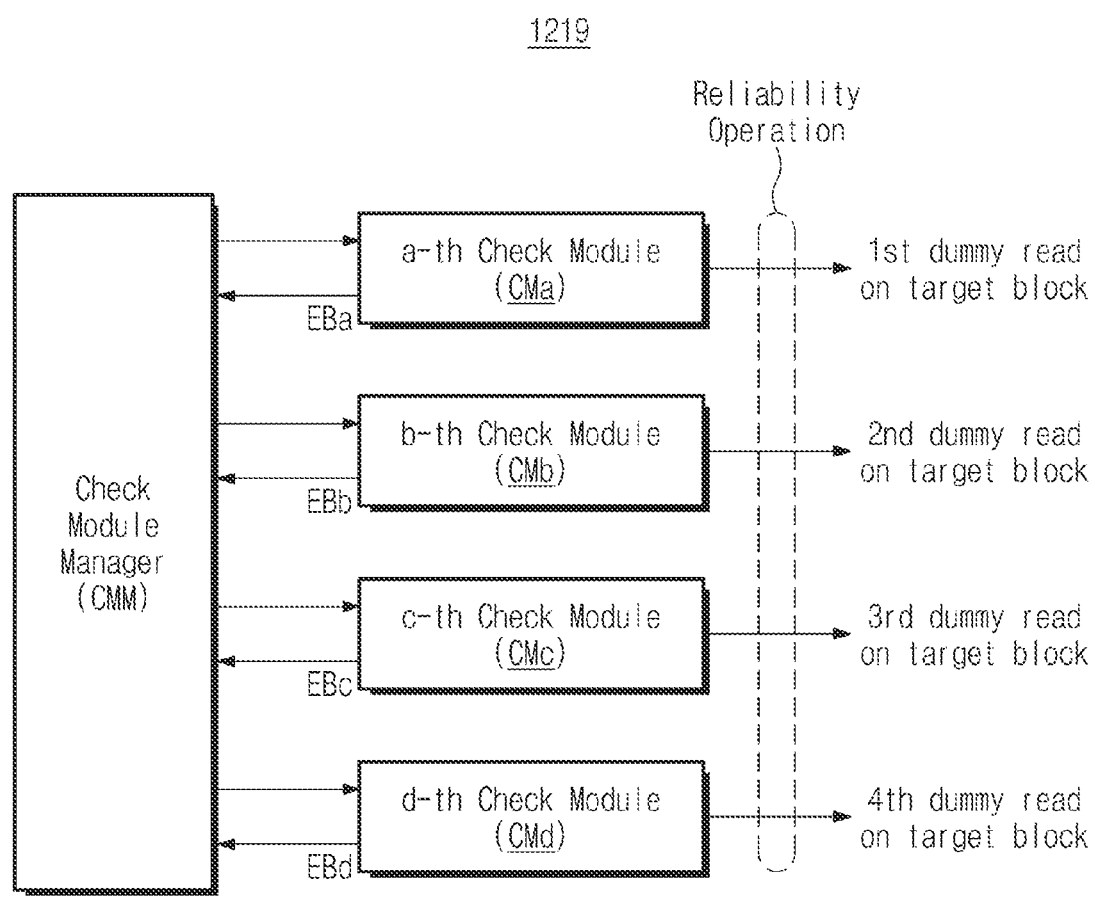
FIG. 13 is a block diagram illustrating a reliability manager configured to perform a reliability operation of FIG. 12.

FIG. 13 is a block diagram illustrating a reliability manager configured to perform a reliability operation of FIG. 12. In an embodiment, the reliability manager 1219 of FIG. 13 may be hardware included in the storage controller 1210 or may be software or firmware that is driven by the CPU 1213 of the storage controller 1210. Alternatively, the reliability manager 1219 may be implemented with a combination of software, firmware, or hardware.

The reliability manager 1219 may be configured to perform the reliability operation described with reference to FIGS. 1 to 12. For example, the reliability manager 1219 may include a check module manager CMM and a plurality of check modules CMa, CMb, CMc, and CMd. The check module manager CMM may be configured to control or manage the plurality of check modules CMa, CMb, CMc, and CMd. The plurality of check modules CMa, CMb, CMc, and CMd may perform the reliability operation on a target block.

In an embodiment, as described with reference to FIG. 12, the reliability operation may include a plurality of dummy read operations associated with the target block. The plurality of dummy read operations may include dummy read operations for checking adjacent word-lines of the target block, dummy read operations for checking arbitrary string selection lines of the target block, and dummy read operations for checking weak word-line groups of the target block. In this case, the a-th check module CMa may be configured to perform first dummy read operations for checking adjacent word-lines of the target block, the b-th check module CMb may be configured to perform second dummy read operations for checking arbitrary string selection lines of the target block, the c-th check module CMc may be configured to perform third dummy read operations for checking a first weak word-line group of the target block, and the d-th check module CMd may be configured to perform fourth dummy read operations for checking a second weak word-line group of the target block.

In the embodiments described with reference to FIGS. 1 to 12, the reliability manager 1219 may skip the reliability operation of the target block depending on a given condition. However, in the embodiment of FIG. 13, the reliability manager 1219 may be configured to partially skip the reliability operation in units of check module. For example, one reliability operation of the target block may include operations of checking an adjacent word-line of the target block, checking an arbitrary string selection line of the target block, and checking a weak word-line group of the target block. In this case, the check module manager CMM may skip at least one of the adjacent word-line check operation, the arbitrary string selection line check operation, and the weak word-line group check operation based on a given condition.

As an example, the check module manager CMM may partially skip the reliability operation in units of check module. For example, depending on the given condition, the check module manager CMM may skip the dummy read operation that is performed by at least one of the plurality of check modules CMa, CMb, CMc, and CMd. In an embodiment, the check module manager CMM may determine whether to skip the plurality of check modules CMa, CMb, CMc, and CMd, based on the skip reference value S_REF and the skip count of each of the plurality of check modules CMa, CMb, CMc, and CMd. Alternatively, the check module manager CMM may be configured to determine whether the plurality of check modules CMa, CMb, CMc, and CMd are skipped, based on a result of a previous reliability operation. The given condition for determining whether the plurality of check modules CMa, CMb, CMc, and CMd are skipped may be variously changed or modified, which will be described in detail with reference to the following drawings and embodiments. However, the present disclosure is not limited thereto. For example, the given condition may be variously changed or modified without departing from the scope and spirit of the invention.

Figure 14:
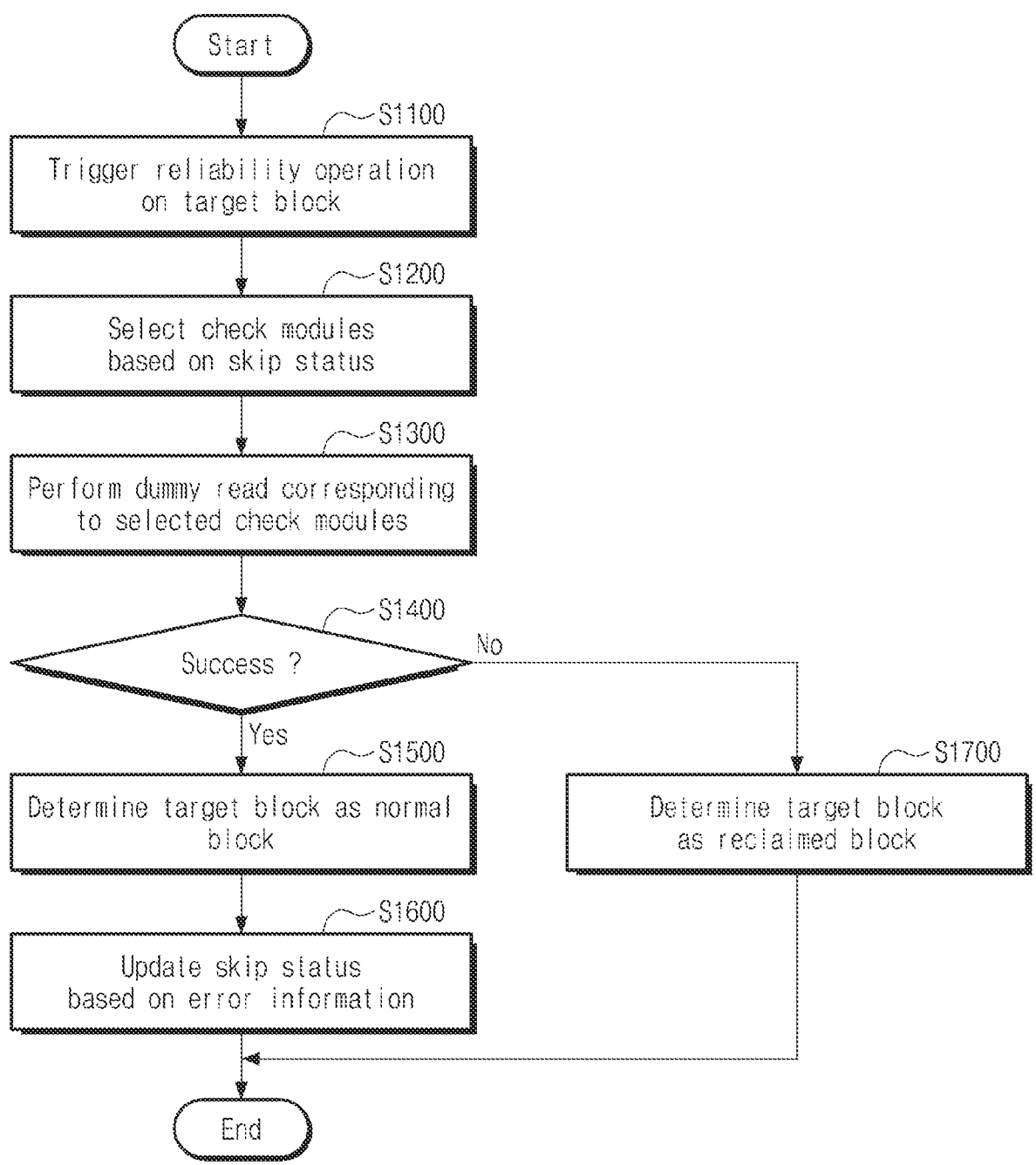
FIG. 14 is a flowchart illustrating an operation of a storage controller including a reliability manager of FIG. 13.

FIG. 14 is a flowchart illustrating an operation of a storage controller including a reliability manager of FIG. 13. Referring to FIGS. 1, 13, and 14, in operation S1100, the storage controller 1210 may trigger or initiate the reliability operation of the target block. For example, as the nonvolatile memory device 1220 operates, the read count of the target block may reach a given interval or a random interval; in this case, the reliability manager 1219 of the storage controller 1210 may initiate the reliability operation of the target block.

In operation S1200, the storage controller 1210 may select check modules based on a skip status for check module. For example, as described with reference to FIG. 13, the reliability manager 1219 may include the plurality of check modules CMa to CMd, and each of the plurality of check modules CMa to CMd may perform the dummy read operation on various components of the target block. The reliability manager 1219 may select check modules, which will perform the dummy read operation (or are not skipped), from among the plurality of check modules CMa to CMd based on the skip status. In an embodiment, the skip status may include information about whether to skip the plurality of check modules CMa to CMd, a skip-possible status, a skip-possible count, the skipped number of times, etc.

In operation S1300, the storage controller 1210 may perform the dummy read operations corresponding to the selected check modules. For example, it is assumed that the reliability manager 1219 includes the a-th to d-th check modules CMa to CMd and the a-th to c-th check modules CMa to CMc are selected. In this case, the reliability manager 1219 may perform the dummy read operations respectively corresponding to the a-th to c-th check modules CMa to CMc and may not perform the dummy read operation corresponding to the d-th check module CMd. That is, the dummy read operation corresponding to a check module not selected is skipped or omitted. In other words, the storage controller 1210 may perform the dummy read operation (or the reliability operation) of the target block by using the remaining check modules other than a specific check module (i.e., a check module to be skipped).

In operation S1400, the storage controller 1210 may determine whether the dummy read operations performed in operation S1300 succeed. For example, the storage controller 1210 may determine whether an error of data read through the dummy read operations is corrected by the ECC engine 1217. Alternatively, the storage controller 1210 may determine whether a specific control line (e.g., a string selection line) has a normal threshold voltage distribution, through the dummy read operation.

In an embodiment, in the flowchart of FIG. 14, the dummy read operation and the determination of the dummy read operation are illustrated to be independent of each other, but the present disclosure is not limited thereto. For example, the storage controller 1210 may perform a first dummy read operation and may perform the determination of the first dummy read operation. Afterwards, when the first dummy read operation succeeds, the storage controller 1210 may perform a second dummy read operation and may perform the determination of the second dummy read operation. When it is determined that a specific dummy read operation fails, the storage controller 1210 may not perform the remaining dummy read operations and may determine that the dummy read operations fail.

When all the dummy read operations succeed, in operation S1500, the storage controller 1210 determines that the target block is a normal block.

In operation S1600, the storage controller 1210 may update a skip status for check module based on the error information. For example, the reliability manager 1219 may collect the error information of the dummy read operations performed by the selected check modules. The storage controller 1210 may update a skip status for check module based on the collected error information. In an embodiment, the updated skip status for check module may be used in a next reliability operation of the target block. How to update or manage the skip status for check module will be described in detail with reference to the following drawings.

When the determination result in operation S1400 indicates that at least one dummy read operation fails, the storage controller 1210 determines that the target block is a reclaimed block. This means that the target block is in a degradation state and the reliability of data in the target block is not guaranteed. In an embodiment, data that are present in the target block determined as the reclaimed block may move or migrate to any other normal block under control of the storage controller 1210.

FIG. 15 is a flowchart illustrating operation S1600 (i.e., an operation of updating a skip status for check module) of FIG. 14. FIG. 16 is a diagram illustrating a skip status of a check module that is managed based on the flowchart of FIG. 15. Referring to FIGS. 1, 13, 14, 15, and 16, the storage controller 1210 may update a skip status SS_CM for check module through operation S1611 to operation S1613. In an embodiment, the skip status SS_CM for check module (for convenience of description, hereinafter referred to as a "check module skip status") may be stored in the buffer memory 1216 of the storage controller 1210 or a separate memory and may be managed or controlled by the check module manager CMM of the reliability manager 1219.

In an embodiment, the reliability manager 1219 of the storage controller 1210 may include the a-th to d-th check modules CMa to CMd. In this case, as illustrated in FIG. 16, the check module skip status SC_CM may include an a-th skip count SCa and an a-th skip reference value S_REFa corresponding to the a-th check module CMa, a b-th skip count SCb and a b-th skip reference value S_REFb corresponding to the b-th check module CMb, a c-th skip count SCc and a c-th skip reference value S_REFc corresponding to the c-th check module CMc, and a d-th skip count SCd and a d-th skip reference value S_REFd corresponding to the d-th check module CMd.

In an embodiment, the check module skip status SC_CM illustrated in FIG. 16 is only an example, and the present disclosure is not limited thereto. It may be understood that the check module skip status SC_CM may be implemented for each of a plurality of memory blocks included in the nonvolatile memory device 1220, may be implemented for each of a plurality of super blocks included in the nonvolatile memory device 1220, or may be implemented in various units.

In operation S1611, the storage controller 1210 may increase a skip count of a check module skipping the dummy read operation. For example, the storage controller 1210 may select the a-th to c-th check modules CMa to CMc. For example, the a-th skip count SCa, the b-th skip count SCb, and the c-th skip count SCc may be equal to the a-th skip reference value S_REFa, the b-th skip reference value S_REFb, and the c-th skip reference value S_REFc, respectively, and the d-th skip count SCd may be smaller than the d-th skip reference value S_REFd. In this case, because the dummy read operation of the d-th check module CMd is skipped, the storage controller 1210 may select the a-th to c-th check modules CMa to CMc and may perform the dummy read operations respectively corresponding to the a-th to c-th check modules CMa to CMc. Because the dummy read operation of the d-th check module CMd is skipped, the storage controller 1210 may increase the d-th skip count SCd corresponding to the d-th check module CMd as much as "1".

In operation S1612, the storage controller 1210 may determine a reference skip count of a check module performing the dummy read operation. For example, as described above, when the storage controller 1210 performs the dummy read operation corresponding to each of the a-th to c-th check modules CMa to CMc, the storage controller 1210 may obtain error information corresponding to each of the a-th to c-th check modules CMa to CMc. The storage controller 1210 may determine the a-th to c-th skip reference values S_REFa to S_REFc respectively corresponding to the a-th to c-th check modules CMa to CMc, based on the obtained error information.

In detail, when the error information of the dummy read operation corresponding to the a-th check module CMa is included in an error range of "A", the storage controller 1210 may determine that a value corresponding to the error range of "A" is the a-th skip reference value S_REFa. When the error information of the dummy read operation corresponding to the b-th check module CMb is included in an error range of "B", the storage controller 1210 may determine that a value corresponding to the error range of "B" is the b-th skip reference value S_REFb. In this case, when the error range of "A" is smaller than the error range of "B" (i.e., when the error size or the number of error bits of the dummy read operation corresponding to the a-th check module CMa is smaller than the error size or the number of error bits of the dummy read operation corresponding to the b-th check module CMb), the a-th skip reference value S_REFa may be smaller than the b-th skip reference value S_REFb. The reason is that as the error size or the number of error bits becomes relatively smaller, even though the corresponding dummy read operation is skipped, the normal determination of the reclaimed block is possible. A configuration for implementing the above description is similar to that described above, and thus, additional description will be omitted to avoid redundancy. The storage controller 1210 may determine a skip reference value of each check module, which performs the dummy read operation, through the above operation.

In operation S1613, the storage controller 1210 may update the check module skip status SC_CM based on the skip count increased in operation S1611 and the skip reference value determined in operation S1612. The updated check module skip status SC_CM may be used to determine a check module to be skipped or a check module targeted for the dummy read operation, in a next reliability operation of the target block.

Figure 17:
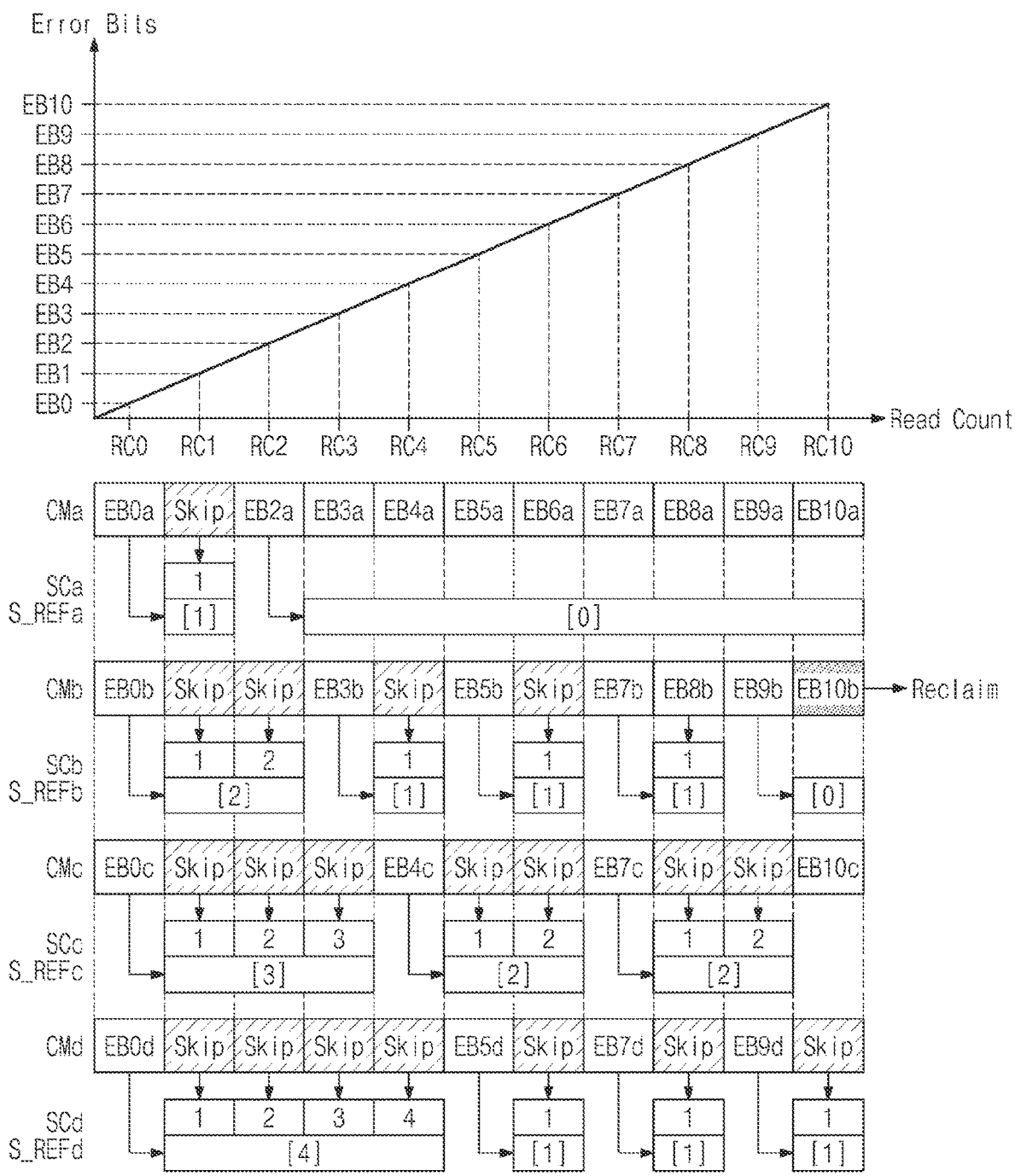
FIG. 17 is a diagram for describing an operation according to the flowchart of FIG. 15.

FIG. 17 is a diagram for describing an operation according to the flowchart of FIG. 15. For convenience of description, additional description associated with the components described above will be omitted to avoid redundancy. In the graph of FIG. 17, a horizontal axis represents a read count of the first memory block BLK1, and a vertical axis represents the number of error bits of the first memory block BLK1. In an embodiment, the vertical axis of the graph of FIG. 17, that is, the number of error bits of the first memory block BLK1 may indicate an average value of the numbers of error bits occurring in the first memory block BLK1. That is, when the read count of the first memory block BLK1 is RC3, the number of error bits of the first memory block BLK1 may not necessarily be EB3, and the error size or the number of error bits of the dummy read operation performed by each check module may also be variously changed.

Referring to FIGS. 1 and 13 to 17, the storage controller 1210 may trigger or initiate the reliability operation of the first memory block BLK1 at each of the 0-th to tenth read counts RC0 to RC10 of the first memory block BLK1. In this case, the storage controller 1210 may skip or omit operations of some check modules based on the method described with reference to FIGS. 13 to 16.

For example, at the 0-th read count RC0 of the first memory block BLK1, the storage controller 1210 may perform the reliability operation on the first memory block BLK1 by using the a-th to d-th check modules CMa to CMd. In this case, an error of EB0a may occur in the dummy read operation corresponding to the a-th check module CMa, an error of EB0b may occur in the dummy read operation corresponding to the b-th check module CMb, an error of EB0c may occur in the dummy read operation corresponding to the c-th check module CMc, and an error of EB0d may occur in the dummy read operation corresponding to the d-th check module CMd.

The storage controller 1210 may set the a-th skip reference value S_REFa corresponding to the a-th check module CMa to "1" corresponding to EB0a, may set the b-th skip reference value S_REFb corresponding to the b-th check module CMb to "2" corresponding to EB0b, may set the c-th skip reference value S_REFc corresponding to the c-th check module CMc to "3" corresponding to EB0c, and may set the d-th skip reference value S_REFd corresponding to the d-th check module CMd to "4" corresponding to EB0d.

Afterwards, at the first read count RC1 of the first memory block BLK1, the a-th to d-th skip counts SCa to SCd respectively corresponding to the a-th to d-th check modules CMa to CMd may be "0", and the a-th to d-th skip reference values S_REFa to S_REFd may be "1", "2", "3", and "4", respectively. Accordingly, the storage controller 1210 may skip the dummy read operations of the a-th to d-th check modules CMa to CMd. In this case, the a-th to d-th skip counts SCa to SCd respectively corresponding to the a-th to d-th check modules CMa to CMd may increase as much as "1".

Afterwards, at the second read count RC2 of the first memory block BLK1, because the a-th skip count SCa is equal to the a-th skip reference value S_REFa, the storage controller 1210 may perform the dummy read operation on the first memory block BLK1 by using the a-th check module CMa. The storage controller 1210 may set the a-th skip reference value S_REFa to "0" based on the error information (i.e., EB2a) of the a-th check module CMa. In an embodiment, as in the above description, that the a-th skip reference value S_REFa is "0" may mean that the dummy read operation of the a-th check module CMa is not skipped in a next reliability operation. Because the b-th to d-th skip counts SCb to SCd are respectively smaller than the b-th to d-th skip reference values S_REFb to S_REFd, the storage controller 1210 may skip the dummy read operations of the b-th to d-th check modules CMb to CMd. The b-th to d-th skip counts SCb to SCd respectively corresponding to the b-th to d-th check modules CMa to CMd may increase as much as "1".

Afterwards, at the third read count RC3 of the first memory block BLK1, because the a-th skip count SCa is "0" and the b-th skip count SCb and the b-th skip reference value S_REFb are equal, the storage controller 1210 may perform the dummy read operations on the first memory block BLK1 by using the a-th and b-th check modules CMa and CMb. The storage controller 1210 may set the b-th skip reference value S_REFb to "1" based on the error information (i.e., EB3b) of the b-th check module CMb. Because the c-th and d-th skip counts SCc and SCd are respectively smaller than the c-th and d-th skip reference values S_REFc and S_REFd, the storage controller 1210 may skip the dummy read operations of the c-th and d-th check modules CMc and CMd. The c-th and d-th skip counts SCc and SCd respectively corresponding to the c-th and d-th check modules CMc and CMd may increase as much as "1".

Afterwards, as in the above description, the storage controller 1210 may perform the reliability operation at each of the fourth to tenth read counts RC4 to RC10 of the first memory block BLK1. In this case, the storage controller 1210 may selectively skip the dummy read operations of some check modules based on a skip count and a skip reference value of each of a plurality of check modules.

As described above, even though the dummy read operations of some check modules are skipped, the storage controller 1210 may normally detect or determine the reclaimed block. Accordingly, the reliability of the storage device 1200 may be maintained, and the performance of the storage device 1200 may be improved as the dummy read operations of some check modules are performed.

Figure 18:
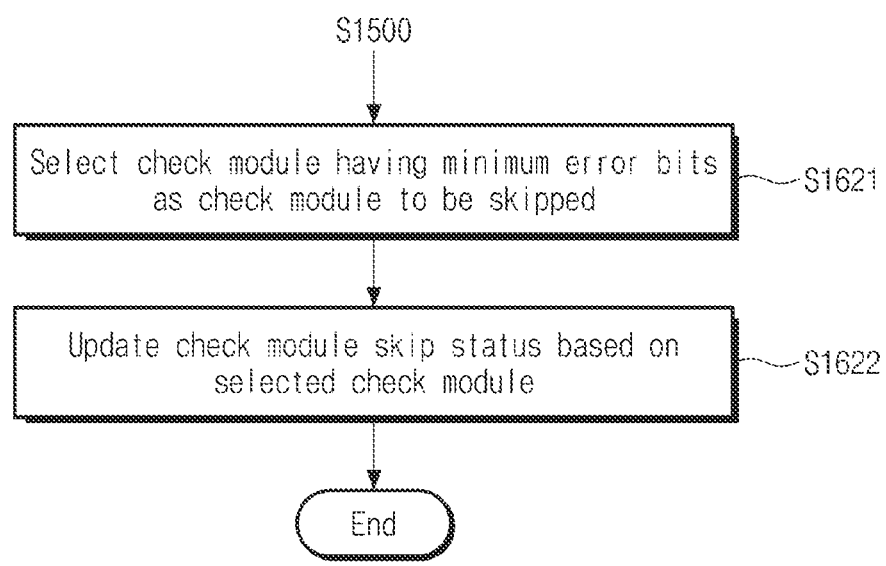
FIG. 18 is a flowchart illustrating operation S1600 (i.e., an operation of updating a skip status check module) of FIG. 14.

FIG. 18 is a flowchart illustrating operation S1600 (i.e., an operation of updating a skip status check module) of FIG. 14. Referring to FIGS. 1, 13, 14, and 18, the storage controller 1210 may update the check module skip status SC_CM through operation S1621 and operation S1622.

For example, in operation S1621, the storage controller 1210 may select a check module having the minimum number of error bits as a check module to be skipped. For example, the storage controller 1210 may obtain error information of check modules performing the dummy read operations. The storage controller 1210 may select a check module corresponding to the minimum number of error bits as a check module to be skipped in a next reliability operation, based on the error information.

In operation S1622, the storage controller 1210 may update a check module skip status based on the selected check module. For example, the storage controller 1210 may set a skip index corresponding to the selected check module such that the dummy read operation corresponding to the selected check module is skipped in a next reliability operation.

In an embodiment, when the a-th check module CMa is set to a check module to be skipped, in a next reliability operation, the storage controller 1210 may skip (or omit) the dummy read operation of the a-th check module CMa based on the updated check module skip status.

In an embodiment, that a specific check module has the minimum number of error bits means that the probability that the dummy read operation of the specific check module fails in a next reliability operation is low. Accordingly, even though the check module having the minimum number of error bits is skipped in the next reliability operation, the reclaimed block may be normally detected.

Figure 19:
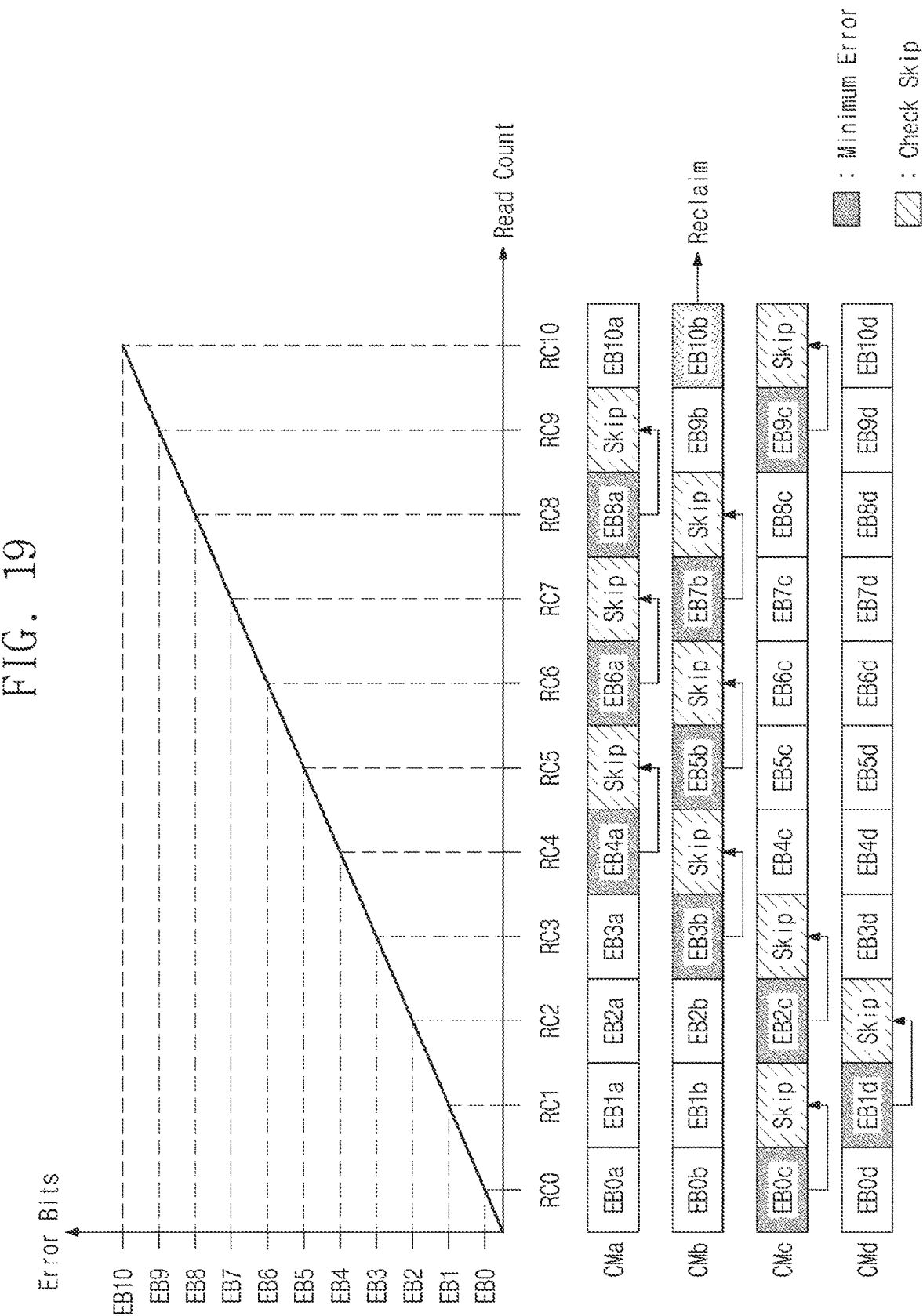
FIG. 19 is a diagram for describing an operation according to the flowchart of FIG. 18.

FIG. 19 is a diagram for describing an operation according to the flowchart of FIG. 18. For convenience of description, additional description associated with the components described above will be omitted to avoid redundancy. In the graph of FIG. 17, a horizontal axis represents a read count of the first memory block BLK1, and a vertical axis represents the number of error bits of the first memory block BLK1.

Referring to FIGS. 1, 13, 14, 18, and 19, the storage controller 1210 may perform the reliability operation of the first memory block BLK1 at each of the 0-th to tenth read counts RC0 to RC10 of the first memory block BLK1. In this case, the storage controller 1210 may skip or omit operations of some check modules based on the method described with reference to FIGS. 13, 14, and 18.

For example, at the 0-th read count RC0 of the first memory block BLK1, the storage controller 1210 may perform the reliability operation on the first memory block BLK1 by using the a-th to d-th check modules CMa to CMd. In this case, an error of EB0*a* may occur in the dummy read operation corresponding to the a-th check module CMa, an error of EB0*b* may occur in the dummy read operation corresponding to the b-th check module CMb, an error of EB0*c* may occur in the dummy read operation corresponding to the c-th check module CMc, and an error of EB0*d* may occur in the dummy read operation corresponding to the d-th check module CMd. In an embodiment, EB0*c* among EB0*a*, EB0*b*, EB0*c*, and EB0*d* may correspond to a minimum error, and the storage controller 1210 may select the c-th check module CMc corresponding to EB0*c* as a check module to be skipped in a next reliability operation.

Afterwards, at the first read count RC1 of the first memory block BLK1, the storage controller 1210 may perform the reliability operation on the first memory block BLK1 by using the a-th, b-th, and d-th check modules CMa, CMb, and CMd. Because the c-th check module CMc is selected as a check module to be skipped in the previous reliability operation (i.e., in the reliability operation corresponding to the 0-th read count RC0), the storage controller 1210 may skip (or omit) the dummy read operation of the c-th check module CMc in the current reliability operation (i.e., in the reliability operation corresponding to the first read count RC1).

In the reliability operation of the first read count RC1, an error of EB1*a* may occur in the dummy read operation corresponding to the a-th check module CMa, an error of EB1*b* may occur in the dummy read operation corresponding to the b-th check module CMb, and an error of EB1*d* may occur in the dummy read operation corresponding to the d-th check module CMd. In an embodiment, EB1*d* among EB1*a*, EB1*b*, and EB1*d* may correspond to a minimum error, and the storage controller 1210 may select the d-th check module CMd corresponding to EB1*d* as a check module to be skipped in a next reliability operation.

As in the above description, the storage controller 1210 may perform the reliability operation on the first memory block BLK1 at each of the third to tenth read counts RC3 to RC10 of the first memory block BLK1. In this case, the storage controller 1210 may select a check module to be skipped in a next reliability operation based on a result of a current reliability operation (i.e., error information of each check module). Alternatively, the storage controller 1210 may skip the dummy read operations of some check modules in a current reliability operation based on a result of a previous reliability operation (i.e., error information of each check module).

In an embodiment, a configuration where the storage controller 1210 skips the dummy read operation associated with one check module is described with reference to FIGS. 18 and 19, but the present disclosure is not limited thereto. For example, the storage controller 1210 may select two or more check modules having the smallest error size among the collected error information and may skip the dummy read operations of the selected two or more check modules in a next reliability operation. In an embodiment, the storage controller 1210 may select two or more check modules having an error size smaller than a given size from among the collected error information and may skip the dummy read operations of the selected two or more check modules in a next reliability operation. That is, the storage controller 1210 may omit the dummy read operations of one or more check modules in one reliability operation.

Figure 20:
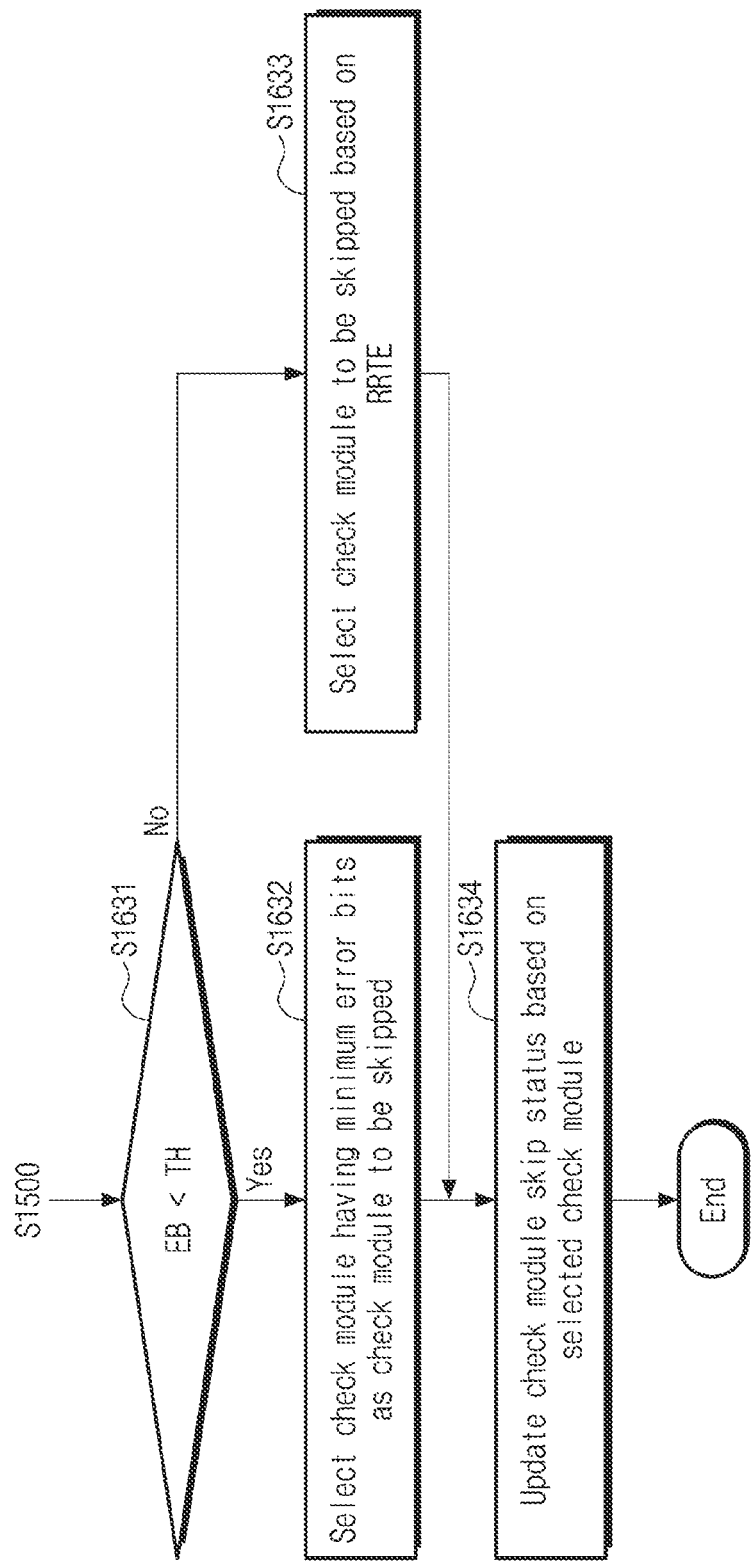
FIG. 20 is a flowchart illustrating operation S1600 (i.e., an operation of updating a skip status for check module) of FIG. 14.

FIG. 20 is a flowchart illustrating operation S1600 (i.e., an operation of updating a skip status for check module) of FIG. 14. Referring to FIGS. 1, 13, 14, and 20, the storage controller 1210 may update the check module skip status SC_CM through operation S1631 to operation S1634.

In operation S1631, the storage controller 1210 may determine whether an error size EB collected through the reliability operation is greater than a reference value TH. For example, the storage controller 1210 may perform the dummy read operations by using a plurality of check modules. Accordingly, the error information corresponding to each of the plurality of check modules may be collected. The storage controller 1210 may determine whether an average value, a median value, a minimum value, or a maximum value among the error information is greater than the reference value TH. In an embodiment, the reference value TH may be smaller than an error size for reclaim determination of a target block.

When the error size EB is smaller than the reference value TH, the storage controller 1210 may perform operation S1632. Operation S1632 is similar to operation S1621 described with reference to FIGS. 18 and 19, and thus, additional description will be omitted to avoid redundancy.

When the error size EB is greater than or equal to the reference value TH, in operation S1633, the storage controller 1210 may select a check module to be skipped, based on a delay period (i.e., a read reclaim trigger error RRTE) for each of a plurality of check modules. The delay period RRTE is described with reference to Equation 1, and thus, additional description will be omitted to avoid redundancy.

In an embodiment, the delay periods RRTE of the plurality of check modules CMa, CMb, CMc, and CMd may be different from each other. For example, stochastic characteristics of the dummy read operations to be performed by the plurality of check modules CMa, CMb, CMc, and CMd are different from each other. Accordingly, RINC constants of the plurality of check modules CMa, CMb, CMc, and CMd may be different from each other. Also, the plurality of check modules CMa, CMb, CMc, and CMd may be different in the number of times of the dummy read operation. As a result, even though the plurality of check modules CMa, CMb, CMc, and CMd have the same interval of the reliability operation, delay periods respectively corresponding to the plurality of check modules CMa, CMb, CMc, and CMd may be different from each other.

The reliability manager 1219 of the storage controller 1210 may individually manage the delay period of each of the plurality of check modules CMa, CMb, CMc, and CMd. The reliability manager 1219 of the storage controller 1210 may select a check module having the shortest delay period from among the plurality of check modules CMa, CMb, CMc, and CMd as a check module to be skipped. As an example, as described with reference to Equation 1, as the interval of the reliability operation, in other words, the interval of the dummy read operation corresponding to a check module increases, the delay period RRTE corresponding to the check module increases. In this case, the delay period RRTE of the check module to be skipped increases by selecting the check module having the shortest delay period RRTE as a check module to be skipped. Even though the delay period RRTE of the check module to be skipped increases, because the delay period RRTE thereof is included within the delay period RRTE of any other check module (in particular, a check module whose delay period RRTE is the longest), the overall reduction of reliability does not occur (i.e., the reclaimed block is normally determined).

In operation S1634, the storage controller 1210 may update a check module skip status based on the selected check module. In an embodiment, in a next reliability operation, the storage controller 1210 may skip or omit the dummy read operation of the check module selected based on the updated check module skip status.

As described above, when the collected error size EB is smaller than the reference value TH, the storage controller 1210 may select at least one check module corresponding to a minimum value among the collected error information as a check module to be skipped. In contrast, when the collected error size EB is greater than or equal to the reference value TH, the storage controller 1210 may select a check module to be skipped, based on the delay period of each of the plurality of check modules. In an embodiment, that the error size EB is greater than or equal to the reference value TH means that an error size is relatively large in all the dummy read operations corresponding to the reliability operation. This means that the first memory block BLK1 targeted for the reliability operation is not determined as the reclaimed block but the degree of degradation is relatively high. In this case, when a check module to be skipped is selected simply based on the size of error information, the reclaimed block may not be selected normally under a specific condition. Accordingly, when the error size EB is greater than or equal to the reference value TH (i.e., the degree of degradation of a memory block is relatively high), the storage controller 1210 may select a check module to be skipped, based on the delay period of each check module. In this case, as described above, the dummy read operation corresponding to a specific check module may be omitted, and the reclaimed block may be normally determined.

Figure 21:
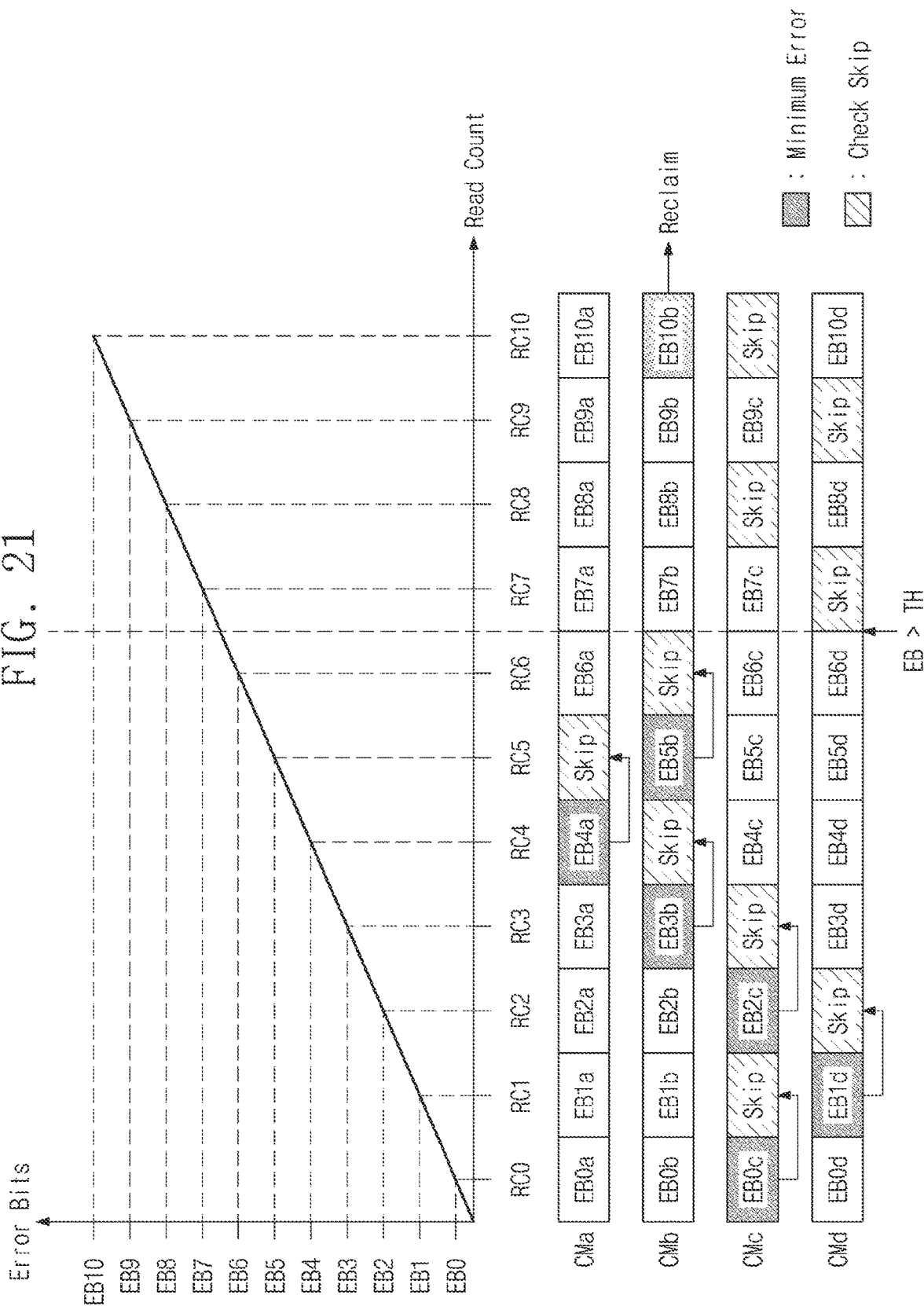
FIG. 21 is a diagram for describing an operation according to the flowchart of FIG. 20.

FIG. 21 is a diagram for describing an operation according to the flowchart of FIG. 20. For convenience of description, additional description associated with the components described above will be omitted to avoid redundancy. In the graph of FIG. 17, a horizontal axis represents a read count of the first memory block BLK1, and a vertical axis represents the number of error bits of the first memory block BLK1.

Referring to FIGS. 1, 13, 14, 20, and 21, the storage controller 1210 may perform the reliability operation of the first memory block BLK1 at each of the 0-th to tenth read counts RC0 to RC10 of the first memory block BLK1. In this case, at each of the 0-th to sixth read counts RC0 to RC6, the storage controller 1210 may skip or omit operations of some check modules based on the method described with reference to FIGS. 18 and 19.

In an embodiment, a result of the reliability operation performed at the sixth read count RC6 of the first memory block BLK1 (i.e., the error size EB) may be greater than the reference value TH. That is, after the sixth read count RC6, the first memory block BLK1 may be overall degraded. In this case, the storage controller 1210 may select a check module to be skipped, based on the delay period of each of the plurality of check modules CMa, CMb, CMc, and CMd.

For example, at the seventh read count RC7 of the first memory block BLK1, the storage controller 1210 may perform the reliability operation on the first memory block BLK1. In this case, the storage controller 1210 may select the d-th check module CMd having the longest delay period as a check module to be skipped. That is, the storage controller 1210 may perform the reliability operation on the first memory block BLK1 by using the remaining check modules CMa, CMb, and CMc other than the d-th check module CMd.

Next, at the eighth read count RC8 of the first memory block BLK1, the storage controller 1210 may perform the reliability operation on the first memory block BLK1. In this case, the storage controller 1210 may select the c-th check module CMd having the shortest delay period as a check module to be skipped. That is, the storage controller 1210 may perform the reliability operation on the first memory block BLK1 by using the remaining check modules CMa, CMb, and CMd other than the c-th check module CMc.

Then, at each of the ninth and tenth read counts RC9 and RC10 of the first memory block BLK1, the storage controller 1210 may perform the reliability operation on the first memory block BLK1. In this case, as in the above description, the storage controller 1210 may select a check module to be skipped, based on the delay period of each check module.

Figure 22:
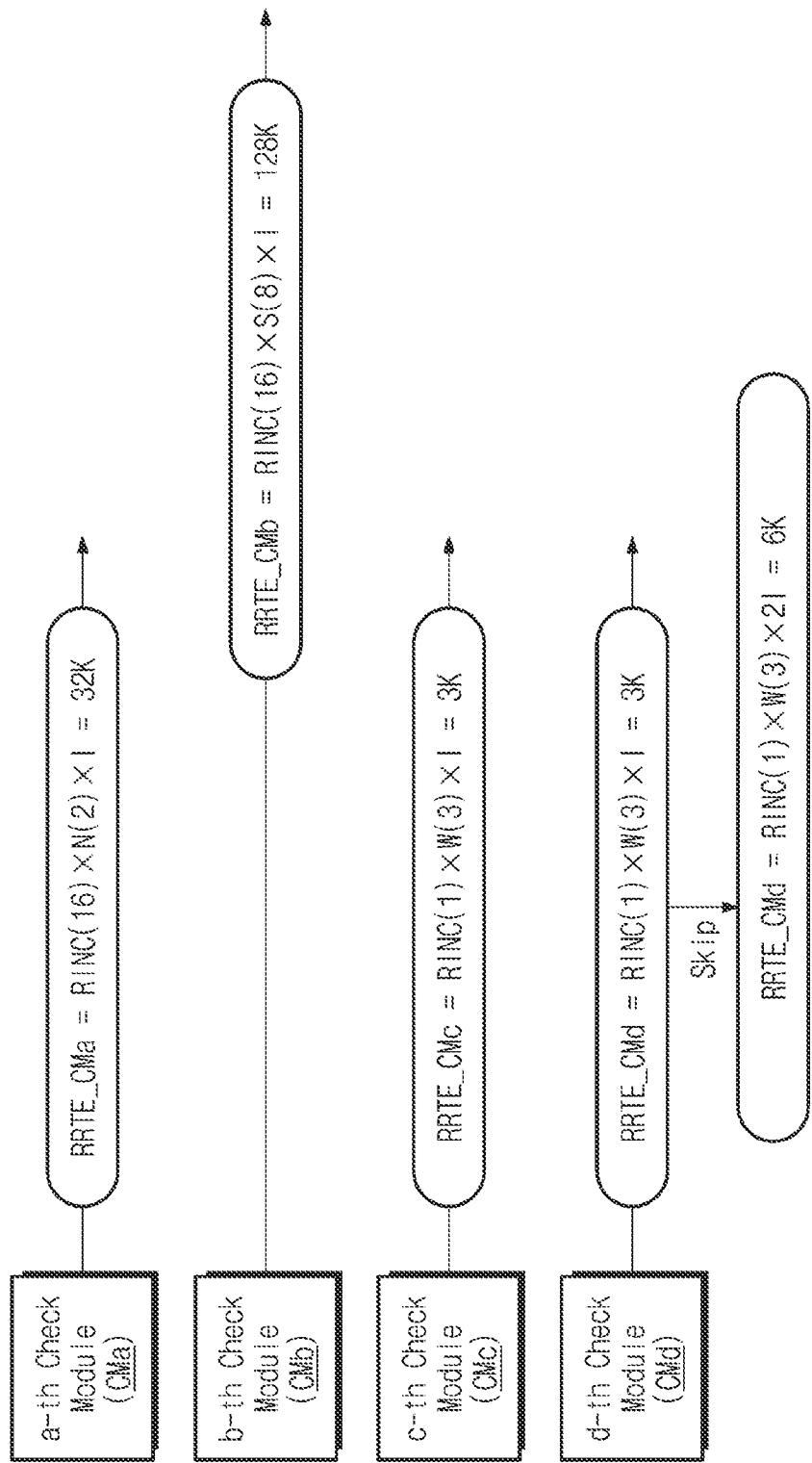
FIG. 22 is a diagram illustrating a delay period for each of a plurality of check modules.

FIG. 22 is a diagram illustrating a delay period for each of a plurality of check modules. Referring to FIGS. 13 and 22, delay periods of the plurality of check modules CMa to CMd may be different from each other.

For example, the delay period of each of the plurality of check modules CMa to CMd may be calculated based on Equation 1. Assuming that the interval I of the reliability operation is 1K, a delay period RRTE_CMa of the a-th check module CMa may be 32K (=RINC(16)×N(2)×1), a delay period RRTE_CMb of the b-th check module CMb may be 128K (=RINC(16)×S(8)×1), a delay period RRTE_CMc of the c-th check module CMc may be 3K (=RINC(1)×W(3)×1), and a delay period RRTE_CMd of the d-th check module CMd may be 3K (=RINC(1)×W(3)×1). In this case, the storage controller 1210 may select the d-th check module CMd having the shortest delay period as a check module to be skipped. When the d-th check module CMd is skipped once, a valid interval may increase two times; in this case, the delay period of the d-th check module CMd may increase to 6K (=RINC(1)×W(3)×21). Accordingly, even though the dummy read operation of a check module having the shortest delay period is skipped, the reclaimed block may be normally determined.

Figure 23:
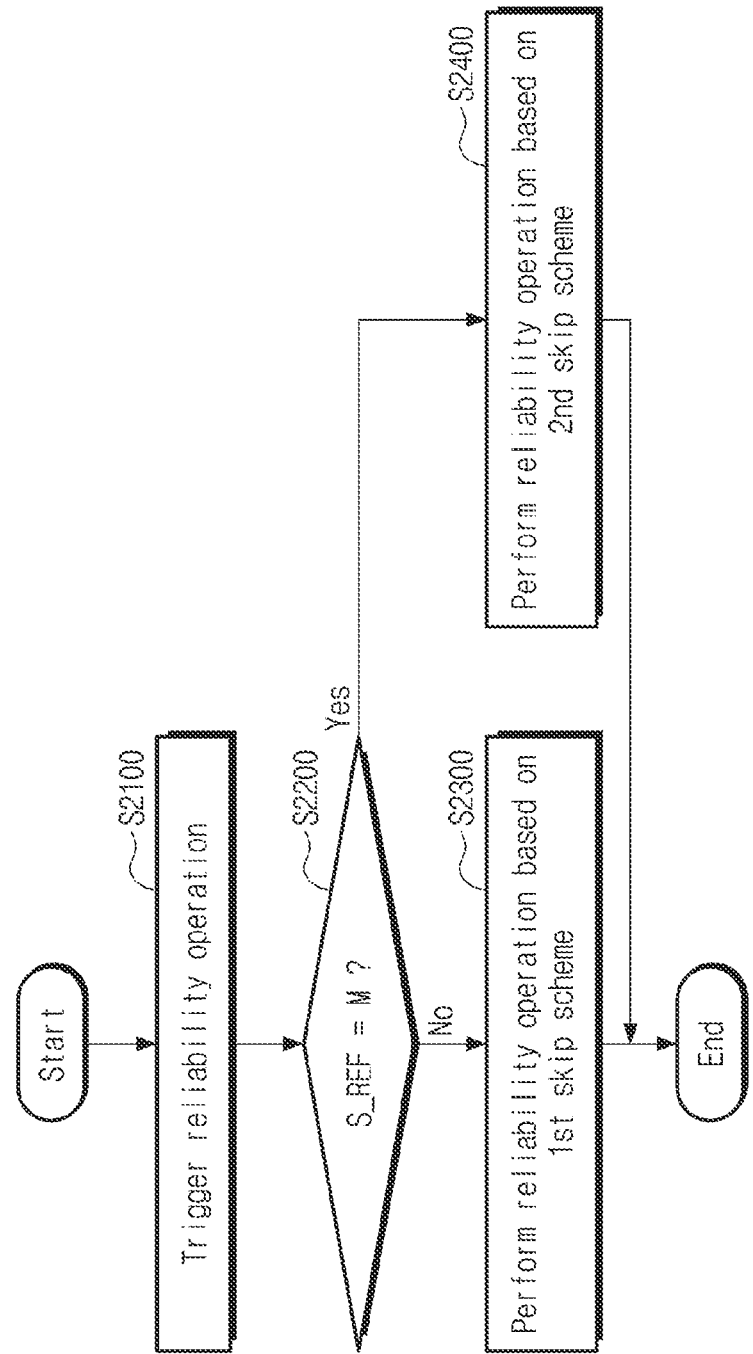
FIG. 23 is a flowchart illustrating an operation of a storage controller of FIG. 1.

FIG. 23 is a flowchart illustrating an operation of a storage controller of FIG. 1. Referring to FIGS. 1 and 23, the storage controller 1210 may perform the reliability operation on the first memory block BLK1 every given interval or arbitrary interval. In this case, the storage controller 1210 may skip some reliability operations or may omit operations of some check modules.

For example, in operation S2100, the storage controller 1210 may trigger the reliability operation on the first memory block BLK1. For example, as the nonvolatile memory device 1220 operates, the read count of the target block may reach a given interval or a random interval; in this case, the reliability manager 1219 of the storage controller 1210 may initiate the reliability operation of the target block.

In operation S2200, the storage controller 1210 may determine whether the skip reference value S_REF of the first memory block BLK1 is "M". Herein, "M" may be an integer of 0 or more, and for convenience of description, it is assumed that "M" is "0". That is, the storage controller 1210 may determine whether the skip reference value S_REF of the first memory block BLK1 is "0".

When the skip reference value S_REF is not "O", in operation S2300, the storage controller 1210 may perform the reliability operation based on a first skip scheme. In an embodiment, the first skip scheme may indicate a scheme in which a skip count of the reliability operation is compared with a skip reference value and the reliability operation is selectively skipped based on a comparison result. As an example, the first skip scheme may indicate the operation method described with reference to FIGS. 1 to 11.

When the skip reference value S_REF is "0", in operation S2400, the storage controller 1210 may perform the reliability operation based on a second skip scheme. In an embodiment, the second skip scheme may indicate a scheme in which the dummy read operations of at least some of a plurality of check modules are skipped. As an example, the second skip scheme may indicate the operation method described with reference to FIGS. 13 to 22.

Figure 24:
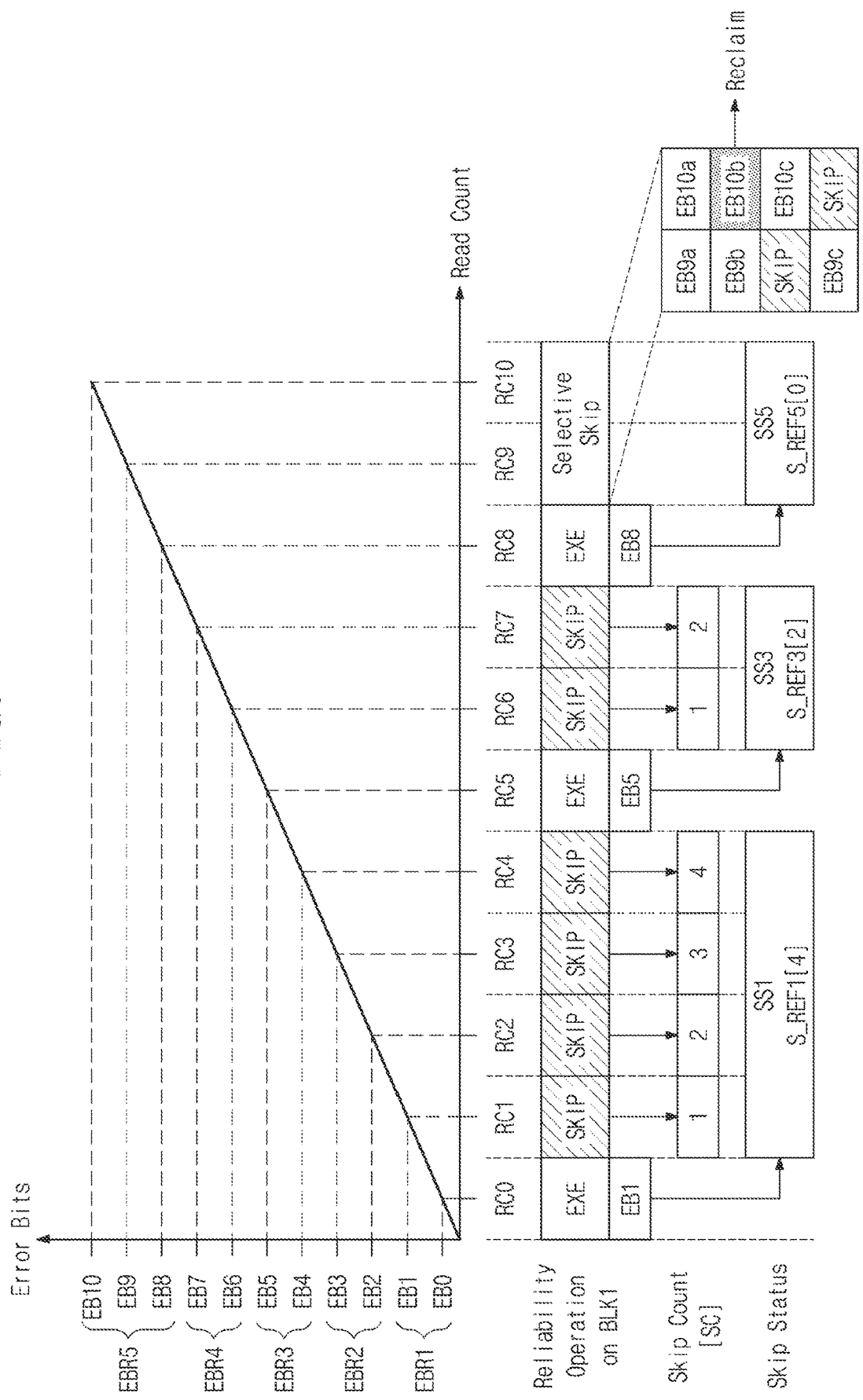
FIG. 24 is a diagram for describing an operation according to the flowchart of FIG. 23.

FIG. 24 is a diagram for describing an operation according to the flowchart of FIG. 23. In the graph of FIG. 24, a horizontal axis represents a read count of the first memory block BLK1, and a vertical axis represents the number of error bits of the first memory block BLK1. The storage controller 1210 may trigger or initiate the reliability operation at each of the 0-th to tenth read counts RC0 to RC10. In this case, based on the operation method described with reference to FIG. 7, the storage controller 1210 may perform the reliability operation on the first memory block BLK1 at each of the 0-th to tenth read counts RC0 to RC8 of the first memory block BLK1. For example, as illustrated in FIG. 24, the storage controller 1210 may perform the reliability operation at each of the 0-th, fifth, and eighth read counts RC0, RC5, and RC8 of the first memory block BLK1 and may skip the reliability operation at each of the first, second, third, fourth, sixth, and seventh read counts RC1, RC2, RC3, RC4, RC6, and RC7 of the first memory block BLK1.

The skip reference value S_REF5 may be set to "0" based on a result of the reliability operation performed at the eighth read count RC8 of the first memory block BLK1. In this case, at each of the ninth and tenth read counts RC9 and RC10 of the first memory block BLK1, the storage controller 1210 may skip the dummy read operation corresponding to a specific check module (e.g., CMc and CMd).

In the embodiment described with reference to FIGS. 23 and 24, the description is given as the first skip scheme refers to the method in which an operation is skipped in units of reliability operation and the second skip scheme refers to the method in which an operation is skipped in units of check module, but the present disclosure is not limited thereto. For example, the first skip scheme may refer to the method described with reference to FIGS. 16 and 17 (i.e., the method of managing a skip count and a skip reference value in units of check module), and the second skip scheme may refer to the method described with reference to FIGS. 18 and 19 or the method described with reference to FIGS. 20 and 21. The above embodiments may be individually implemented, or at least some of the above embodiments may be combined in various schemes.

As described above, the storage controller 1210 according to an embodiment of the present disclosure may skip the dummy read operations corresponding to some check modules in the reliability operation. As the dummy read operations corresponding to some check modules are skipped, the overhead of the storage device 1200 may decrease, and the performance of the storage device 1200 may be improved. Also, because the dummy read operations corresponding to some check modules are skipped depending on a specific condition, the reclaimed block may be normally determined. That is, the reliability of the storage device 1200 may be improved.

Figure 25:
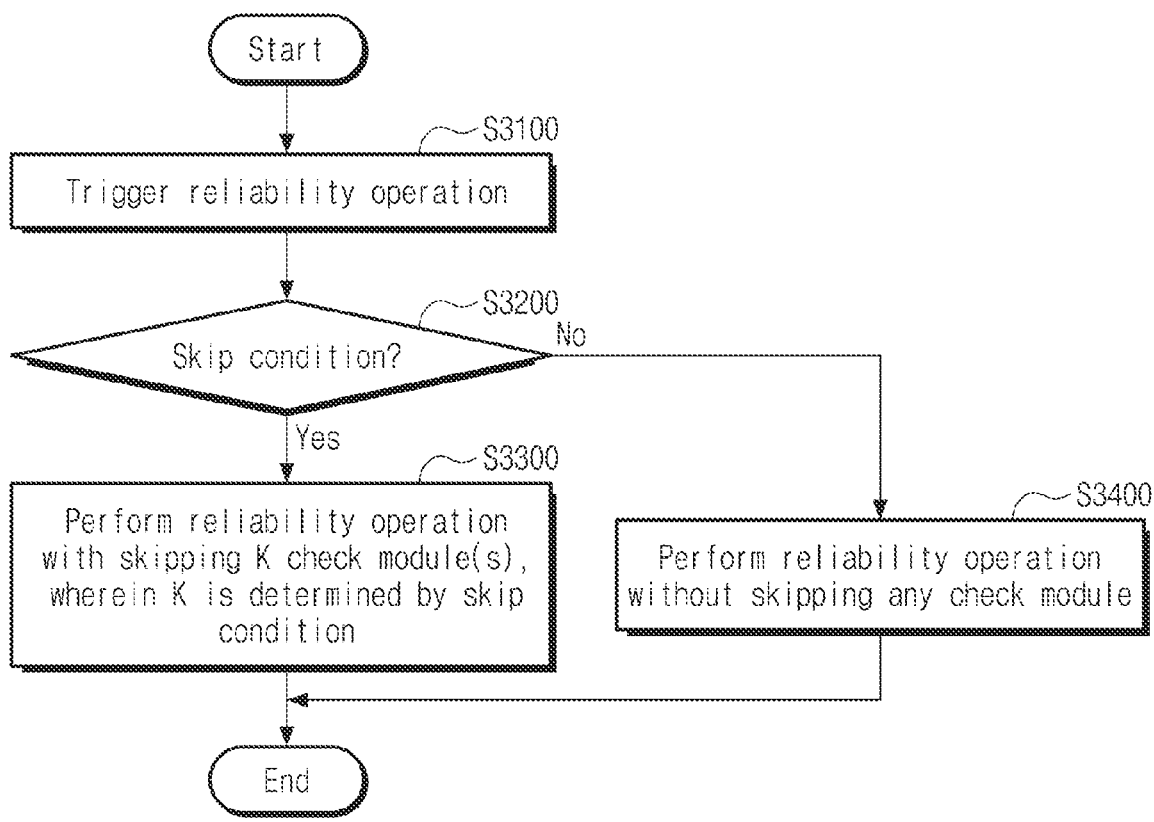
FIG. 25 is a flowchart illustrating an operation of a storage controller of FIG. 1.
Figure 26:
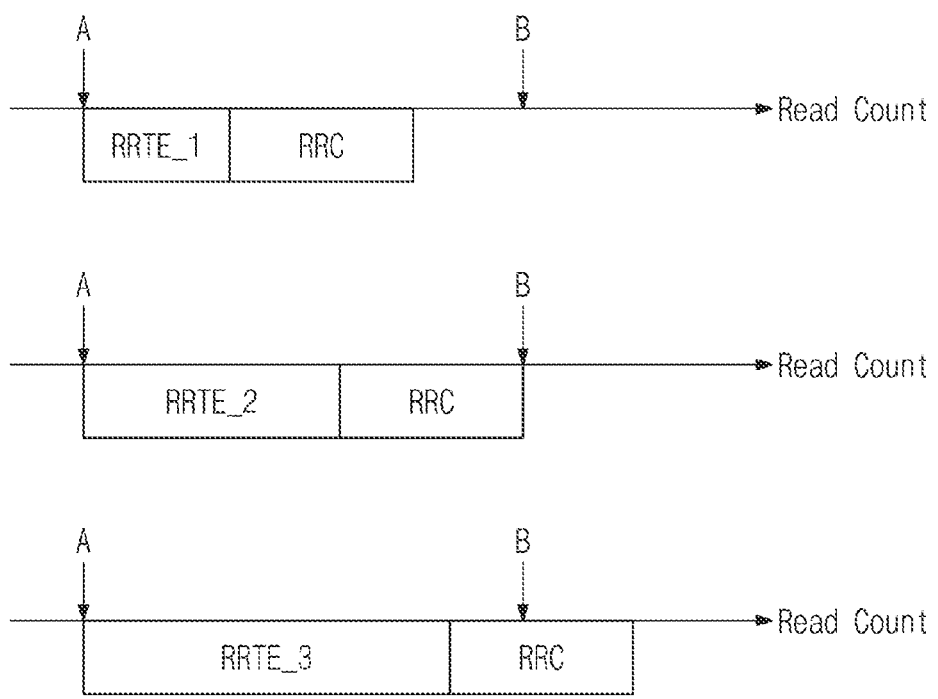
FIG. 26 is a diagram for describing a skip condition in operation S3200 of FIG. 25.

FIG. 25 is a flowchart illustrating an operation of a storage controller of FIG. 1. FIG. 26 is a diagram for describing a skip condition in operation S3200 of FIG. 25. Referring to FIGS. 1, 25, and 26, the storage controller 1210 may perform the reliability operation on the first memory block BLK1 every given interval or arbitrary interval. In this case, the storage controller 1210 may omit operations of some check modules.

In the above embodiments, the storage controller 1210 may select a check module to be skipped, based on a result of a previous reliability operation (i.e., an error size). In contrast, according to the flowchart of FIG. 25, the storage controller 1210 may select arbitrary check modules among a plurality of check modules as a check module to be skipped, based on a skip condition.

For example, in operation S3100, the storage controller 1210 may trigger the reliability operation on the first memory block BLK1. In an embodiment, operation S3100 is similar to operation S2100 of FIG. 23, and thus, additional description will be omitted to avoid redundancy. For convenience, the reliability operation of the first memory block BLK1 will be described, but the present disclosure is not limited thereto.

In operation S3200, the storage controller 1210 may determine whether the skip condition of a check module is satisfied. For example, the skip condition may be determined based on the delay period RRTE of the reliability operation, a maximum read count (hereinafter referred to as a "reclaim read count") RRC required for reclaim, and a usable read count URC.

For example, the delay period RRTE of the reliability operation indicates an interval of a read count by which the reclaim determination associated with the first memory block BLK1 is delayed, as described with reference to Equation 1. That is, it may be guaranteed that the reclaim determination is performed at least once (i.e., the reliability operation is performed at least once) in an interval from at least a current read count to the delay period RRTE.

The reclaim read count RRC may indicate a difference between a read count at which the first memory block BLK1 is determined as the reclaimed block and a read count at which the reclaim operation of the first memory block BLK1 is completed. In other words, the reclaim read count RRC may indicate a maximum read count necessary to complete the reclaim operation.

The usable read count URC may indicate an interval from a read count at which the first memory block BLK1 is determined as the reclaimed block to a read count at which the UECC occurs, when the read operation is repeatedly performed in the first memory block BLK1. For example, when the read operation is repeatedly performed in the first memory block BLK1, the read count at which the first memory block BLK1 is determined as the reclaimed block (i.e., a read count at which an error of the first memory block BLK1 reaches a reclaim reference value) is referred to as "A", and the read count at which the error of the first memory block BLK1 exceeds an error correction level (i.e., a read count at which the UECC occurs) is referred to as "B". In this case, the usable read count URC may be expressed by "B−A". In other words, the usable read count URC may indicate an interval from the read count at which the error level of the first memory block BLK1 reaches the reclaim reference value to the read count at which the UECC occurs.

In an embodiment, the usable read count URC and the reclaim read count RRC may be determined through the preliminary evaluation of the first memory block BLK1 or the nonvolatile memory device 1220. For example, in the process of manufacturing the nonvolatile memory device

1220, various preliminary evaluations may be performed with respect to the nonvolatile memory device 1220, and the usable read count URC and the reclaim read count RRC may be determined through the preliminary evaluation process.

The delay period RRTE, the reclaim read count RRC, and the usable read count URC may be defined as described above; in this case, each component may be set to satisfy Equation 2 below.

$$RRTE+RRC<URC \qquad \text{[Equation 2]}$$

In Equation 2 above, RRTE represents a delay period, RRC represents a reclaim read count, and URC represents a usable read count. The delay period RRTE, the reclaim read count RRC, and the usable read count URC are described above, and thus, additional description will be omitted to avoid redundancy.

As expressed by Equation 2 above, a sum of the delay period RRTE and the reclaim read count RRC should be smaller than the usable read count URC. For example, the usable read count URC indicates a read count (i.e., "B–A") from a read count (i.e., "A" of FIG. 26) at which the error size of the first memory block BLK1 exceeds the reclaim threshold value to a read count (i.e., "B" of FIG. 26) at which the UECC occurs. In other words, in the interval (i.e., "B–A") of the usable read count URC, the determination of the reclaimed block should be performed, and the reclaim operation should be completed. That is, as understood from Equation 2 above, when the sum of the delay period RRTE and the reclaim read count RRC is smaller than the usable read count URC, the reliability of the first memory block BLK1 may be guaranteed.

In detail, as illustrated in FIG. 26, the first read count "A" may indicate a read count at which the first memory block BLK1 includes an error of the reclaim threshold value, and the second read count "B" may indicate a read count at which the error of the first memory block BLK1 exceeds a correction level. In this case, when the delay period is equal to RRTE_3, the error of the first memory block BLK1 may exceed the correction level while the reclaim operation is performed. That is, the reliability of the first memory block BLK1 is not guaranteed. In contrast, when the delay period is equal to RRTE_1 or RRTE_2, the reclaim determination and the reclaim operation of the first memory block BLK1 may be normally performed. That is, the reliability of the first memory block BLK1 may be guaranteed.

In an embodiment, when the delay period is equal to RRTE_1, even though the delay period increases, the reliability of the first memory block BLK1 may be guaranteed. For example, RRTE_1 may be smaller than RRTE_2. In this case, even though the delay period increases to RRTE_2, the reclaim determination and the reclaim operation of the first memory block BLK1 may be normally performed.

In an embodiment, the delay period RRTE may be determined based on Equation 1. That is, the interval INT in which the reliability operation is performed may be increased to increase the delay period RRTE. Alternatively, when the reliability operation is performed by using a plurality of check modules, some check modules may be skipped. Assuming that the number of check modules is "C" and the number of check modules to be skipped is "K", the delay period may be expressed by Equation 3 below.

$$RRTE_{SKIP} = \frac{C}{C-K} RRTE \qquad \text{[Equation 3]}$$

In Equation 3, RRTE represents a delay period of the first memory block BLK1 determined by a preset interval of the reliability operation, "C" represents the total number of check modules, "K" represents the number of check modules to be skipped, and RRTESKIP represents a delay period determined by the skip of "S" check modules. That is, in the reliability operation of the first memory block BLK1, when the dummy read operations of "K" check modules among the "C" check modules are omitted, the delay period (i.e., RRTESKIP) of the first memory block BLK1 may increase to "C/(C–K)×RRTE". In other words, when the dummy read operation of at least one check module is omitted, the delay period may increase.

In an embodiment, when the increased delay period (i.e., RRTESKIP) satisfies Equation 2 above, the reliability of the first memory block BLK1 may be guaranteed.

Returning to FIG. 25, when the skip condition is satisfied (i.e., when Equation 2 and Equation 2 are satisfied), in operation S3300, the storage controller 1210 may skip the "k" check modules and may perform the reliability operation. For example, when the dummy read operations of the "K" check modules are skipped, because the delay period increases as much as "C/(C–K)" but Equation 2 and Equation 3 are satisfied, the reliability of the first memory block BLK1 may be maintained. That is, even though the dummy read operations of some check modules are omitted, the reclaim determination and the reclaim operation of the first memory block BLK1 may be normally performed. In an embodiment, when the skip condition is satisfied, the "K" check modules to be skipped may be determined in an arbitrary order or a give order.

When the skip condition is not satisfied, in operation S3400, the storage controller 1210 may perform the reliability operation without skipping a check module(s).

As described above, the interval INT of the reliability operation, the delay period RRTE, the reclaim read count RRC, and the usable read count URC may be determined through the preliminary evaluation of the nonvolatile memory device 1220. In this case, the number of check modules to be skipped may be determined such that the skip condition (e.g., Equation 2 and Equation 3) is satisfied. In the reliability operation of the first memory block BLK1, the storage controller 1210 may skip the dummy read operations of a determined number of check modules (i.e., "K" check modules). In an embodiment, check modules to be skipped may be selected from a plurality of check modules depending on an arbitrary order or a preset order. Accordingly, the overhead for the reliability operation or the reduction of performance may decrease.

Figure 27:
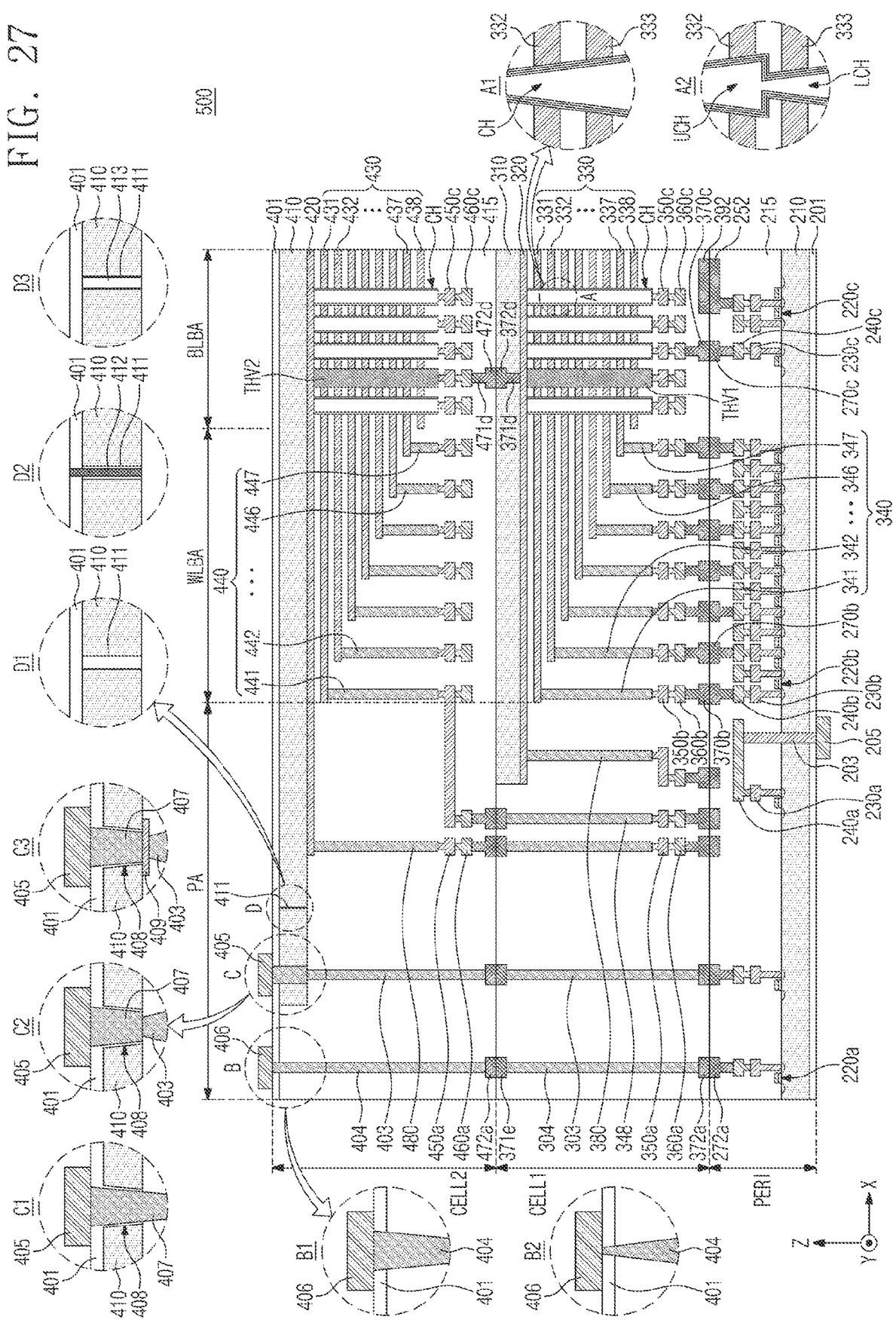
FIG. 27 is a cross-sectional diagram for describing a memory device according to an embodiment of the present disclosure.

FIG. 27 illustrates a memory device 500 according to an illustrative embodiment of the present disclosure.

Referring to FIG. 27, the memory device 500 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may include a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W), without limitation thereto.

The memory device 500 may include the at least one upper chip including the cell region. For example, as illustrated in FIG. 26, the memory device 500 may include two upper chips. However, the number of the upper chips is not limited thereto. In the case in which the memory device 500 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 500. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 26. However, embodiments of the inventive concepts are not limited thereto. In an embodiment, one of the first upper chip and the second upper chip may be turned over and then may be connected to a corresponding chip by the bonding method.

Each of the peripheral circuit region PERI and the first and second cell regions CELL1 and CELL2 of the memory device 500 may include an external pad bonding region PA, a word-line bonding region WLBA, and a bit-line bonding region BLBA.

The peripheral circuit region PERI may include a first substrate 210 and a plurality of circuit elements 220a, 220b and 220c formed on the first substrate 210. An interlayer insulating layer 215 including one or more insulating layers may be provided on the plurality of circuit elements 220a, 220b and 220c. A plurality of metal lines electrically connected to the plurality of circuit elements 220a, 220b and 220c may be provided in the interlayer insulating layer 215. For example, the plurality of metal lines may include first metal lines 230a, 230b and 230c connected to the plurality of circuit elements 220a, 220b and 220c, and second metal lines 240a, 240b and 240c formed on the first metal lines 230a, 230b and 230c. The plurality of metal lines may be formed of at least one of various conductive materials. For example, the first metal lines 230a, 230b and 230c may be formed of tungsten and have a relatively high electrical resistivity, and the second metal lines 240a, 240b and 240c may be formed of copper and have a relatively low electrical resistivity.

The first metal lines 230a, 230b and 230c and the second metal lines 240a, 240b and 240c are illustrated and described in the present embodiment. However, embodiments of the inventive concepts are not limited thereto. In an embodiment, at least one or more additional metal lines may further be formed on the second metal lines 240a, 240b and 240c. In this case, the second metal lines 240a, 240b and 240c may be formed of aluminum, and at least some of the additional metal lines formed on the second metal lines 240a, 240b and 240c may be formed of copper and have an electrical resistivity lower than that of aluminum of the second metal lines 240a, 240b and 240c.

The interlayer insulating layer 215 may be disposed on the first substrate 210, and may include an insulating material such as silicon oxide and/or silicon nitride, without limitation thereto.

Each of the first and second cell regions CELL1 and CELL2 may include at least one memory block. The first cell region CELL1 may include a second substrate 310 and a common source line 320. A plurality of word-lines 330 (331 to 338) may be stacked on the second substrate 310 in a direction (e.g., the Z-axis direction) substantially perpendicular to a top surface of the second substrate 310. String selection lines and a ground selection line may be disposed on and under the word-lines 330, and the plurality of word-lines 330 may be disposed between the string selection lines and the ground selection line. Moreover, the second cell region CELL2 may include a third substrate 410 and a common source line 420, and a plurality of word-lines 430 (431 to 438) may be stacked on the third substrate 410 in a direction (e.g., the Z-axis direction) substantially perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In an embodiment, as illustrated in a region 'A1', the channel structure CH may be provided in the bit-line bonding region BLBA and may extend in the direction substantially perpendicular to the top surface of the second substrate 310 to penetrate the word-lines 330, the string selection lines, and the ground selection line. The channel structure CH may include a data storage layer, a channel layer, and a filling insulation layer. The channel layer may be electrically connected to a first metal line 350c and a second metal line 360c in the bit-line bonding region BLBA. For example, the second metal line 360c may be a bit-line and may be connected to the channel structure CH through the first metal line 350c. The bit-line 360c may extend in a first direction (e.g., a Y-axis direction) substantially parallel to the top surface of the second substrate 310.

In an embodiment, as illustrated in a region 'A2', the channel structure CH may include a lower channel LCH and an upper channel UCH, which are connected to each other. For example, the channel structure CH may be formed by a process of forming the lower channel LCH and a process of forming the upper channel UCH. The lower channel LCH may extend in the direction substantially perpendicular to the top surface of the second substrate 310 to penetrate the common source line 320 and lower word-lines 331 and 332. The lower channel LCH may include a data storage layer, a channel layer, and a filling insulation layer and may be connected to the upper channel UCH. The upper channel UCH may penetrate upper word-lines 333 to 338. The upper channel UCH may include a data storage layer, a channel layer, and a filling insulation layer, and the channel layer of the upper channel UCH may be electrically connected to the first metal line 350c and the second metal line 360c. As a length of a channel increases, due to characteristics of manufacturing processes, it may be difficult to form a channel having a substantially uniform width. The memory device 500 according to the present embodiment may include a channel having improved width uniformity due to the lower channel LCH and the upper channel UCH which are formed by the processes performed sequentially.

In the case in which the channel structure CH includes the lower channel LCH and the upper channel UCH as illustrated in the region 'A2', a word-line located near to a boundary between the lower channel LCH and the upper channel UCH may be a dummy word-line. For example, the word-lines 332 and 333 adjacent to the boundary between the lower channel LCH and the upper channel UCH may be the dummy word-lines. In this case, data need not be stored in memory cells connected to the dummy word-line. Alternatively, the number of pages corresponding to the memory cells connected to the dummy word-line may be less than the number of pages corresponding to the memory cells connected to a general word-line. A level of a voltage applied to the dummy word-line may be different from a level of a voltage applied to the general word-line, and thus it is possible to reduce an influence of a non-uniform channel width between the lower and upper channels LCH and UCH on an operation of the memory device.

The number of the lower word-lines 331 and 332 penetrated by the lower channel LCH may be less than the number of the upper word-lines 333 to 338 penetrated by the upper channel UCH in the region 'A2'. However, embodiments of the inventive concepts are not limited thereto. In an embodiment an embodiment, the number of the lower word-lines penetrated by the lower channel LCH may be equal to or greater than the number of the upper word-lines penetrated by the upper channel UCH. In addition, structural features and connection relation of the channel structure CH disposed in the second cell region CELL2 may be substantially the same as those of the channel structure CH disposed in the first cell region CELL1.

In the bit-line bonding region BLBA, a first through-electrode THV1 may be provided in the first cell region CELL1, and a second through-electrode THV2 may be provided in the second cell region CELL2. As illustrated in FIG. 26, the first through-electrode THV1 may penetrate the common source line 320 and the plurality of word-lines 330. In an embodiment, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have substantially the same shape and structure as the first through-electrode THV1.

In an embodiment, the first through-electrode THV1 and the second through-electrode THV2 may be electrically connected to each other through a first through-metal pattern 372d and a second through-metal pattern 472d. The first through-metal pattern 372d may be formed at a bottom end of the first upper chip including the first cell region CELL1, and the second through-metal pattern 472d may be formed at a top end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by the bonding method. As used herein, it shall be understood that terms such as "top" and "bottom" are relative, and are not limited thereto.

In addition, in the bit-line bonding region BLBA, an upper metal pattern 252 may be formed in an uppermost metal layer of the peripheral circuit region PERI, and an upper metal pattern 392 having substantially the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit-line bonding region BLBA, the bit-line 360c may be electrically connected to a page buffer included in the peripheral circuit region PERI. For example, some of the circuit elements 220c of the peripheral circuit region PERI may constitute the page buffer, and the bit-line 360c may be electrically connected to the circuit elements 220c constituting the page buffer through an upper bonding metal pattern 370c of the first cell region CELL1 and an upper bonding metal pattern 270c of the peripheral circuit region PERI.

Referring continuously to FIG. 26, in the word-line bonding region WLBA, the word-lines 330 of the first cell region CELL1 may extend in a second direction (e.g., an X-axis direction) substantially parallel to the top surface of the second substrate 310 and may be connected to a plurality of cell contact plugs 340 (341 to 347). First metal lines 350b and second metal lines 360b may be sequentially connected onto the cell contact plugs 340 connected to the word-lines 330. In the word-line bonding region WLBA, the cell contact plugs 340 may be connected to the peripheral circuit region PERI through upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder, and the cell contact plugs 340 may be electrically connected to the circuit elements 220b constituting the row decoder through the upper bonding metal patterns 370b of the first cell region CELL1 and the upper bonding metal patterns 270b of the peripheral circuit region PERI. In an embodiment, an operating voltage of the circuit elements 220b constituting the row decoder may be different from an operating voltage of the circuit elements 220c constituting the page buffer. For example, the operating voltage of the circuit elements 220c constituting the page buffer may be greater than the operating voltage of the circuit elements 220b constituting the row decoder.

Moreover, in the word-line bonding region WLBA, the word-lines 430 of the second cell region CELL2 may extend in the second direction (e.g., the X-axis direction) substantially parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word-line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by the bonding method. The upper bonding metal patterns 370b and the upper bonding metal patterns 270b may be formed of aluminum, copper, or tungsten.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by the bonding method in the external pad bonding region PA. Moreover, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon, without limitation. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be disposed in the external pad bonding region PA. Referring to FIG. 26, a lower insulating layer 201 may cover a bottom surface of the first substrate 210, and a first input/output pad 205 may be formed on the lower insulating layer 201. The first input/output pad 205 may be connected to at least one of a plurality of the circuit elements 220a disposed in the peripheral circuit region PERI through a first input/output contact plug 203 and may be separated from the first substrate 210 by the lower insulating layer 201. In addition, a side insulating layer may be disposed between the first input/output contact plug 203 and the first substrate 210 and may electrically isolate the first input/output contact plug 203 from the first substrate 210.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220a disposed in the peripheral circuit region PERI through second input/output contact plugs 403 and 303, and the third input/output pad 406 may be connected to at least one of the plurality of circuit elements 220a disposed in the peripheral circuit region PERI through third input/output contact plugs 404 and 304.

In an embodiment, the third substrate 410 need not be disposed in a region in which the input/output contact plug is disposed. For example, as illustrated in a region 'B', the third input/output contact plug 404 may be separated from the third substrate 410 in a direction substantially parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In an embodiment, as illustrated in a region 'B1', the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In an embodiment as illustrated in a region 'B2', the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In an embodiment, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In an embodiment as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the inventive concepts are not limited thereto. In an embodiment, the diameter of the second input/output contact plug 403 may become progressively less toward the second input/output pad 405.

In an embodiment, as illustrated in a region 'C2', the opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In an embodiment illustrated in a region 'C3', a stopper 409 may further be formed on a bottom end of the opening 408 of the third substrate 410, as compared with an embodiment of the region 'C2'. The stopper 409 may be a metal line formed in substantially the same layer as the common source line 420. Alternatively, the stopper 409 may be a metal line formed in substantially the same layer as at least one of the word-lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371e or may become progressively greater toward the lower metal pattern 371e.

In an embodiment, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In an embodiment, as illustrated in a region 'D1', the slit 411 may be formed to penetrate the third substrate 410. For example, the slit 411 may be used to prevent the third substrate 410 from being finely cracked when the opening 408 is formed. However, embodiments of the inventive concepts are not limited thereto, and in an embodiment, the slit 411 may be formed to have a depth ranging from about 60% to about 70% of a thickness of the third substrate 410.

In an embodiment, as illustrated in a region 'D2', a conductive material 412 may be formed in the slit 411. For example, the conductive material 412 may be used to substantially discharge a leakage current occurring in driving of the circuit elements in the external pad bonding region PA to the outside. In this case, the conductive material 412 may be connected to an external ground line.

In an embodiment, as illustrated in a region 'D3', an insulating material 413 may be formed in the slit 411. For example, the insulating material 413 may be used to substantially electrically isolate the second input/output pad 405 and the second input/output contact plug 403 disposed in the external pad bonding region PA from the word-line bonding region WLBA. Since the insulating material 413 is formed in the slit 411, it is possible to prevent a voltage provided through the second input/output pad 405 from affecting a metal layer disposed on the third substrate 410 in the word-line bonding region WLBA.

In an embodiment, the first to third input/output pads 205, 405 and 406 may be selectively formed. For example, the memory device 500 may be realized to include only the first input/output pad 205 disposed on the first substrate 210, to include only the second input/output pad 405 disposed on the third substrate 410, or to include only the third input/output pad 406 disposed on the upper insulating layer 401.

In an embodiment, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Moreover, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

In an embodiment, the first reliability operation respectively corresponds to the first memory block, and the second reliability operation respectively corresponds to a second memory block. In an embodiment, the respective reliability operation is initiated based on a given interval indicating a read count period of the respective memory block. In an embodiment, the respective reliability operation indicates an operation of reading data from memory cells connected with at least one word-line included in the respective memory block, and detecting and correcting an error of the read data.

In an embodiment, the selective skipping or performing of the respective reliability operation includes: when the number of consecutively skipped instances of the respective reliability operation is less than the respective skip reference value, skipping the next instance of the respective reliability operation; and when the number of consecutively skipped instances of the respective reliability operation is equal to or greater than the respective skip reference value, performing the next instance of the respective reliability operation to obtain respective error information of the respective memory block.

In an embodiment, the respective reliability operation includes performing a reclaim operation on the respective memory block when the respective error information is greater than or equal to a threshold value. In an embodiment, the respective reliability operation includes updating the respective skip reference value of the respective memory block based on the respective error information when the respective error information is less than a threshold value. In an embodiment, the updated respective skip reference value is less than the respective skip reference value. In an embodiment, the second skip reference value is reset when the respective error information exceeds a given reference value less than the threshold value.

In an embodiment, the respective reliability operation includes initiating a second instance of the respective reliability operation of the respective memory block; after the first instance of the respective reliability operation is performed, determining whether a respective number of consecutively skipped instances of the respective reliability operation is equal to or greater than the updated respective skip reference value; and selectively skipping or performing the second instance of the respective reliability operation based on the determination result. In an embodiment, an interval between a first read count at which the first instance of the respective reliability operation is performed and a second read count at which the second instance of the respective reliability operation is performed corresponds to a reference interval.

In an embodiment, the respective skip reference value is set based on initial error information obtained by the respective reliability operation performed for the first time after a program operation is performed on the respective memory block. In an embodiment, the respective skip reference value is set based on initial error information obtained by the respective reliability operation performed for the first time after a program operation is performed on the respective memory block and the number of program/erase cycles of the respective memory block.

In an embodiment, the memory device 500 of FIG. 26 may be the memory device described with reference to FIGS. 1 to 25 and may operate under control of the storage controller 1210 as described with reference to FIGS. 1 to 25.

Figure 28:
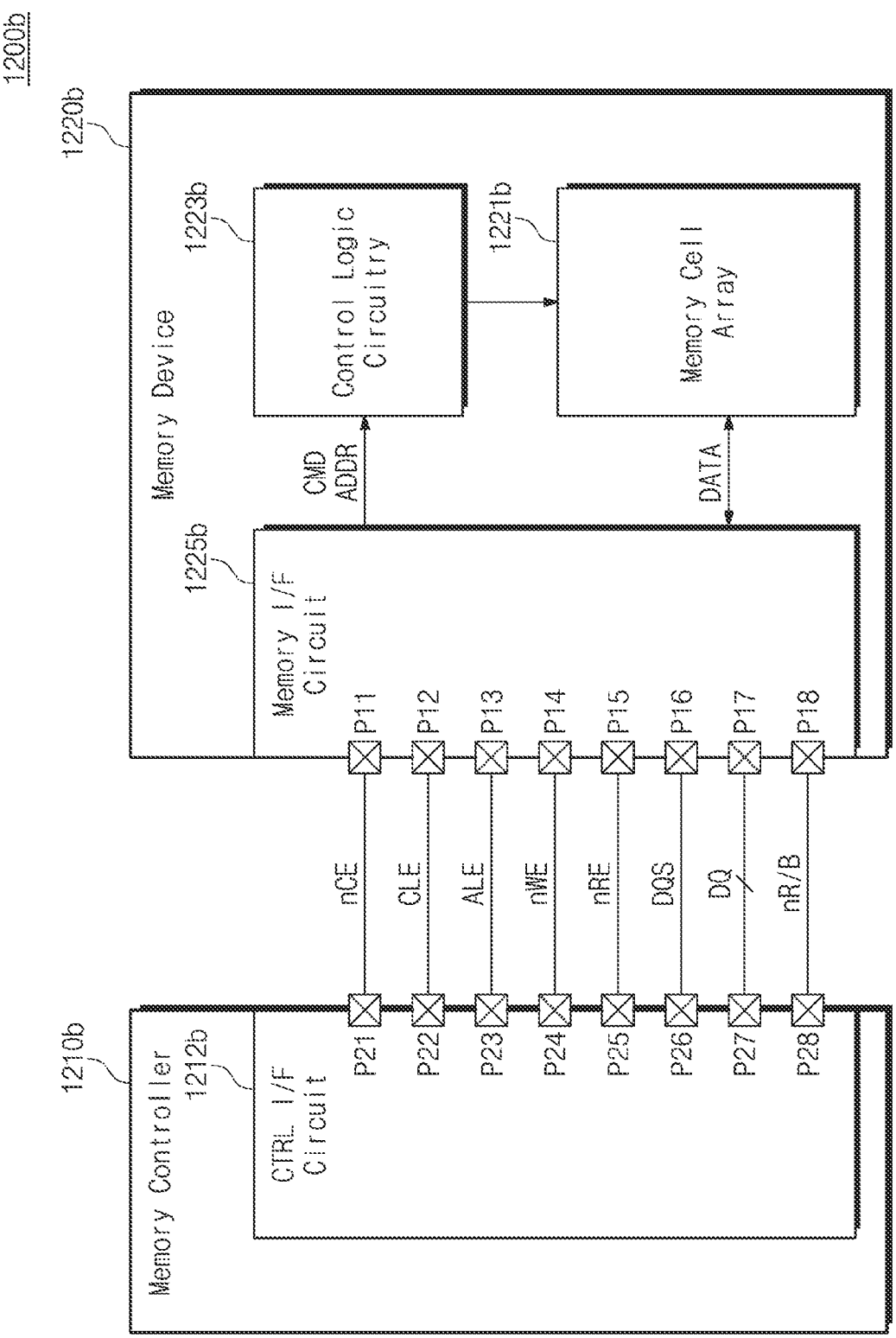
FIG. 28 is a block diagram illustrating a memory system according to an embodiment of the present disclosure.

FIG. 28 illustrates a memory system according to an embodiment. Referring to FIG. 28, the memory system 1200b may include a memory controller 1210b and a memory device 1220b.

The memory controller 1210b may include first to eighth pins P21 to P28 and controller interface circuitry 1212b. The first to eighth pins P21 to P28 may respectively correspond to the first to eighth pins P11 to P18 of the memory device 1220b.

The controller interface circuitry 1212b may transmit a chip enable signal nCE to the memory device 1220b through the first pin P21. The controller interface circuitry 1212b may further transmit and receive signals to and from the memory device 1220b, which may be selected by the chip enable signal nCE, through the second to eighth pins P22 to P28.

The controller interface circuitry 1212b may transmit the command latch enable signal CLE, the address latch enable signal ALE, and the write enable signal nWE to the memory device 1220b through the second to fourth pins P22 to P24. The controller interface circuitry 1212b may transmit or receive the data signals DQ to and from the memory device 1220b through the seventh pin P27.

The controller interface circuitry 1212b may transmit the data signal DQ including the command CMD or the address ADDR to the memory device 1220b along with the write enable signal nWE, which toggles. The controller interface circuitry 1212b may transmit the data signal DQ including the command CMD to the memory device 1220b by transmitting a command latch enable signal CLE indicative of enable state. Also, the controller interface circuitry 1212b may transmit the data signal DQ including the address ADDR to the memory device 1220b by transmitting an address latch enable signal ALE indicative of enable state.

The controller interface circuitry 1212b may transmit the read enable signal nRE to the memory device 1220b through the fifth pin P25. The controller interface circuitry 1212b may receive or transmit the data strobe signal DQS from or to the memory device 1220b through the sixth pin P26.

In an output operation outputting data (DATA) from the memory device 1220b, the controller interface circuitry 1212b may generate a read enable signal nRE, which may toggle, and transmit the read enable signal nRE to the memory device 1220b. For example, before outputting data DATA, the controller interface circuitry 1212b may generate a read enable signal nRE, which is changed from a static state (e.g., a high level or a low level) to a toggling state. Thus, the memory device 1220b may generate a data strobe signal DQS, which may toggle, based on the read enable signal nRE. The controller interface circuitry 1212b may receive the data signal DQ including the data DATA along with the data strobe signal DQS, which may toggle, from the memory device 1220b. The controller interface circuitry 1212b may obtain the data DATA from the data signal DQ based on a toggle time point of the data strobe signal DQS.

In a data (DATA) input operation of the memory device 1220b, the controller interface circuitry 1212b may generate a data strobe signal DQS, which may toggle. For example, before transmitting data DATA, the controller interface circuitry 1212b may generate a data strobe signal DQS, which is changed from a static state (e.g., a high level or a low level) to a toggling state. The controller interface circuitry 1212b may transmit the data signal DQ including the data DATA to the memory device 1220b based on toggle time points of the data strobe signal DQS.

The controller interface circuitry 1212b may receive a ready/busy output signal nR/B from the memory device 1220b through the eighth pin P28. The controller interface circuitry 1212b may then determine state information of the memory device 1220b based on the ready/busy output signal nR/B.

The memory device 1220b may include first to eighth pins P11 to P18, memory interface circuitry 1225b, control logic circuitry 1223b, and a memory cell array 1221b.

The memory interface circuitry 1225b may receive a chip enable signal nCE from the memory controller 1210b through the first pin P11. The memory interface circuitry 1225b may then transmit and receive signals to and from the memory controller 1210b through the second to eighth pins P12 to P18 in response to the chip enable signal nCE. For example, when the chip enable signal nCE is in an enable state (e.g., a low level), the memory interface circuitry 1225b may transmit and receive signals to and from the memory controller 1210b through the second to eighth pins P12 to P18.

In addition, the memory interface circuitry 1225b may receive a command latch enable signal CLE, an address latch enable signal ALE, and a write enable signal nWE from the memory controller 1210b through the second to fourth pins P12 to P14. The memory interface circuitry 1225b may receive a data signal DQ from the memory controller 1210b through the seventh pin P17 or transmit the data signal DQ to the memory controller 1210b. A command CMD, an address ADDR, and data may be transmitted via the data signal DQ. For example, the data signal DQ may be transmitted through a plurality of data signal lines. In this case, the seventh pin P17 may include a plurality of pins respectively corresponding to a plurality of data signals DQ.

The memory interface circuitry 1225b may obtain the command CMD from the data signals DQ, which are received in an enable section (e.g., a high-level state) of the command latch enable signal CLE based on toggle time points of the write enable signal nWE. The memory interface circuitry 1225b may also obtain the address ADDR from the data signals DQ, which are received in an enable section (e.g., a high-level state) of the address latch enable signal ALE based on the toggle time points of the write enable signal nWE.

In an embodiment, the write enable signal nWE may be maintained at a static state (e.g., a high level or a low level) and toggle between the high level and the low level. For example, the write enable signal nWE may toggle in a section in which the command CMD or the address ADDR is transmitted. Thus, the memory interface circuitry 1225b may obtain the command CMD or the address ADDR based on toggle time points of the write enable signal nWE.

The memory interface circuitry 1225b may receive a read enable signal nRE from the memory controller 1210b through the fifth pin P15. In addition, the memory interface circuitry 1225b may receive a data strobe signal DQS from the memory controller 1210b through the sixth pin P16 or transmit the data strobe signal DQS to the memory controller 1210b.

In a data (DATA) output operation of the memory device 1220b, the memory interface circuitry 1225b may receive the read enable signal nRE, which toggles through the fifth pin P15, before outputting the data DATA. The memory interface circuitry 1225b may generate the data strobe signal DQS, which toggles based on the toggling of the read enable signal nRE. For example, the memory interface circuitry 1225b may generate a data strobe signal DQS, which starts toggling after a predetermined delay such as tDQSRE, based on a toggling start time of the read enable signal nRE. The memory interface circuitry 1225b may transmit the data signal DQ including the data DATA based on a toggle time point of the data strobe signal DQS. Thus, the data DATA may be aligned with the toggle time point of the data strobe signal DQS and transmitted to the memory controller 1210b.

In a data (DATA) input operation of the memory device 1220b, when the data signal DQ including the data DATA is received from the memory controller 1210b, the memory interface circuitry 1225b may receive the data strobe signal DQS, which may toggle, along with the data DATA from the memory controller 1210b. The memory interface circuitry 1225b may obtain the data DATA from the data signal DQ based on toggle time points of the data strobe signal DQS. For example, the memory interface circuitry 1225b may sample the data signal DQ at rising and falling edges of the data strobe signal DQS and obtain the data DATA.

The memory interface circuitry 1225b may transmit a ready/busy output signal nR/B to the memory controller 1210b through the eighth pin P18. The memory interface circuitry 1225b may transmit state information of the memory device 1220b through the ready/busy output signal nR/B to the memory controller 1210b. When the memory device 1220b is in a busy state (e.g., when operations are being performed in the memory device 1220b), the memory interface circuitry 1225b may transmit a ready/busy output signal nR/B indicating the busy state to the memory controller 1210b. When the memory device 1220b is in a ready state (e.g., when operations are not performed or completed in the memory device 1220b), the memory interface circuitry 1225b may transmit a ready/busy output signal nR/B indicating the ready state to the memory controller 1210b. For example, while the memory device 1220b is reading data DATA from the memory cell array 1221b in response to a page read command, the memory interface circuitry 1225b may transmit a ready/busy output signal nR/B indicating a busy state (e.g., a low level) to the memory controller 1210b. For example, while the memory device 1220b is programming data DATA to the memory cell array 1221b in response to a program command, the memory interface circuitry 1225b may transmit a ready/busy output signal nR/B indicating the busy state to the memory controller 1210b.

For example, the control logic circuitry 1223b may control substantially all operations of the memory device 1220b, without limitation. The control logic circuitry 1223b may receive the command/address CMD/ADDR obtained from the memory interface circuitry 1225b. The control logic circuitry 1223b may generate control signals for controlling other components of the memory device 1220b in response to the received command/address CMD/ADDR. For example, the control logic circuitry 1223b may generate various control signals for programming data DATA to the memory cell array 1221b or reading the data DATA from the memory cell array 1221b.

By operation of the control logic circuitry 1223b, the memory cell array 1221b may store the data DATA obtained from the memory interface circuitry 1225b. The memory cell array 1221b may output the stored data DATA to the memory interface circuitry 1225b via the control of the control logic circuitry 1223b.

The memory cell array 1221b may include a plurality of memory cells. For example, the plurality of memory cells may be flash memory cells such as NAND flash memory cells and/or NOR flash memory cells. However, the inventive concept is not limited thereto, and the memory cells may be RRAM cells, FRAM cells, PRAM cells, thyristor RAM (TRAM) cells, or MRAM cells. Hereinafter, an illustrative embodiment in which the memory cells are NAND flash memory cells will mainly be described, without limitation thereto.

In an embodiment, the operation method of the storage controller 1210 described with reference to FIGS. 1 to 27 may be performed based on the interface scheme between the memory controller and the memory device described with reference to FIG. 28. For example, the storage controller 1210 may perform the reliability operation on the first memory block by repeatedly performing operations of transmitting the read command to the memory device and receiving the read data from the memory device, based on the configuration described with reference to FIG. 28.

According to an embodiment of the present disclosure, an operation method of a storage controller is configured to control a nonvolatile memory device with high reliability and high performance is provided.

While the present disclosure has been described by way of example with reference to embodiments thereof, it will be apparent to those of ordinary skill in the pertinent art that various changes and modifications may be made thereto without departing from the spirit and scope of the present disclosure as set forth in the following claims.

What is claimed is:

1. An operation method of a storage controller which is configured to control a nonvolatile memory device, the method comprising:
   initiating a first instance of a respective reliability operation for a respective memory block included in the nonvolatile memory device, the respective reliability operation including detecting a degradation level of the respective memory block and setting a respective skip reference value based on the detected degradation level;
   determining whether a respective number of consecutively skipped instances of the respective reliability operation is less than the respective skip reference value;
   selectively skipping or performing a next instance of the respective reliability operation based on the determination result, wherein the selectively skipping or performing of the respective reliability operation includes:
      when the number of consecutively skipped instances of the respective reliability operation is less than the respective skip reference value, skipping the next instance of the respective reliability operation; and
      when the number of consecutively skipped instances of the respective reliability operation is equal to or greater than the respective skip reference value, performing the next instance of the respective reliability operation to obtain respective error information of the respective memory block; and
   when the respective error information is less than a threshold value, updating the respective skip reference value of the respective memory block based on the respective error information, wherein the updated respective skip reference value is less than the respective skip reference value.

2. The method of claim 1, wherein the respective reliability operation is initiated based on a given interval indicating a read count period of the respective memory block.

3. The method of claim 1, wherein the respective reliability operation comprises reading data from memory cells connected with at least one word-line included in the respective memory block, and detecting and correcting an error of the read data.

4. The method of claim 1, further comprising:
when the respective error information is greater than or equal to a threshold value, performing a reclaim operation on the respective memory block.

5. The method of claim 1, wherein, when the respective error information exceeds a given reference value less than the threshold value, a second skip reference value is reset.

6. The method of claim 1, further comprising:
initiating a second instance of the respective reliability operation of the respective memory block;
after the first instance of the respective reliability operation is performed, determining whether a respective number of consecutively skipped instances of the respective reliability operation is equal to or greater than the updated respective skip reference value; and
selectively skipping or performing the second instance of the respective reliability operation based on the determination result.

7. The method of claim 6, wherein an interval between a first read count at which the first instance of the respective reliability operation is performed and a second read count at which the second instance of the respective reliability operation is performed corresponds to a reference interval.

8. The method of claim 1, wherein the respective skip reference value is set based on initial error information obtained by the respective reliability operation performed for a first time after a program operation is performed on the respective memory block.

9. The method of claim 1, wherein the respective skip reference value is set based on initial error information obtained by the respective reliability operation performed for a first time after a program operation is performed on the respective memory block and the number of program/erase cycles of the respective memory block.

10. An operation method of a storage controller which is configured to control a nonvolatile memory device, the method comprising:
performing a respective reliability operation on a respective memory block included in the nonvolatile memory device to obtain respective error information of the respective memory block;
setting a respective skip reference value of the respective memory block based on the respective error information;
skipping the respective reliability operation on the respective memory block a number of times, wherein the number is a natural number corresponding to the respective skip reference value;
after the respective reliability operation on the respective memory block is skipped the number of times, performing the respective reliability operation on the respective memory block to obtain updated respective error information;
when the updated respective error information is smaller than a reclaim threshold value, setting an updated respective skip reference value of the respective memory block based on the updated respective error information; and
skipping the respective reliability operation of the respective memory block another number of times, wherein the other number is a natural number corresponding to the updated respective skip reference value, wherein the updated respective skip reference value is smaller than the respective skip reference value.

11. The method of claim 10, further comprising:
when the updated respective error information is a value that is equal to or greater than a reclaim threshold value, performing a reclaim operation on the respective memory block.

12. The method of claim 10, wherein the respective reliability operation of the respective memory block is initiated based on a given interval indicating a read count period of the respective memory block.

13. An operation method of a storage controller which is configured to control a nonvolatile memory device, the method comprising:
performing a respective reliability operation on a first memory block included in the nonvolatile memory device to obtain first error information of the first memory block;
setting a first interval of the first memory block based on the first error information;
performing the respective reliability operation on the first memory block based on the first interval to obtain second error information of the first memory block;
setting a second interval of the first memory block based on the second error information; and
performing the respective reliability operation on the first memory block based on the second interval to obtain third error information of the first memory block,
wherein each of the first interval and the second interval indicates a read count of the first memory block, and the second interval is shorter than the first interval.

14. The method of claim 13, further comprising:
when the third error information is a value that is equal to or greater than a reclaim threshold value, performing a reclaim operation on the first memory block.

* * * * *